United States Patent
Alston

(10) Patent No.: US 12,471,629 B2
(45) Date of Patent: Nov. 18, 2025

(54) MOUTHPIECE FOR VAPORIZER INCLUDING POSITIVE TEMPERATURE COEFFICIENT OF RESISTIVITY HEATER

(71) Applicant: JUUL Labs, Inc., San Francisco, CA (US)

(72) Inventor: William W. Alston, Lincoln, CA (US)

(73) Assignee: JUUL Labs, Inc., Washington, DC (US)

( * ) Notice: Subject to any disclaimer, the term of this patent is extended or adjusted under 35 U.S.C. 154(b) by 542 days.

(21) Appl. No.: 17/888,607

(22) Filed: Aug. 16, 2022

(65) Prior Publication Data

US 2023/0042402 A1    Feb. 9, 2023

Related U.S. Application Data

(63) Continuation of application No. PCT/US2021/018327, filed on Feb. 17, 2021.

(60) Provisional application No. 62/978,236, filed on Feb. 18, 2020.

(51) Int. Cl.
*A24F 40/40* (2020.01)

(52) U.S. Cl.
CPC .................................. *A24F 40/40* (2020.01)

(58) Field of Classification Search
None
See application file for complete search history.

(56) References Cited

U.S. PATENT DOCUMENTS

| | | | |
|---|---|---|---|
| 5,144,962 | A | 9/1992 | Counts et al. |
| 5,498,855 | A | 3/1996 | Deevi et al. |
| 6,708,846 | B1 | 3/2004 | Fuchs et al. |
| 8,156,944 | B2 | 4/2012 | Han |
| 8,991,402 | B2 | 3/2015 | Bowen et al. |
| 9,220,302 | B2 | 12/2015 | De Piano et al. |
| 9,295,286 | B2 | 3/2016 | Shin |
| 9,399,110 | B2 | 7/2016 | Goodman et al. |
| 9,572,374 | B2 | 2/2017 | Gabbay |
| 9,772,216 | B2 | 9/2017 | Poole et al. |

(Continued)

FOREIGN PATENT DOCUMENTS

| | | |
|---|---|---|
| AU | 2014208287 B2 | 12/2016 |
| CN | 101862038 A | 10/2010 |

(Continued)

OTHER PUBLICATIONS

Yan, Dawei, (May 31, 1994) "New 600 Questions and Answers on Computer and Electronic Technology, the First Edition", Weapon Industry Press, 299-300.

(Continued)

*Primary Examiner* — Philip Y Louie
*Assistant Examiner* — Nicole A Szumigalski
(74) *Attorney, Agent, or Firm* — Mintz Levin Cohn Ferris Glovsky and Popeo, P.C.

(57) ABSTRACT

A mouthpiece for a vaporizer device includes a vapor inlet and an aerosol outlet. A first plurality of air inlets and a second plurality of air inlets are disposed between the vapor inlet and the aerosol outlet and configured to provide air streams. The air streams form a first vortex and a second vortex. The air streams mix with a vapor entering from the vapor inlet and form an aerosol exiting through the aerosol outlet. Related apparatus, systems, techniques and articles are also described.

20 Claims, 60 Drawing Sheets

(56) References Cited

U.S. PATENT DOCUMENTS

| | | | |
|---|---|---|---|
| 10,104,909 B2 | 10/2018 | Han et al. | |
| 10,188,148 B2 | 1/2019 | Althorpe et al. | |
| 10,245,374 B2 | 4/2019 | Kamen et al. | |
| 10,398,169 B2 | 9/2019 | Nelson et al. | |
| 10,765,821 B2 | 9/2020 | Raichman | |
| 11,403,409 B2 | 8/2022 | Bradbury et al. | |
| 12,122,936 B2 | 10/2024 | Fish | |
| 2002/0079309 A1 | 6/2002 | Cox et al. | |
| 2005/0285538 A1 | 12/2005 | Jaworski et al. | |
| 2007/0169773 A1 | 7/2007 | Rock | |
| 2012/0230659 A1 | 9/2012 | Goodman et al. | |
| 2013/0174842 A1 | 7/2013 | Young et al. | |
| 2013/0284192 A1 | 10/2013 | Peleg et al. | |
| 2013/0298905 A1 | 11/2013 | Levin et al. | |
| 2013/0319439 A1 | 12/2013 | Gorelick et al. | |
| 2013/0340775 A1 | 12/2013 | Juster et al. | |
| 2014/0041658 A1 | 2/2014 | Goodman et al. | |
| 2014/0158129 A1 | 6/2014 | Pratt et al. | |
| 2014/0261495 A1 | 9/2014 | Novak, III et al. | |
| 2014/0270729 A1 | 9/2014 | Depiano et al. | |
| 2015/0201674 A1 | 7/2015 | Dooly et al. | |
| 2015/0257449 A1 | 9/2015 | Gabbay | |
| 2015/0336689 A1 | 11/2015 | Brown et al. | |
| 2016/0081394 A1 | 3/2016 | Alarcon et al. | |
| 2016/0205727 A1 | 7/2016 | Meinhart et al. | |
| 2016/0286865 A1 | 10/2016 | King et al. | |
| 2016/0360786 A1 | 12/2016 | Bellinger et al. | |
| 2017/0013880 A1 | 1/2017 | O'Brien et al. | |
| 2017/0020190 A1 | 1/2017 | Chang et al. | |
| 2017/0021969 A1 | 1/2017 | Smith et al. | |
| 2017/0027230 A1 | 2/2017 | Fornarelli et al. | |
| 2017/0035112 A1 | 2/2017 | Thorens | |
| 2017/0035113 A1 | 2/2017 | Thorens | |
| 2017/0079321 A1 | 3/2017 | Golz | |
| 2017/0340016 A1 | 11/2017 | Thorens | |
| 2017/0347706 A1* | 12/2017 | Aoun | A61M 11/045 |
| 2017/0354180 A1 | 12/2017 | Fornarelli | |
| 2017/0367407 A1* | 12/2017 | Althorpe | A24F 40/40 |
| 2018/0007967 A1 | 1/2018 | Davis et al. | |
| 2018/0020722 A1 | 1/2018 | Davis et al. | |
| 2018/0020737 A1 | 1/2018 | Mironov et al. | |
| 2018/0070639 A1 | 3/2018 | Chen et al. | |
| 2018/0360116 A1 | 12/2018 | Schmidt et al. | |
| 2019/0021400 A1 | 1/2019 | Fornarelli | |
| 2019/0191769 A1 | 6/2019 | Qiu | |
| 2019/0230987 A1 | 8/2019 | Wu et al. | |
| 2019/0343182 A1* | 11/2019 | Yilmaz | H05B 3/44 |
| 2020/0038601 A1 | 2/2020 | Hepworth et al. | |
| 2020/0146352 A1* | 5/2020 | Alston | A24F 40/57 |
| 2020/0205478 A1* | 7/2020 | Dick | A24F 40/65 |
| 2020/0345058 A1 | 11/2020 | Bowen | |
| 2021/0022400 A1* | 1/2021 | Bruton | A24F 40/30 |
| 2021/0337872 A1 | 11/2021 | Alston et al. | |
| 2021/0401040 A1* | 12/2021 | Borkovec | A24F 40/30 |
| 2022/0273903 A1* | 9/2022 | Bao | A61M 13/003 |
| 2022/0279846 A1 | 9/2022 | Alston et al. | |
| 2023/0054752 A1 | 2/2023 | Alston et al. | |

FOREIGN PATENT DOCUMENTS

| | | | |
|---|---|---|---|
| CN | 204393344 U | 6/2015 | |
| CN | 204409589 U | 6/2015 | |
| CN | 105188429 A | 12/2015 | |
| CN | 105815814 A | 8/2016 | |
| CN | 105962419 A | 9/2016 | |
| CN | 105982363 A | 10/2016 | |
| CN | 106455718 A | 2/2017 | |
| CN | 107427080 A | 12/2017 | |
| CN | 207476951 U | 6/2018 | |
| CN | 109310157 A | 2/2019 | |
| CN | 111213915 A | 6/2020 | |
| CN | 113015448 A | 6/2021 | |
| CN | 113382647 A | 9/2021 | |
| CN | 115334915 A | 11/2022 | |
| DE | 102018005016 B4 | 5/2022 | |
| EP | 2319334 A1 | 5/2011 | |
| EP | 2787848 A1 | 10/2014 | |
| EP | 2999367 B1 | 3/2016 | |
| EP | 3214960 A1 | 9/2017 | |
| EP | 3000245 B1 | 2/2018 | |
| EP | 3369330 B1 | 9/2018 | |
| EP | 3424353 B1 | 4/2021 | |
| EP | 3731909 B1 | 9/2021 | |
| EP | 3458134 B1 | 1/2022 | |
| EP | 3772252 B1 | 5/2022 | |
| EP | 3911390 B1 | 10/2022 | |
| EP | 3883629 B1 | 11/2022 | |
| GB | 1184656 A | 3/1970 | |
| JP | H06-310261 A | 11/1994 | |
| JP | H07-183104 A | 7/1995 | |
| JP | 2002-124366 A | 4/2002 | |
| JP | 2012-506263 A | 3/2012 | |
| JP | 2013507976 A | 3/2013 | |
| JP | 2015504653 A | 2/2015 | |
| JP | 2017-515493 A | 6/2017 | |
| JP | 2017519492 A | 7/2017 | |
| JP | 2018536398 A | 12/2018 | |
| JP | 2019513358 A | 5/2019 | |
| KR | 10-2016-0129024 A | 11/2016 | |
| RU | 120464 U1 | 9/2012 | |
| TW | 201528979 A | 8/2015 | |
| WO | WO-2008077271 A1 | 7/2008 | |
| WO | WO-2012043941 A1 | 4/2012 | |
| WO | WO-2012091249 A1 | 7/2012 | |
| WO | WO-2013083635 A1 | 6/2013 | |
| WO | WO-2014150979 A2 | 9/2014 | |
| WO | WO-2016079151 A1 | 5/2016 | |
| WO | WO-2016147188 A1 | 9/2016 | |
| WO | WO-2016150019 A1 | 9/2016 | |
| WO | WO-2017036818 A1 | 3/2017 | |
| WO | WO-2017046334 A1 | 3/2017 | |
| WO | WO-2017118138 A1 | 7/2017 | |
| WO | WO-2017176113 A1 | 10/2017 | |
| WO | WO-2018010916 A1 | 1/2018 | |
| WO | WO-2018019485 A1 | 2/2018 | |
| WO | WO-2019122015 A1 | 6/2019 | |
| WO | WO-2020097567 A1 | 5/2020 | |
| WO | WO-2020150400 A1 | 7/2020 | |

OTHER PUBLICATIONS

Jiang, et al. (Jul. 31, 2008) "Development of High-Performance PTCR Heating Elements for New Heaters", Device Manufacturing and Application, 33(7):600-602, 625.

Becker, et al. (Jul. 1, 1985) "PTC Heating Elements—Background Analysis and Design Attributes", 8095 IEEE Transactions on Industry, IA-21(4):896-898.

* cited by examiner

| Temperature (°C) | Resistivity (ohm-cm) | Temperature (°C) | Resistivity (ohm-cm) | Temperature (°C) | Resistivity (ohm-cm) |
|---|---|---|---|---|---|
| 22.3 | 109.694 | 184.2 | 38.685 | 232.3 | 162.394 |
| 23.6 | 108.330 | 184.7 | 38.673 | 233.2 | 256.665 |
| 33.5 | 98.611 | 187.0 | 38.625 | 233.8 | 331.375 |
| 38.5 | 94.008 | 188.0 | 38.607 | 234.8 | 441.487 |
| 46.9 | 86.630 | 190.0 | 38.578 | 235.6 | 558.977 |
| 47.1 | 86.506 | 190.2 | 38.576 | 236.3 | 678.110 |
| 52.2 | 82.600 | 192.0 | 38.556 | 236.5 | 711.822 |
| 59.5 | 77.991 | 193.0 | 38.547 | 238.3 | 1261.390 |
| 59.8 | 77.795 | 194.0 | 38.541 | 240.8 | 2687.390 |
| 64.8 | 74.769 | 195.6 | 38.532 | 240.9 | 2778.690 |
| 75.2 | 68.082 | 195.8 | 38.532 | 243.9 | 4442.150 |
| 77.7 | 66.681 | 197.3 | 38.527 | 244.2 | 4788.260 |
| 86.5 | 62.716 | 198.6 | 38.527 | 245.2 | 6747.000 |
| 86.6 | 62.653 | 199.1 | 38.528 | 247.1 | 9698.350 |
| 91.1 | 60.966 | 200.6 | 38.535 | 247.9 | 11432.800 |
| 99.4 | 57.955 | 201.2 | 38.538 | 250.7 | 22831.500 |
| 99.9 | 57.775 | 202.2 | 38.547 | 251.7 | 28992.800 |
| 104.7 | 56.019 | 203.1 | 38.556 | 252.5 | 34334.100 |
| 111.4 | 53.450 | 203.9 | 38.570 | 254.5 | 45742.100 |
| 116.9 | 51.472 | 204.5 | 38.583 | 254.8 | 47918.300 |
| 119.0 | 50.738 | 205.9 | 38.620 | 257.3 | 68258.900 |
| 122.5 | 49.605 | 207.7 | 38.711 | 260.8 | 111647.000 |
| 127.5 | 48.097 | 207.9 | 38.722 | 262.1 | 133176.000 |
| 133.9 | 46.362 | 209.0 | 38.831 | 262.8 | 143871.000 |
| 134.9 | 46.125 | 210.7 | 39.097 | 263.3 | 150490.000 |
| 139.4 | 45.173 | 211.7 | 39.351 | 265.1 | 170423.000 |
| 144.3 | 44.277 | 212.7 | 39.692 | 268.9 | 221852.000 |
| 147.3 | 43.769 | 213.6 | 40.122 | 271.4 | 256649.000 |
| 149.1 | 43.456 | 214.3 | 40.449 | 272.2 | 265081.000 |
| 151.8 | 42.994 | 215.6 | 41.185 | 272.5 | 268026.000 |
| 158.1 | 41.887 | 217.6 | 42.459 | 276.8 | 295802.000 |
| 159.1 | 41.714 | 219.3 | 43.660 | 278.5 | 303521.000 |
| 163.5 | 40.937 | 219.4 | 43.788 | 282.3 | 316247.000 |
| 165.2 | 40.655 | 220.8 | 44.857 | 285.1 | 322183.000 |
| 168.3 | 40.128 | 221.4 | 45.434 | 291.0 | 326120.000 |
| 168.8 | 40.046 | 222.4 | 46.404 | 292.2 | 324601.000 |
| 171.6 | 39.604 | 222.9 | 47.021 | 293.4 | 322183.000 |
| 174.1 | 39.274 | 224.4 | 50.439 | 297.5 | 307629.000 |
| 175.3 | 39.148 | 225.6 | 54.008 | 302.3 | 285898.000 |
| 178.1 | 38.925 | 227.2 | 60.796 | 303.8 | 279388.000 |
| 179.2 | 38.862 | 228.0 | 66.314 | 307.4 | 260106.000 |
| 180.1 | 38.821 | 228.4 | 70.170 | 310.1 | 239863.000 |
| 181.9 | 38.752 | 229.4 | 97.759 | 313.2 | 215295.000 |
| 182.1 | 38.747 | 231.0 | 129.069 | 315.2 | 200942.000 |

FIG. 10

| Deg K | Ohm-m |
|---|---|
| 298.15 | 0.168329938 |
| 303.15 | 0.161810538 |
| 313.15 | 0.150027222 |
| 323.15 | 0.13959319 |
| 333.15 | 0.130614905 |
| 343.15 | 0.122664629 |
| 353.15 | 0.115975772 |
| 363.15 | 0.110218721 |
| 373.15 | 0.105160691 |
| 383.15 | 0.100737561 |
| 393.15 | 0.0968975 |
| 403.15 | 0.093703374 |
| 413.15 | 0.091130667 |
| 423.15 | 0.089298908 |
| 433.15 | 0.088613617 |
| 443.15 | 0.090317615 |
| 453.15 | 0.096577771 |
| 458.15 | 0.102238954 |
| 463.15 | 0.111000861 |
| 468.15 | 0.123519669 |
| 473.15 | 0.149909764 |
| 478.15 | 0.194749565 |
| 483.15 | 0.26517015 |
| 488.15 | 0.374116437 |
| 493.15 | 0.543771602 |
| 498.15 | 0.79410177 |
| 503.15 | 1.167231769 |
| 508.15 | 1.720888026 |
| 513.15 | 2.533063907 |
| 518.15 | 3.668688815 |

$\rho$ = 5700 kg/m³

$Cp$ = 520 J/kg K $K$ = 2.1 W/m K

MOUTHPIECE FOR VAPORIZER INCLUDING POSITIVE TEMPERATURE COEFFICIENT OF RESISTIVITY HEATER

CROSS REFERENCE

The present application is a continuation application, filed under 37 U.S.C. § 120, of PCT International Patent Application No. PCT/US21/18327 with an International Filing Date of Feb. 17, 2021, and entitled "Mouthpiece for Vaporizer Including Positive Temperature Coefficient of Resistivity Heater," which claims priority to U.S. Provisional Patent Application No. 62/978,236 filed on Feb. 18, 2020 and entitled "Mouthpiece for Vaporizer Including Positive Temperature Coefficient of Resistivity Heater," the disclosures of all of which is hereby incorporated by reference in their entirety, to the extent permitted.

TECHNICAL FIELD

The subject matter described herein relates to vaporizer devices, such as portable personal vaporizer devices for generating an inhalable aerosol from one or more vaporizable materials and including a heating element utilizing semi-conductive material with nonlinear positive temperature coefficient of resistivity (PTCR) and a mouthpiece.

BACKGROUND

Vaporizer devices, which can also be referred to as electronic vaporizer devices or e-vaporizer devices, can be used for delivery of an aerosol (also sometimes referred to as "vapor") containing one or more active ingredients by inhalation of the aerosol by a user of the vaporizing device. Electronic cigarettes, which may also be referred to as e-cigarettes, are a class of vaporizer devices that are typically battery powered and that may be used to simulate the experience of cigarette smoking, but without burning of tobacco or other substances. In use of a vaporizer device, the user inhales an aerosol, commonly called vapor, which may be generated by a heating element that vaporizes (which generally refers to causing a liquid or solid to at least partially transition to the gas phase) a vaporizable material, which may be liquid, a solution, a solid, a wax, or any other form as may be compatible with use of a specific vaporizer device.

To receive the inhalable aerosol generated by a vaporizer device, a user may, in certain examples, activate the vaporizer device by taking a puff, by pressing a button, or by some other approach. A puff, as the term is generally used (and also used herein) refers to inhalation by the user in a manner that causes a volume of air to be drawn through the vaporizer device such that the inhalable aerosol is generated by combination of vaporized vaporizable material with the air. A typical approach by which a vaporizer device (e.g., which can include an air inlet, an air outlet in fluid conjunction with a mouthpiece, and with a vaporization chamber between) generates an inhalable aerosol from a vaporizable material involves heating the vaporizable material in a vaporization chamber (also sometimes referred to as a heater chamber) to cause the vaporizable material to be converted to the gas (vapor) phase. A vaporization chamber generally refers to an area or volume in the vaporizer device within which a heat source causes heating of a vaporizable material to produce a mixture of air, and the vaporizable material in some equilibrium between the gas and condensed (e.g., liquid and/or solid) phases.

Certain components of the gas-phase vaporizable material may condense after being vaporized due to cooling and/or changes in pressure to thereby form an aerosol that includes particles of a condensed phase (e.g., liquid and/or solid) suspended in at least some of the air drawn into the vaporizer device via the puff. If the vaporizable material includes a semi-volatile compound (e.g., a compound such as nicotine, which has a relatively low vapor pressure under inhalation temperatures and pressures), the inhalable aerosol may include that semi-volatile compound in some local equilibrium between the gas and condensed phases.

SUMMARY

In an aspect, a mouthpiece for a vaporizer device includes a vapor inlet, an aerosol outlet, a first plurality of air inlets, and a second plurality of air inlets. The first plurality of air inlets is disposed between the vapor inlet and the aerosol outlet and configured to provide a first plurality of air streams. The first plurality of air streams forms a first vortex. The first vortex has a first axis of rotation and a first direction of rotation about the first axis of rotation. The second plurality of air inlets is also disposed between the vapor inlet and the aerosol outlet and configured to provide a second plurality of air streams. The second plurality of air streams forms a second vortex. The second vortex has a second axis of rotation and a second direction of rotation about the second axis of rotation. The first plurality of air streams and the second plurality of air streams are configured to mix with a vapor entering from the vapor inlet and to form an aerosol that exits through the aerosol outlet.

One or more of the following features can be included in any feasible combination. For example, each inlet of the first plurality of air inlets can be a circular hole formed through a thickness of a mouthpiece and at an angle between about 15 degrees and 45 degrees from an exterior surface of the mouthpiece. The interior of the angle for each circular hole can open towards the first direction of rotation. Each inlet of the second plurality of air inlets can also be a circular hole formed through a thickness of a mouthpiece and at an angle between about 15 degrees and 45 degrees from the exterior surface of the mouthpiece. The interior of the angle for each circular hole of the second plurality of air inlets can open towards the second direction of rotation. The first direction of rotation and the second direction can be in opposite directions. For example, the first direction of rotation can be counterclockwise and the second direction of rotation is clockwise. The first axis of rotation and the second axis of rotation can be nonparallel. The first plurality of air inlets and the second plurality of air inlets can provide turbulent mixing of inlet air with vapor entering the mouthpiece from the vapor inlet. The first plurality of air inlets and the second plurality of air inlets can be arranged in a plane. The first plurality of air inlets and the second plurality of air inlets can each be in a circular arrangement. The vapor inlet cross-sectional area can be at least four times greater than an aerosol outlet cross-sectional area. The vapor inlet can have a vapor inlet temperature and the aerosol outlet has an aerosol outlet temperature, and a difference between the vapor inlet temperature and the aerosol outlet temperature can be at least 100° C.

In another aspect, a vaporizer device includes a housing including an air inlet. The vaporizer device also includes a heating element within the housing. The heating element including a nonlinear positive temperature coefficient of resistance material. The vaporizer device also includes a heat exchanger thermally coupled to the heating element and arranged to receive an airflow from the air inlet. The heat exchanger is configured to transfer heat between the heating element and the airflow to produce a heated airflow. The heated airflow exiting the heat exchanger is configured to vaporize a vaporizable material. The vaporizer device also includes a mouthpiece configured to receive the vaporized vaporizable material through a vapor inlet. The mouthpiece has a vapor inlet, an aerosol outlet, a first plurality of air inlets, and a second plurality of air inlets. The first plurality of air inlets is disposed between the vapor inlet and the aerosol outlet and configured to provide a first plurality of air streams. The first plurality of air streams forms a first vortex. The first vortex has a first axis of rotation and a first direction of rotation about the first axis of rotation. The second plurality of air inlets is also disposed between the vapor inlet and the aerosol outlet and configured to provide a second plurality of air streams. The second plurality of air streams forms a second vortex. The second vortex has a second axis of rotation and a second direction of rotation about the second axis of rotation. The first plurality of air streams and the second plurality of air streams are configured to mix with the vaporized vaporizable material entering from the vapor inlet and to form an aerosol that exits through the aerosol outlet.

One or more of the following features can be included in any feasible combination. For example, each inlet of the first plurality of air inlets can be a circular hole formed through a thickness of a mouthpiece and at an angle between about 15 degrees and 45 degrees from an exterior surface of the mouthpiece. The interior of the angle for each circular hole can open towards the first direction of rotation. Each inlet of the second plurality of air inlets can also be a circular hole formed through a thickness of a mouthpiece and at an angle between about 15 degrees and 45 degrees from the exterior surface of the mouthpiece. The interior of the angle for each circular hole of the second plurality of air inlets can open towards the second direction of rotation. The first direction of rotation and the second direction can be in opposite directions. For example, the first direction of rotation can be counterclockwise and the second direction of rotation is clockwise. The first axis of rotation and the second axis of rotation can be nonparallel. The first plurality of air inlets and the second plurality of air inlets can provide turbulent mixing of inlet air with vapor entering the mouthpiece from the vapor inlet. The first plurality of air inlets and the second plurality of air inlets can be arranged in a plane. The first plurality of air inlets and the second plurality of air inlets can each be in a circular arrangement. The vapor inlet cross-sectional area can be at least four times greater than an aerosol outlet cross-sectional area. The vapor inlet can have a vapor inlet temperature and the aerosol outlet has an aerosol outlet temperature, and a difference between the vapor inlet temperature and the aerosol outlet temperature can be at least 100° C. The heat exchanger can include a first heat exchanger thermally coupled to a first side of the heating element. The heat exchanger can include a second heat exchanger thermally coupled to a second side of the heating element. The heat exchanger can include a plurality of fin features. The heat exchanger can be made from aluminum, copper, steel, stainless steel, or titanium. The heat exchanger can be made from a thermally conductive material extrusion. The device can include a flow diverter located in a path of the airflow configured to divert a portion of the airflow through the heat exchanger. The housing can include a heater assembly cover containing the heat exchanger. The device can include a power source configured to provide electrical energy to heat the heating element.

The device can include a cartridge located downstream of the heating element and oriented to receive the heated airflow, wherein downstream is with respect to the airflow. The housing can include a connector configured to couple the housing to a cartridge including a vaporizable material. The vaporizable material can be solid vaporizable material.

The vaporizer device can include a cartridge configured to contain a vaporizable material. The cartridge can include a first air inlet. The housing can include a connector configured to couple the housing to the cartridge. The cartridge can include a solid vaporizable material. The cartridge can include a reservoir, liquid vaporizable material within the reservoir, and a wick in fluidic communication with the liquid vaporizable material, wherein the cartridge is configured to receive the heated airflow and direct the heated airflow over the wick. The cartridge can include a mouthpiece, and the wick can be located in a path of the airflow between the heating element and the mouthpiece. The cartridge can include a second air inlet configured to draw a second airflow into the cartridge for mixing with the heated airflow and within a condensation chamber located in a path of the airflow downstream from the heat exchanger and the vaporizable material. The cartridge can include a reservoir, liquid vaporizable material within the reservoir, and a wick in fluidic communication with the liquid vaporizable material. The wick can be arranged to receive the heated airflow from the heat exchanger to produce vaporized vaporizable material in the form of a vapor and/or a first aerosol. A solid vaporizable material can be arranged to receive the vapor and/or the first aerosol and produce a second aerosol. A mouthpiece can be configured to receive the second aerosol after the vapor and/or the first aerosol passes through the solid vaporizable material.

The vaporizer device can include a first cartridge including the vaporizable material, a first air inlet, and a wick. The vaporizable material can be a liquid vaporizable material and the wick can be in fluidic communication with the liquid vaporizable material. The wick can be arranged to receive the heated airflow through the first air inlet from the heat exchanger to vaporize the vaporizable material to produce a vapor and/or a first aerosol. The vaporizer device can also include a second cartridge that includes a solid vaporizable material and a mouthpiece. The solid vaporizable material can be arranged to receive the vapor and/or the first aerosol to produce a second aerosol. The mouthpiece can be configured to receive the second aerosol after the vapor and/or the first aerosol passes through the solid vaporizable material. The first cartridge can be removably coupled to the housing. The second cartridge can be removably coupled to the housing and/or the first cartridge. The first cartridge and the second cartridge can be disposable cartridges. The second cartridge can include a second air inlet for mixing ambient temperature air with the vaporized vaporizable material after the vaporized vaporizable material passes through the solid vaporizable material. The device can include a fibrous body arranged to receive and cool the second aerosol after the vapor and/or the first aerosol passes through the solid vaporizable material.

The nonlinear positive temperature coefficient of resistance material includes an electrical resistivity transition zone in which the electrical resistivity increases over a temperature range, such that when the heating element is heated above a first temperature within the electrical resistivity transition zone, current flow from a power source is reduced to a level that limits further temperature increases of the heating element. The electrical resistivity transition zone can begin at a first temperature of between 150° C. and 350°

C. The electrical resistivity transition zone can begin at a first temperature of between 220° C. and 300° C. The electrical resistivity transition zone can begin at a first temperature between 240° C. and 280° C. The increase in the electrical resistivity over the temperature range of the electrical resistivity transition zone can include an increase factor of at least 10, an increase factor of at least 100, or an increase factor of at least 1000. The increase factor characterizing a relative change in electrical resistivity between electrical resistivity at a first temperature associated with a start of the electrical resistivity transition zone and electrical resistivity at a second temperature associated with an end of the electrical resistivity transition zone. The electrical resistivity transition zone can begin at a first temperature, and the electrical resistivity of the heating element at temperatures below the first temperature can be between 0.2 ohm-cm and 200 ohm-cm, between 2.0 ohm-cm and 20 ohm-cm, or between 20 ohm-cm and 200 ohm-cm.

The device can include a power source configured to provide a current flow at a voltage between 3 Volts and 50 Volts to the heating element, a pressure sensor, and a controller coupled to the pressure sensor and configured to detect inhalation, and in response electrically connect the power source to the heating element. The housing can be cylindrical, the heating element can be cylindrical, and the heat exchanger can be cylindrical. The housing can also be rectangular, the heating element can also be rectangular, and the heat exchanger can also be rectangular. The power source can provide either direct current (DC) or alternating current (AC).

The vaporizer device can include an input configured to electrically connect the power source to the PTCR heating element (PTCR heater) in response to a user input. The input can include a pushbutton. The PTCR heating element of the vaporizer device is self-regulating to maintain a predetermined temperature when activated. The vaporizer device does not require a pressure sensor, and/or a controller coupled to the pressure sensor to electrically connect the power source to the PTCR heating element and regulate a temperature thereof.

In another aspect, a vaporizer device for vaporizing a solid vaporizable material with a heated airflow includes a housing including an air inlet and a power source configured to provide a current flow at a voltage, and a PTCR heater assembly within the housing. The PTCR heater assembly includes a heating element within the housing and be configured to electrically couple to the power source to receive the current flow. The PTCR heating element comprises a PTCR material having an electrical resistivity that varies based on temperature. The electrical resistivity includes an electrical resistivity transition zone in which the electrical resistivity increases over a temperature range, such that when the PTCR heating element is heated above a first temperature within the transition zone, current flow from the power source is reduced to a level that limits further temperature increases of the PTCR heating element. The heater assembly also includes a heat exchanger thermally coupled to the heating element and arranged to receive airflow from the air inlet. The heat exchanger is configured to transfer heat between the heating element and the airflow to produce the heated airflow. The heated airflow exiting the heat exchanger is configured to vaporize the solid vaporizable material. The vaporizer device also includes a mouthpiece configured to receive the vaporized solid vaporizable material through a vapor inlet. The mouthpiece has a vapor inlet, an aerosol outlet, a first plurality of air inlets, and a second plurality of air inlets. The first plurality of air inlets is disposed between the vapor inlet and the aerosol outlet and configured to provide a first plurality of air streams. The first plurality of air streams forms a first vortex. The first vortex has a first axis of rotation and a first direction of rotation about the first axis of rotation. The second plurality of air inlets is also disposed between the vapor inlet and the aerosol outlet and configured to provide a second plurality of air streams. The second plurality of air streams forms a second vortex. The second vortex has a second axis of rotation and a second direction of rotation about the second axis of rotation. The first plurality of air streams and the second plurality of air streams are configured to mix with the vaporized solid vaporizable material entering from the vapor inlet and to form an aerosol that exits through the aerosol outlet.

One or more of the following features can be included in any feasible combination. For example, each inlet of the first plurality of air inlets can be a circular hole formed through a thickness of a mouthpiece and at an angle between about 15 degrees and 45 degrees from an exterior surface of the mouthpiece. The interior of the angle for each circular hole can open towards the first direction of rotation. Each inlet of the second plurality of air inlets can also be a circular hole formed through a thickness of a mouthpiece and at an angle between about 15 degrees and 45 degrees from the exterior surface of the mouthpiece. The interior of the angle for each circular hole of the second plurality of air inlets can open towards the second direction of rotation. The first direction of rotation and the second direction can be in opposite directions. For example, the first direction of rotation can be counterclockwise and the second direction of rotation is clockwise. The first axis of rotation and the second axis of rotation can be nonparallel. The first plurality of air inlets and the second plurality of air inlets can provide turbulent mixing of inlet air with vapor entering the mouthpiece from the vapor inlet. The first plurality of air inlets and the second plurality of air inlets can be arranged in a plane. The first plurality of air inlets and the second plurality of air inlets can each be in a circular arrangement. The vapor inlet cross-sectional area can be at least four times greater than an aerosol outlet cross-sectional area. The vapor inlet can have a vapor inlet temperature and the aerosol outlet has an aerosol outlet temperature, and a difference between the vapor inlet temperature and the aerosol outlet temperature can be at least 100° C. The solid vaporizable material can be included with the vaporizer device. The solid vaporizable material can be a tobacco containing media. The vaporizer device can include an input configured to electrically connect the power source to the PTCR heating element in response to a user input. The input can include a pushbutton. The vaporizer device may not comprise a controller. The vaporizer device may not comprise a pressure sensor. In another aspect, the vaporizer device comprises a pressure sensor, and a controller coupled to the pressure sensor and configured to detect inhalation, and in response, electrically connect the power source to the PTCR heating element. The heat exchanger can include a first heat exchanger thermally coupled to a first side of the heating element. The heat exchanger can include a second heat exchanger thermally coupled to a second side of the heating element. The heat exchanger can include a plurality of fin features. The heat exchanger can be made from aluminum, copper, steel, stainless steel, or titanium. The heat exchanger can be made from a thermally conductive material extrusion. The heat exchanger can be made from a metal foam, for example, an aluminum foam. The PTCR heater assembly can include a heater assembly cover. The heater assembly cover can comprise a non-electrically conductive material. The heater assembly cover can comprise a non-thermally conductive material. The heater assembly cover can comprise a metal with a non-electrically conductive coating isolating the heater assembly cover from the heat exchanger. The heater assembly cover can comprise polytetrafluoroethylene (PTFE).

The electrical resistivity transition zone can begin at the first temperature of between 150° C. and 350° C. The electrical resistivity transition zone can also begin at the first temperature of between 220° C. and 300° C. The electrical resistivity transition zone can also begin at the first temperature between 240° C. and 280° C. The first temperature can be greater than 225° C. The PTCR heating element can be heated to an operating temperature between 240° C. and 280° C. The PTCR heating element can be heated to an operating temperature between 245° C. and 255° C. The PTCR heating element can be heated to an operating temperature of about 250° C. The PTCR heater assembly can increase in the electrical resistivity over the temperature range of the electrical resistivity transition zone by an increase factor of at least 10, an increase factor of at least 100, or an increase factor of at least 1000. The increase factor characterizing a relative change in electrical resistivity between electrical resistivity at the first temperature associated with a start of the electrical resistivity transition zone and electrical resistivity at a second temperature associated with an end of the electrical resistivity transition zone. The electrical resistivity transition zone can begin at the first temperature and end at a second temperature with the difference between the first temperature and the second temperature being 500° C. or less, 200° C. or less, 100° C. or less, or 50° C. or less. The electrical resistivity transition zone can begin at the first temperature and the electrical resistivity of the PTCR heating element at temperatures below the first temperature is between 0.2 ohm-cm and 2.0 ohm-cm, between 2.0 ohm-cm and 20 ohm-cm, or between 20 ohm-cm and 200 ohm-cm.

In another aspect, a method of vaporizing a vaporizable material includes receiving, by a vaporizer device, a user input, and heating an airflow to produce a heated airflow using a PTCR heater assembly including a heat exchanger thermally coupled to a PTCR heating element. The PTCR heating element configured to electrically couple to a power source. The PTCR heating element includes an electrical resistivity that varies based on temperature. The electrical resistivity includes an electrical resistivity transition zone including an increase in electrical resistivity over a temperature range from a first temperature to a second temperature such that, when the PTCR heating element is heated between the first temperature and the second temperature, current flow from the power source is reduced to a level that limits further temperature increases of the PTCR heating element from current flow. The method also includes vaporizing the vaporizable material with the heated airflow. The vaporizable material can comprise nicotine.

The details of one or more variations of the subject matter described herein are set forth in the accompanying drawings and the description below. Other features and advantages of the subject matter described herein will be apparent from the description and drawings, and from the claims.

DESCRIPTION OF THE DRAWINGS

FIG. 10 presents a table of resistivity vs. temperature curve data for the nonlinear PTCR semiconducting material illustrated in FIG. 9;

Like reference symbols in the figures indicate like elements when possible.

DETAILED DESCRIPTION

Some aspects of the current subject matter relate to a vaporizer heater that utilizes a nonlinear positive temperature coefficient of resistivity (PTCR) heating element, also referred to as a PTCR heater, for use as a convective heater. In such a convective heater for a vaporizer, air is heated by the heating element and passed over or through a vaporizable material to form a vapor and/or aerosol for inhalation. In implementations, the vaporizable material may include a solid vaporizable material (e.g., loose-leaf materials commonly utilized in heat-not-burn (HNB) vaporizers) and/or a liquid vaporizable material (e.g., pre-filled cartridges, pods, and the like). A PTCR heating element used for convective heating can enable more uniform heating of the vaporizable material. Improved uniformity in heating can provide a number of advantages, including avoiding differential temperature within vaporizable materials that act as an insulator, prevention of contamination of the heating element, and the like. And because the heating element can be formed from PTCR material, the heating element can be temperature self-limiting and, given a known range of applied voltages, will not heat beyond a specific temperature, thereby avoiding formation of unwanted, and potentially dangerous, chemical byproducts.

Figure 1:
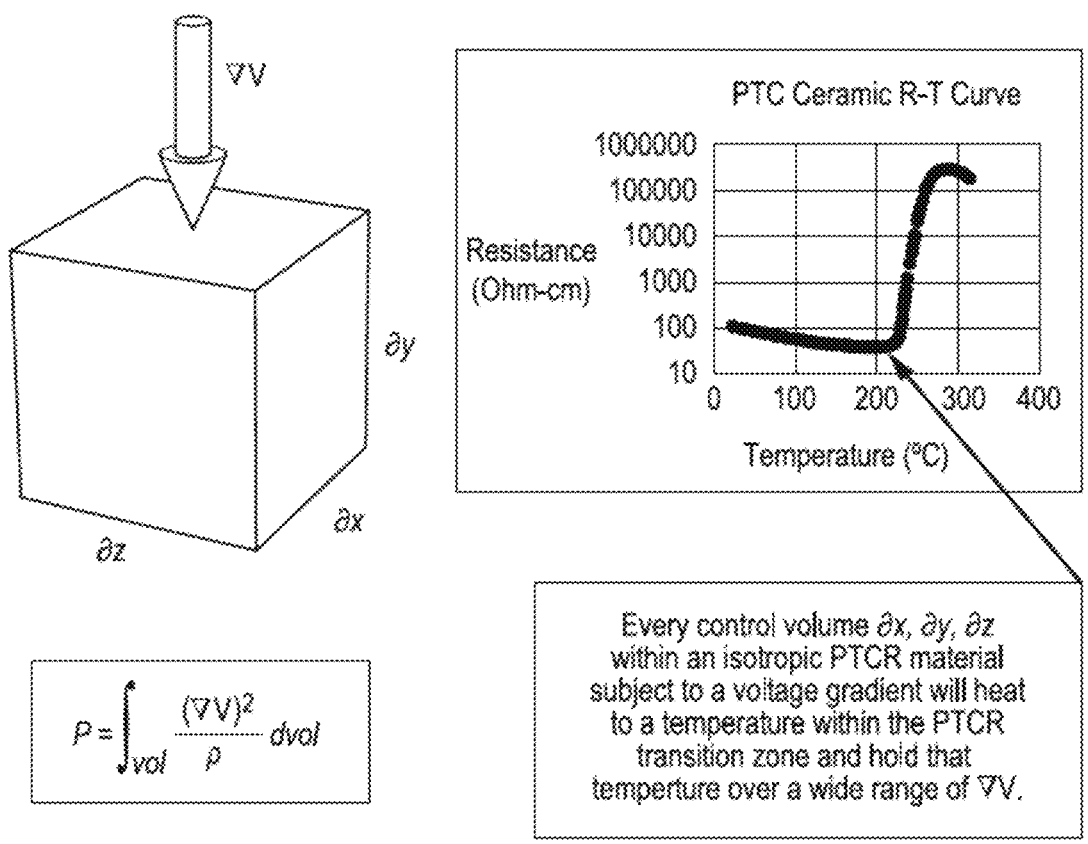
FIG. 1 illustrates the behavior of thermal power generation within an isotropic PTCR material.

The thermal power generation within an isotropic PTCR material can be characterized such that, for every control volume ∂x, ∂y, ∂z within an isotropic PTCR material subject to a voltage gradient ∇V, the control volume ∂x, ∂y, ∂z will heat to a temperature within the PTCR transition zone and hold that temperature within a wide range of ∇V as illustrated in FIG. 1. Thermal power generation can be expressed as:

$$P = \int_{vol} \frac{(\nabla V)^2}{\rho} dvol,$$

where P is thermal power generation, vol is the control volume (e.g., ∂x, ∂y, ∂z), and ρ is resistivity.

By utilizing a PTCR heating element some implementations can enable temperature to be controlled over a range of applied voltages and without the need for temperature sensors, electronic circuitry, microprocessors and/or algorithms providing power control to the heating element.

As used herein, the term solid vaporizable material generally refers to vaporizable material that includes solid materials. For example, some vaporizer devices heat materials having origin as plant leaves or other plant components in order to extract plant specific flavor aromatics and other products as vapor. These plant materials may be chopped and blended into a homogenized construct with a variety of plant products that may include tobacco, in which case nicotine and/or nicotine compounds may be produced and delivered in aerosol form to the user of such a vaporizer device. The homogenized construct may also include vaporizable liquids such as propylene glycol and glycerol in order to enhance the vapor density and aerosol produced when heated. In order to avoid production of unwanted harmful or potentially harmful constituents (HPHCs) vaporizer devices of this type benefit from heaters having temperature control means. Such vaporizer devices that heat plant leaves or homogenized construct as described above such that temperatures are kept below combustion levels are generally referred to as heat not burn (HNB) devices.

As used herein, the term liquid vaporizable material generally refers to vaporizable material without solid materials. The liquid vaporizable material can include, for example, a liquid, a solution, a wax, or any other form as may be compatible with use of a specific vaporizer device. In implementations, a liquid vaporizable material can include any form suitable to utilize a wick or wicking element to draw the vaporizable material into a vaporization chamber. The liquid vaporizable material can include a component of plant origin, such as nicotine and/or a nicotine compound. The liquid vaporizable material can include vaporizable liquids such as propylene glycol and glycerol.

Vaporizer devices operate by heating the vaporizable material to an appropriate temperature to create an aerosol but without burning or charring of the vaporizable material. One class vaporizer device is more sophisticated in that it utilizes relatively tight temperature control in order to prevent overheating and the related formation of HPHCs. Such sophistication, typically requiring electronic circuitry including a microprocessor, is typically difficult in HNB devices because of the inherent non-uniformity and related spatially inconsistent thermal properties of the vaporizable materials to be heated. This results in over temperature regions and potential HPHC production. And some existing solution fail to control local temperatures within vaporizer devices, resulting in a high probability of producing vaporizable material over temperature regions and HPHCs.

Another class of vaporizer device is simpler in that no means of temperature control is provided, such that the construction of the vaporizer device may be less expensive but includes a danger of overheating and thereby causing unwanted chemical byproducts.

In HNB vaporizer devices (e.g., where the vaporizable material is solid), some existing methods lack the ability to impose uniform temperatures for one or more of the following reasons. For example, to-be-heated solid vaporizable materials have low thermal diffusivity such that diffusion of high temperatures from a heating element into the solid vaporizable materials can be both slow and result in high thermal gradients. As a result, non-uniform heating can be an unavoidable consequence. As another example, if heating element temperature control is employed, the heating element temperature control typically addresses an average temperature such that heating of non-uniform solid vaporizable material via high temperatures within the heating element can result in high temperatures within the solid vaporizable materials. As yet another example, in order to allow for heating of the insulative materials, some existing HNB devices require preheating times that may equal or exceed 30 seconds with accompanying cost in both energy consumption, battery drain, and user inconvenience.

In vaporizer devices where fluids are vaporized by causing a heating element to come into contact with the fluids to be vaporized, contamination of the heating element can occur leading to potential for compromising performance. A solution to this problem can be to incorporate the heating element into a disposable part of the vaporizer such that the heating element is replaced with each new disposable part and thereby limiting, but not eliminating, heating element contamination.

To overcome the difficulty of uniform heating of vaporizable materials, some implementations of the current subject matter can provide for the preheating of air using one or a plurality of PTCR heating elements in conjunction with a heat exchanger. As a user draws air into a vaporizer device, the incoming airflow is heated to a controlled temperature as it passes over the heat exchanger and then passes through or over the to-be-heated vaporizable material. The vaporizable material can be a solid material (e.g., as in a HNB material) or a liquid (e.g., fluid with a porous wick). In implementations, the airflow can pass over the heat exchanger and then pass over and/or through a porous wick saturated with liquid vaporizable material, then through a solid vaporizable material (e.g., a HNB material), and then to the user. In implementations, geometry for influx of cooling air may be included between the wick and the user, for example, a balanced air inlet (i.e. a second air inlet). In addition, the current subject matter can provide for a PTCR heater having intrinsic temperature control such, for a given range of supply voltage (which can be variable by a factor of ten or more in some implementations), a designed peak temperature will not be exceeded. Such an approach can result in improved uniform heating of vaporizable material as compared to some conventional approaches.

In addition, using this convective heating approach, the PTCR heating element can be placed upstream of the wick, fluid container, and/or vaporizable material, such that the PTCR heating element is completely removed from any disposable part of the mechanism. By including the PTCR heating element in a non-disposable portion of the vaporizer device, unnecessary waste can be avoided.

Figure 2:
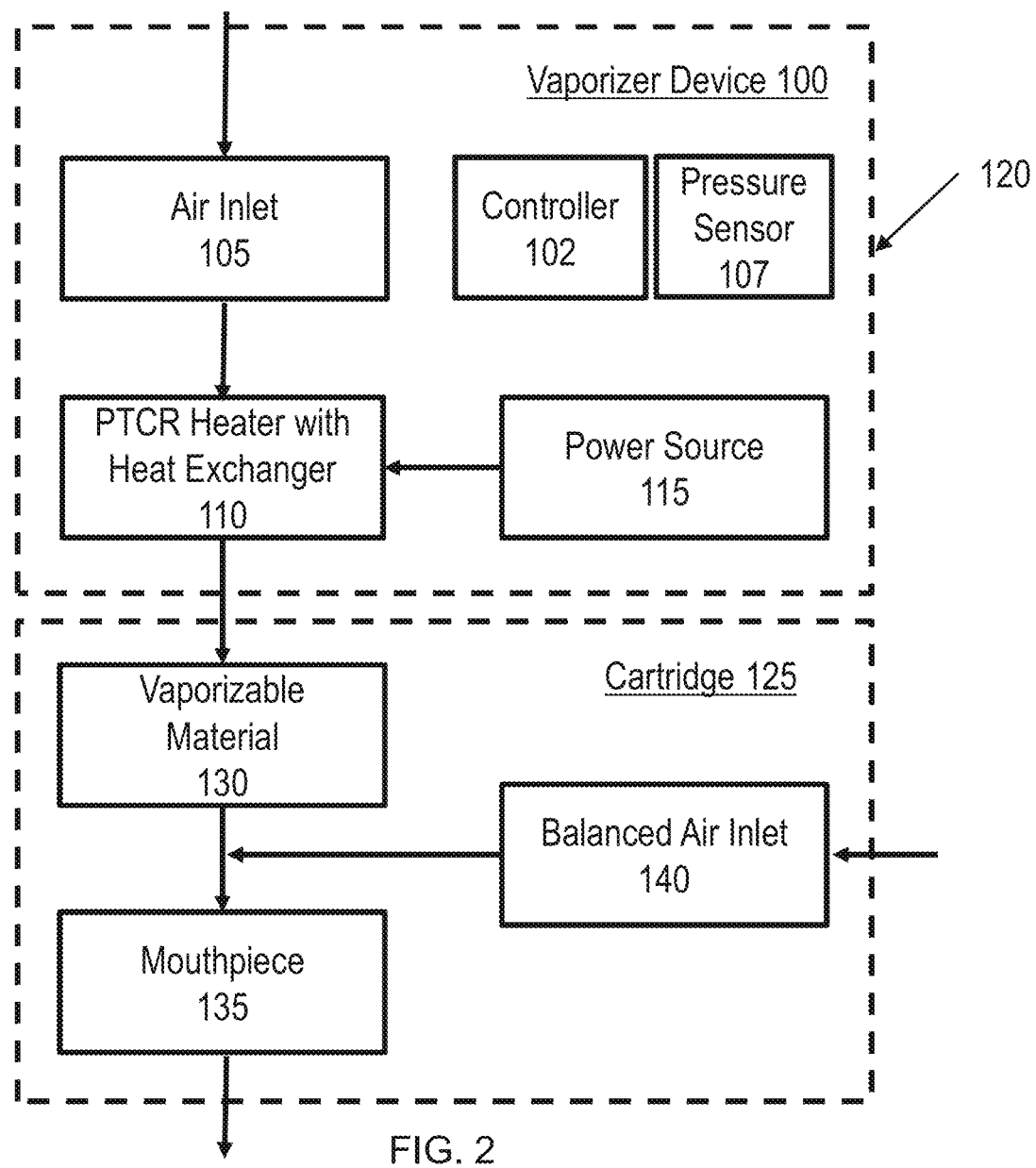
FIG. 2 is a block diagram illustrating an example vaporizer device according to some implementations of the current subject matter that can provide for uniform heating of vaporizable material utilizing convective heating.

FIG. 2 is a block diagram illustrating an example vaporizer device 100 according to some implementations of the current subject matter that can provide for uniform heating of vaporizable material utilizing convective heating. The example vaporizer device 100 includes an air inlet 105, a PTCR heater with heat exchanger 110, and a power source 115, such as a battery, capacitor, and/or the like. The example vaporizer device 100 can include a housing 120, which can couple to one or more of the PTCR heater with heat exchanger 110 and power source 115. In implementations, the example vaporizer device 100 can include an optional controller 102 and an optional pressure sensor 107. In implementations, the housing 120 can define the air inlet 105.

The PTCR heater with heat exchanger 110 can include a heating element formed of PTCR material, which is described in more detail below. The heat exchanger can be thermally coupled to the heating element and can be configured to transfer heat between the heating element and airflow that passes over and/or through the PTCR heater with heat exchanger 110 to produce a heated airflow. The PTCR heater with heat exchanger 110 can include multiple heat exchangers, for example, coupled to different sides of the heating element and can include a flow diverter for diverting the airflow through and/or over fins of the heat exchanger to improve heat transfer. A more detailed discussion of example PTCR heaters with heat exchanger 110 is found below with reference to FIGS. 9-34G.

The example vaporizer device 100 can include a connector 117 (shown in FIGS. 4, 5, and 8) for coupling the housing 120 to one or more cartridges 125 that include a vaporizable material 130. In implementations, the cartridge 125 can include a mouthpiece 135. In implementations, the coupling is removable such that the cartridge 125 can be coupled and decoupled from the vaporizer device 100 via connector 117 easily and by a user.

When the vaporizer device 100 is coupled to the cartridge 125, the vaporizer device 100 and cartridge 125 can be arranged to define an airflow path from the air inlet 105, through and/or over the PTCR heater with heat exchanger 110, through a first air inlet of the cartridge, through the vaporizable material 130, and out the mouthpiece 135.

The optional controller 102 (e.g., a processor, circuitry, etc., capable of executing logic) is for controlling delivery of heat to cause a vaporizable material to be converted from a condensed form (e.g., a solid, a liquid, a solution, a suspension, a part of an at least partially unprocessed plant material, etc.) to the gas phase. The optional controller may be part of one or more printed circuit boards (PCBs) consistent with certain implementations of the current subject matter.

Power source 115 can include any source suitable for applying electrical power to the PTCR heater with heat exchanger 110. For example, the power source 115 can include a batter, a capacitor (even with resistor-capacitor (RC) decay), and/or the like. In implementations, the power source 115 can provide a voltage, which can be chosen from a wide range of voltages. For example, in some implementations, the power source 115 can provide a voltage between 3 volts and 50 volts or more. In implementations, voltage supplied to the PTCR heater with heat exchanger 110 can vary by an order of magnitude with little effect on the PTCR heater with heat exchanger 110 performance. In implementations, the power source 115 can include multiple power sources, which can be selected based on operating conditions and/or desired vaporizer device performance.

In operation, a user can draw air through the mouthpiece 135 (e.g., puff), which can be detected by the optional controller 102 using the optional pressure sensor 107. In response to detecting a puff, the optional controller 102 can cause application of current from the power source 115 to the PTCR heater with heat exchanger 110, thereby causing the PTCR heater with heat exchanger 110 to warm. Because the PTCR heater with heat exchanger 110 is formed of PTCR material, heating will be self-limiting and the heating element will not overheat.

The airflow passes through the air inlet 105 and over and/or through the PTCR heater with heat exchanger 110, causing air in the airflow to uniformly heat. The heated airflow continues on to the vaporizable material 130 causing the vaporizable material 130 to also uniformly heat and to form a vapor (gas). The vaporizable material 130 can include a liquid, a solution, a solid, a wax, or any other form. In implementations, incoming air passing along the airflow path passes over, through, and the like, a region or chamber (e.g., an atomizer), where gas phase vaporizable material is entrained into the air.

The entrained gas-phase vaporizable material may condense as it passes through the remainder of the airflow path such that an inhalable dose of the vaporizable material in an aerosol form can be delivered to mouthpiece 135 for inhalation by the user in the form of a vapor and/or aerosol. In implementations, cartridge 125 includes a balanced air inlet (i.e. a second air inlet) 140 that can serve to provide ambient temperature air for mixing with the heated airflow entering the cartridge through a first air inlet. The ambient temperature air can be mixed with the heated airflow in a condensation chamber. The balanced air inlet 140 is positioned after the heated airflow passes through the vaporizable material (e.g., downstream from the heat exchanger and the vaporizable material), thereby cooling the heated airflow prior to inhalation by the user. In implementations, the balanced air inlet 140 is integrated with mouthpiece 135.

Activation of the PTCR heating element may be caused by automatic detection of the puff based on one or more of signals generated by one or more sensors, such as optional pressure sensor 107 or sensors disposed to detect pressure along the airflow path relative to ambient pressure (or optionally to measure changes in absolute pressure), one or more motion sensors of the vaporizer, one or more flow sensors of the vaporizer, a capacitive lip sensor of the vaporizer; in response to detection of interaction of a user with one or more input devices (e.g., buttons or other tactile control devices of the vaporizer such as a manual toggle switch, pushbutton switch, pressure switch, and the like), receipt of signals from a computing device in communication with the vaporizer; and/or via other approaches for determining that a puff is occurring or imminent.

As alluded to in the previous paragraph, a vaporizer consistent with implementations of the current subject matter may be configured to connect (e.g., wirelessly or via a wired connection) to a computing device (or optionally two or more devices) in communication with the vaporizer. To this end, the optional controller 102 may include communication hardware. The optional controller 102 may also include a memory. A computing device can be a component of a vaporizer system that also includes the vaporizer, and can include its own communication hardware, which can establish a wireless communication channel with the communication hardware of the vaporizer. For example, a computing device used as part of a vaporizer system may include a general purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. The vaporizer can also include one or more output features or devices for providing information to the user.

A computing device that is part of a vaporizer system as defined above can be used for any of one or more functions, such as controlling dosing (e.g., dose monitoring, dose setting, dose limiting, user tracking, etc.), controlling sessioning (e.g., session monitoring, session setting, session limiting, user tracking, and the like), controlling nicotine delivery (e.g., switching between nicotine and non-nicotine vaporizable material, adjusting an amount of nicotine delivered, and the like), obtaining locational information (e.g., location of other users, retailer/commercial venue locations, vaping locations, relative or absolute location of the vaporizer itself, and the like), vaporizer personalization (e.g., naming the vaporizer, locking/password protecting the vaporizer, adjusting one or more parental controls, associating the vaporizer with a user group, registering the vaporizer with a manufacturer or warranty maintenance organization, and the like), engaging in social activities (e.g., games, social media communications, interacting with one or more groups, and the like) with other users, or the like. The terms "sessioning", "session", "vaporizer session," or "vapor session," are used generically to refer to a period devoted to the use of the vaporizer. The period can include a time period, a number of doses, an amount of vaporizable material, and/or the like.

In the example in which a computing device provides signals related to activation of the PTCR heating element, or in other examples of coupling of a computing device with a vaporizer for implementation of various control or other functions, the computing device executes one or more computer instructions sets to provide a user interface and underlying data handling. In one example, detection by the computing device of user interaction with one or more user interface elements can cause the computing device to signal the vaporizer to activate the PTCR heating element to a full operating temperature for creation of an inhalable dose of vapor/aerosol. Other functions of the vaporizer may be controlled by interaction of a user with a user interface on a computing device in communication with the vaporizer.

The temperature of a PTCR heating element of a vaporizer may depend on a number of factors, including conductive heat transfer to other parts of the electronic vaporizer and/or to the environment, latent heat losses due to vaporization of a vaporizable material from the wicking element and/or the atomizer as a whole, and convective heat losses due to airflow (e.g., air moving across the heating element or the atomizer as a whole when a user inhales on the electronic vaporizer). As noted above, to reliably activate the PTCR heating element or heat the PTCR heating element to a desired temperature, a vaporizer may, in some implementations of the current subject matter, make use of signals from optional pressure sensor 107 to determine when a user is inhaling. The optional pressure sensor 107 can be positioned in the airflow path and/or can be connected (e.g., by a passageway or other path) to an airflow path connecting air inlet 105 for air to enter the device and an outlet (e.g., in mouthpiece 135) via which the user inhales the resulting vapor and/or aerosol such that the optional pressure sensor experiences pressure changes concurrently with air passing through the vaporizer device from the air inlet 105 to the air outlet. In implementations of the current subject matter, the PTCR heating element may be optionally activated in association with a user's puff, for example by automatic detection of the puff, for example by the optional pressure sensor 107 detecting a pressure change in the airflow path. In implementations, a switch is an input device that may be used to electrically complete a circuit between the power source and the PTCR heating element. In implementations, an input device that includes a relay, a solenoid, and/or a solid-state device that may be used to electrically complete a circuit between the power source and the PTCR heating element to activate the vaporizer device.

Typically, the optional pressure sensor 107 (as well as any other sensors) can be positioned on or coupled (e.g., electrically or electronically connected, either physically or via a wireless connection) to the optional controller 102 (e.g., a printed circuit board assembly or other type of circuit board). To take measurements accurately and maintain durability of the vaporizer, it can be beneficial to provide a resilient seal to separate an airflow path from other parts of the vaporizer. The seal, which can be a gasket, may be configured to at least partially surround the optional pressure sensor 107 such that connections of the optional pressure sensor 107 to internal circuitry of the vaporizer are separated from a part of the optional pressure sensor 107 exposed to the airflow path. In an example of a cartridge-based vaporizer, the seal or gasket may also separate parts of one or more electrical connections between a vaporizer body and a vaporizer cartridge. Such arrangements of a gasket or seal in a vaporizer can be helpful in mitigating against potentially disruptive impacts on vaporizer components resulting from interactions with environmental factors such as water in the vapor or liquid phases, other fluids such as the vaporizable material, etc., and/or to reduce escape of air from the designed airflow path in the vaporizer. Unwanted air, liquid or other fluid passing and/or contacting circuitry of the vaporizer can cause various unwanted effects, such as alter pressure readings, and/or can result in the buildup of unwanted material, such as moisture, the vaporizable material, etc., in parts of the vaporizer where they may result in poor pressure signal, degradation of the optional pressure sensor or other components, and/or a shorter life of the vaporizer. Leaks in the seal or gasket can also result in a user inhaling air that has passed over parts of the vaporizer device containing or constructed of materials that may not be desirable to be inhaled.

In implementations, the cartridge 125 can include a fibrous body for cooling the heated airflow after it passes through the vaporizable material 130.

Figure 3:
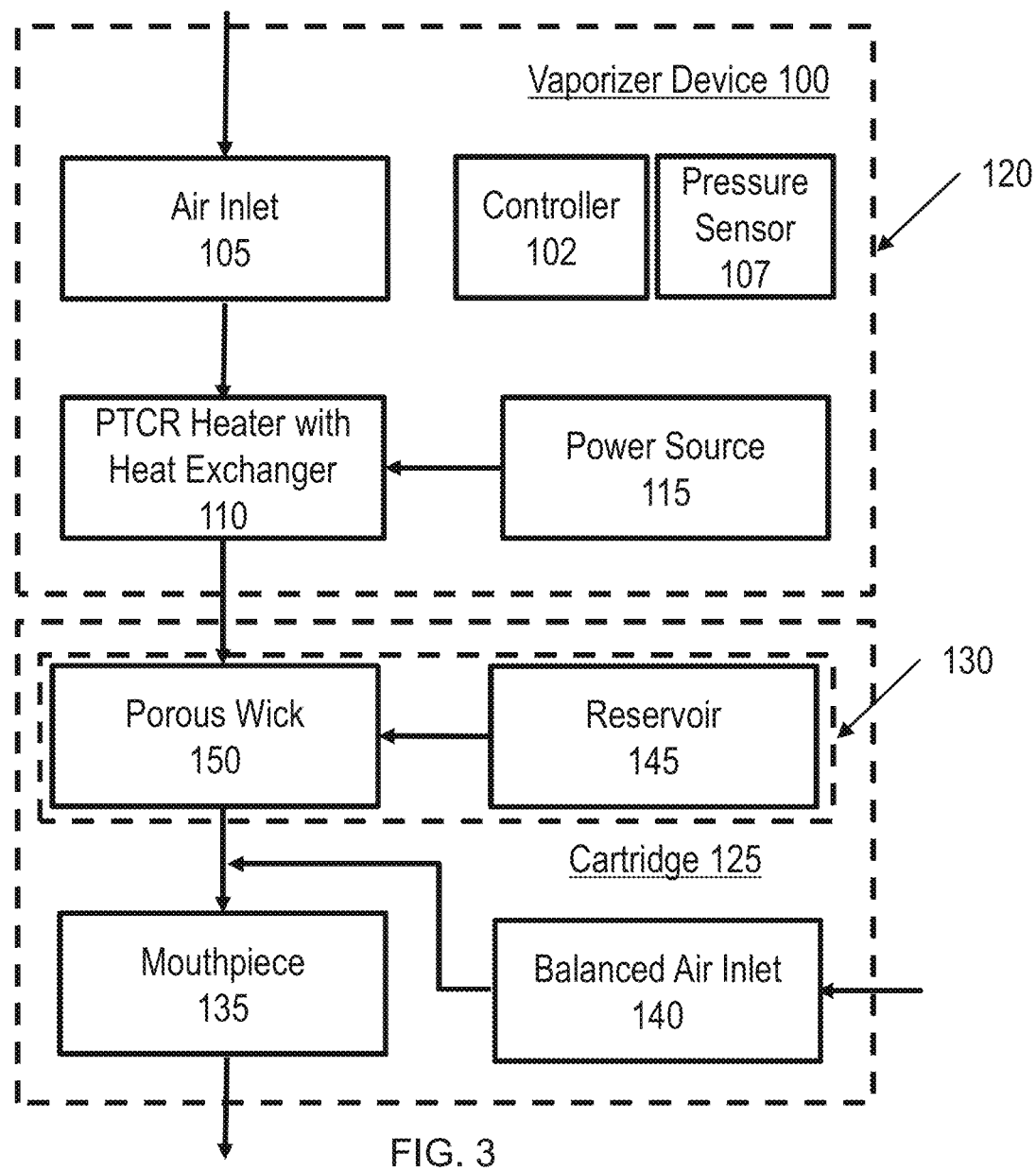
FIG. 3 is a block diagram of an example vaporizer device and cartridge with liquid vaporizable material that can provide for uniform heating of vaporizable material utilizing convective heating.
Figure 4:
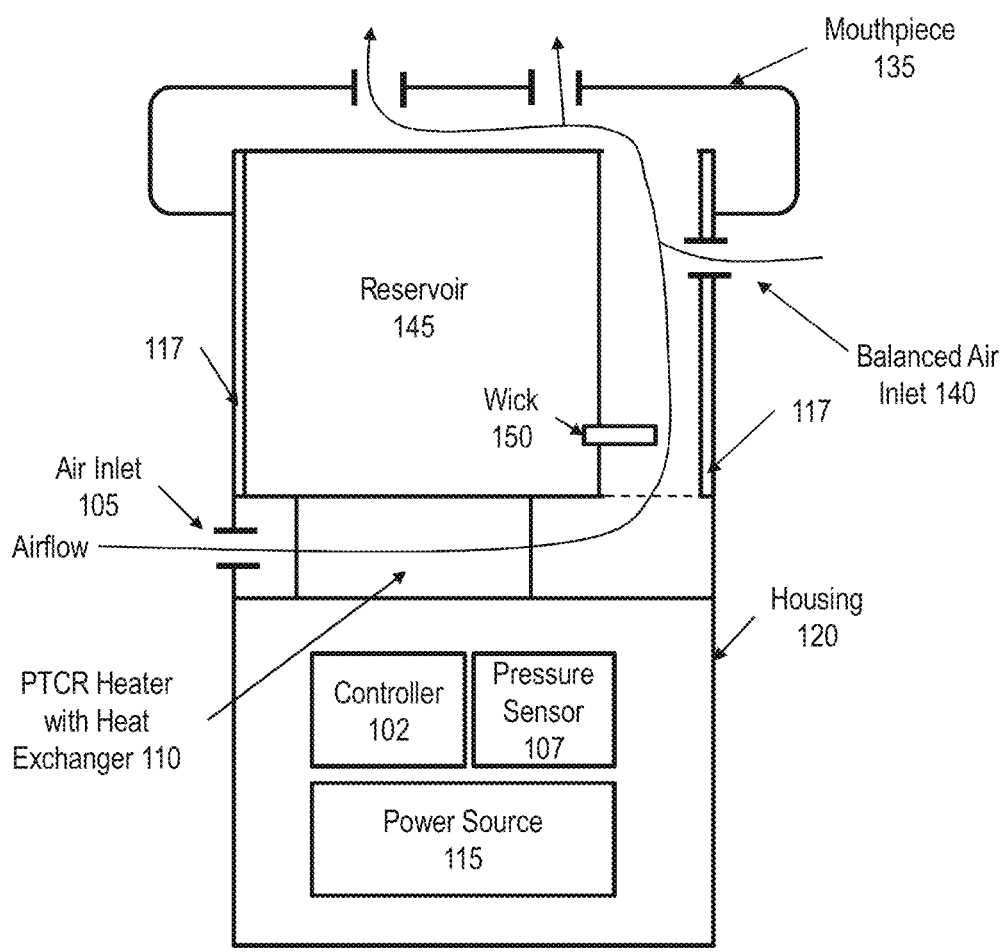
FIG. 4 is a cross section view of an example vaporizer device with liquid vaporizable material.
Figure 5:
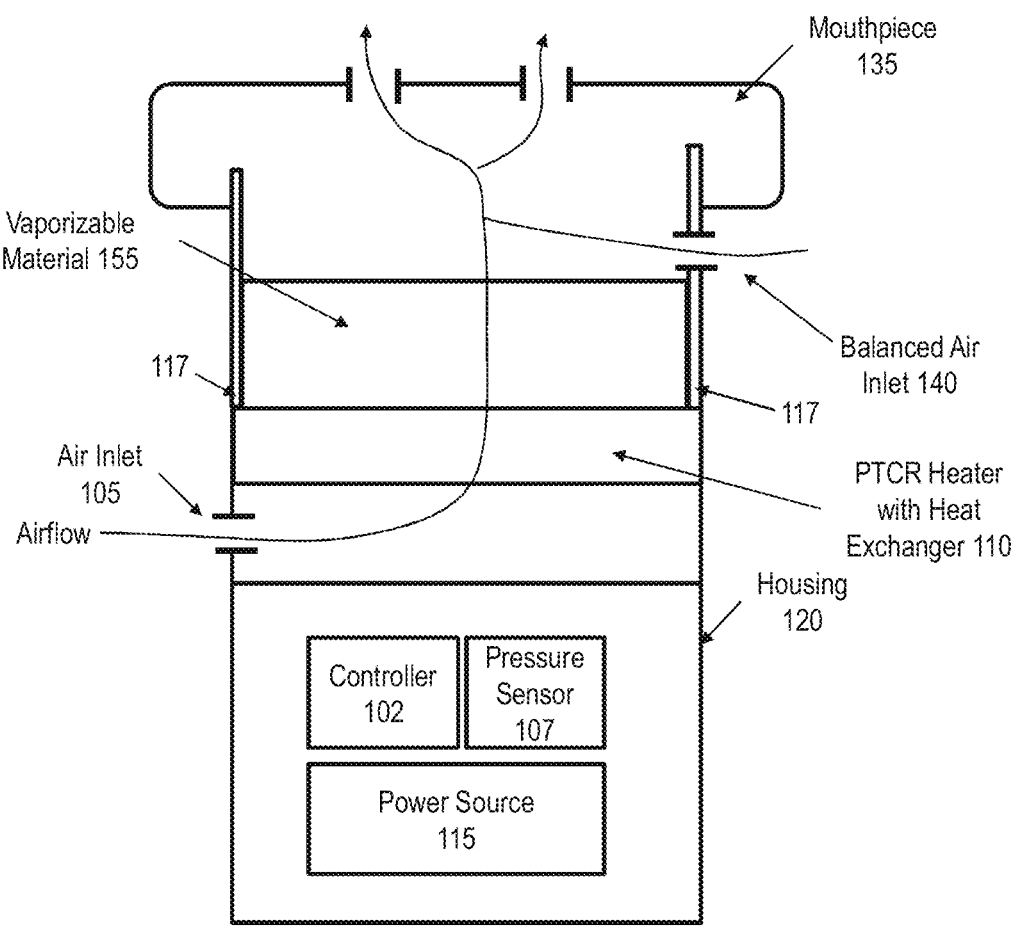
FIG. 5 is a cross section view of an example vaporizer device with solid vaporizable material (e.g., heat-not-burn product)

As noted above, the vaporizable material 130 can include solid vaporizable material (e.g., HNB materials) and/or liquid vaporizable material (e.g., a liquid, a solution, and the like). FIG. 3 is a block diagram of an example vaporizer device 100 and cartridge 125 with liquid vaporizable material that can provide for uniform heating of vaporizable material utilizing convective heating. The vaporizable material 130 includes an atomizer including a porous wick 150 in fluidic communication with a fluid tank or reservoir 145. The porous wick 150 is located within the path of the heated airflow between the PTCR heater with heat exchanger 110 and the mouthpiece 135. The porous wick 150 is located such that, in operation, heated airflow passes over and/or through the porous wick 150, which is saturated with the vaporizable fluid, causing vaporization of the liquid vaporizable material saturating the porous wick 150 thereby forming a vapor and/or aerosol. In implementations, the porous wick 150 may allow air to enter the reservoir 145 to replace the volume of liquid removed. In other words, capillary action pulls liquid vaporizable material into the wick 150 for vaporization by the heated airflow, and air may, in some implementations of the current subject matter, return to the reservoir 145 through the wick to at least partially equalize pressure in the reservoir 145. Other approaches to allowing air back into the reservoir 145 to equalize pressure are also within the scope of the current subject matter. FIG. 4 is a cross section view of an example vaporizer device with liquid vaporizable material and FIG. 5 is a cross section view of an example vaporizer device with solid vaporizable material (e.g., HNB product).

Figure 6:
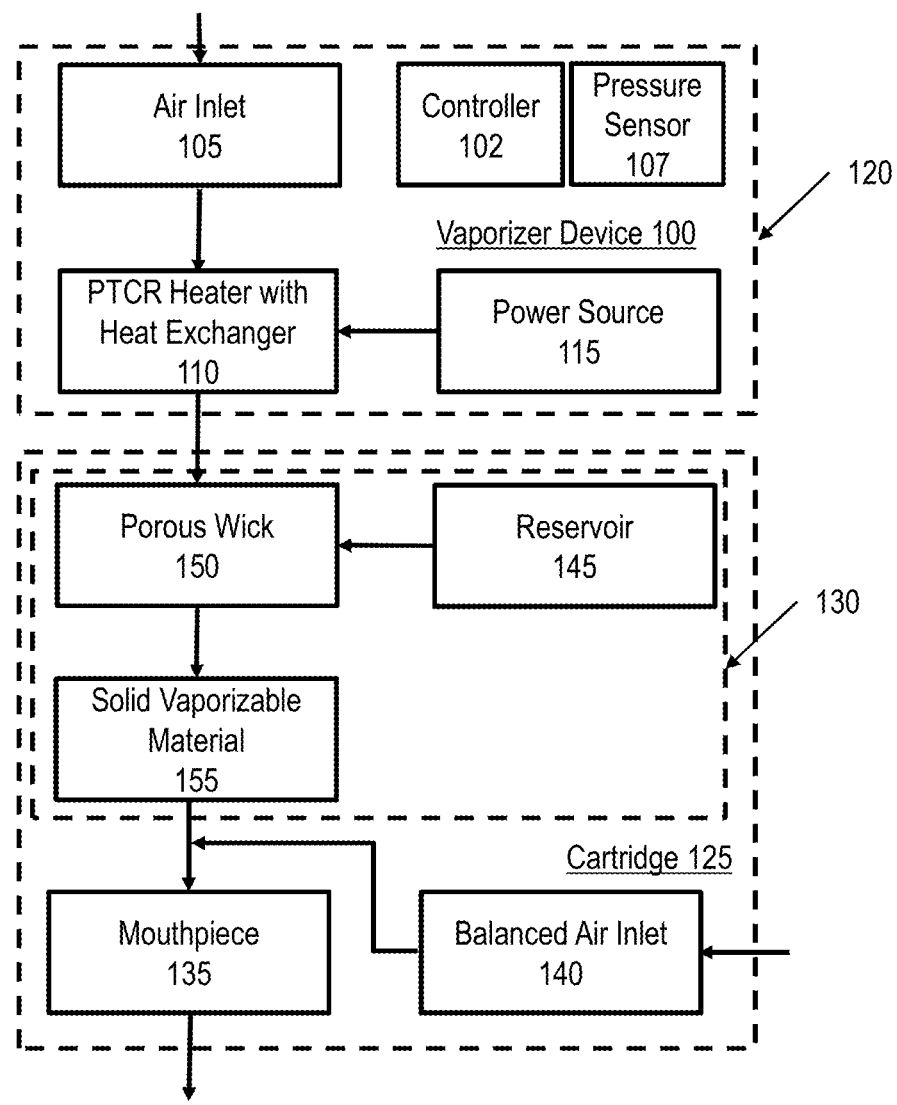
FIG. 6 is a block diagram of an example vaporizer device and cartridge with liquid vaporizable material and solid vaporizable material that can provide for uniform heating of vaporizable material utilizing convective heating.

In implementations, the vaporizable material 130 can include both a liquid vaporizable material and a solid vaporizable material. For example, FIG. 6 is a block diagram of an example vaporizer device 100 and cartridge 125 with liquid vaporizable material and solid vaporizable material that can provide for uniform heating of vaporizable material utilizing convective heating. The vaporizable material 130 includes a reservoir 145 containing liquid vaporizable material within the reservoir 145, a wick 150 in fluidic communication with the liquid vaporizable material, and a solid vaporizable material 155 located downstream (with respect to airflow) of the porous wick 150. The porous wick 150 is arranged to receive the heated airflow from the heater with heat exchanger 110 to vaporize the vaporizable material to produce a vapor and/or a first aerosol. The solid vaporizable material 155 is arranged to receive the vapor and/or the first aerosol from the wick and to produces second aerosol. The mouthpiece 135 is configured to receive the second aerosol after the vaporized vaporizable material passes through the solid vaporizable material 155. By combining both liquid vaporizable material and solid vaporizable material, improved flavoring can be achieved. In addition, by utilizing convective heating via PTCR material for vaporizing both liquid vaporizable material and solid vaporizable material, only a single heater is required to heat both materials.

Figure 7:
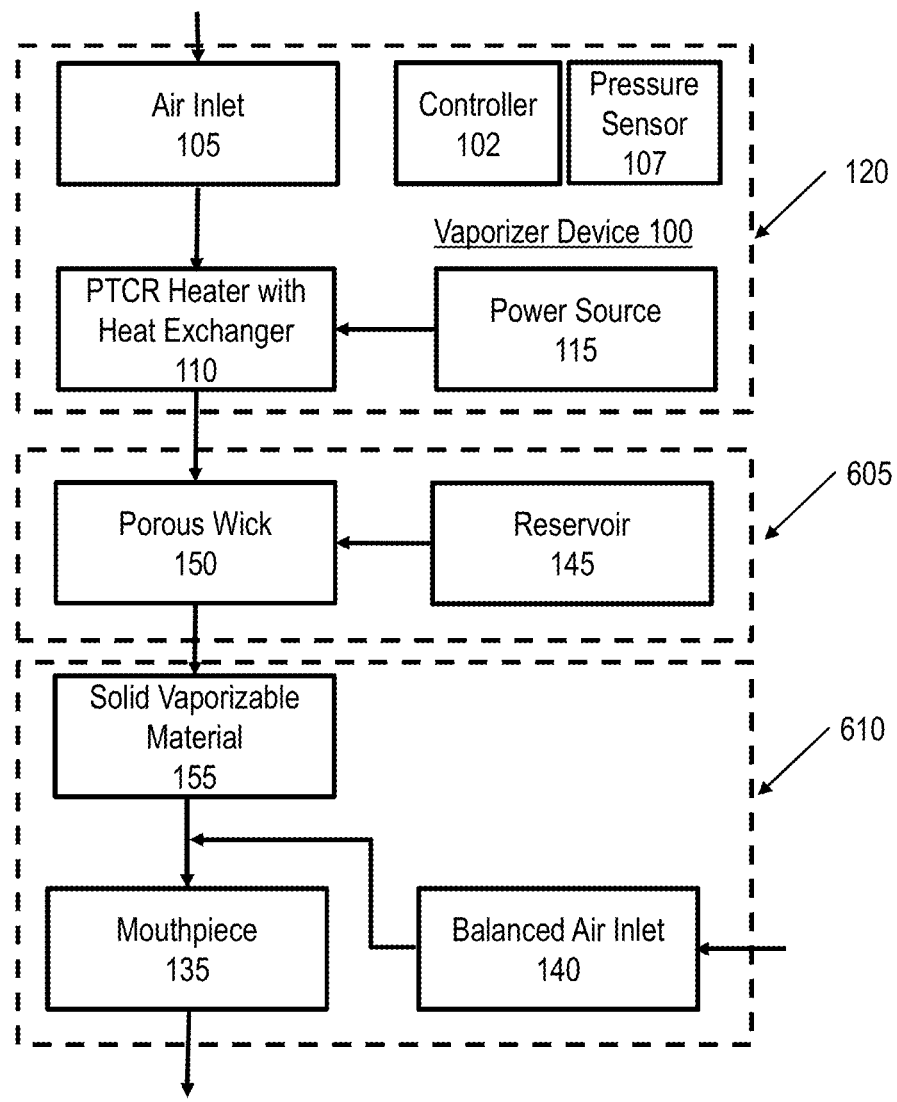
FIG. 7 is a block diagram of an example vaporizer device with multiple cartridges.
Figure 8:
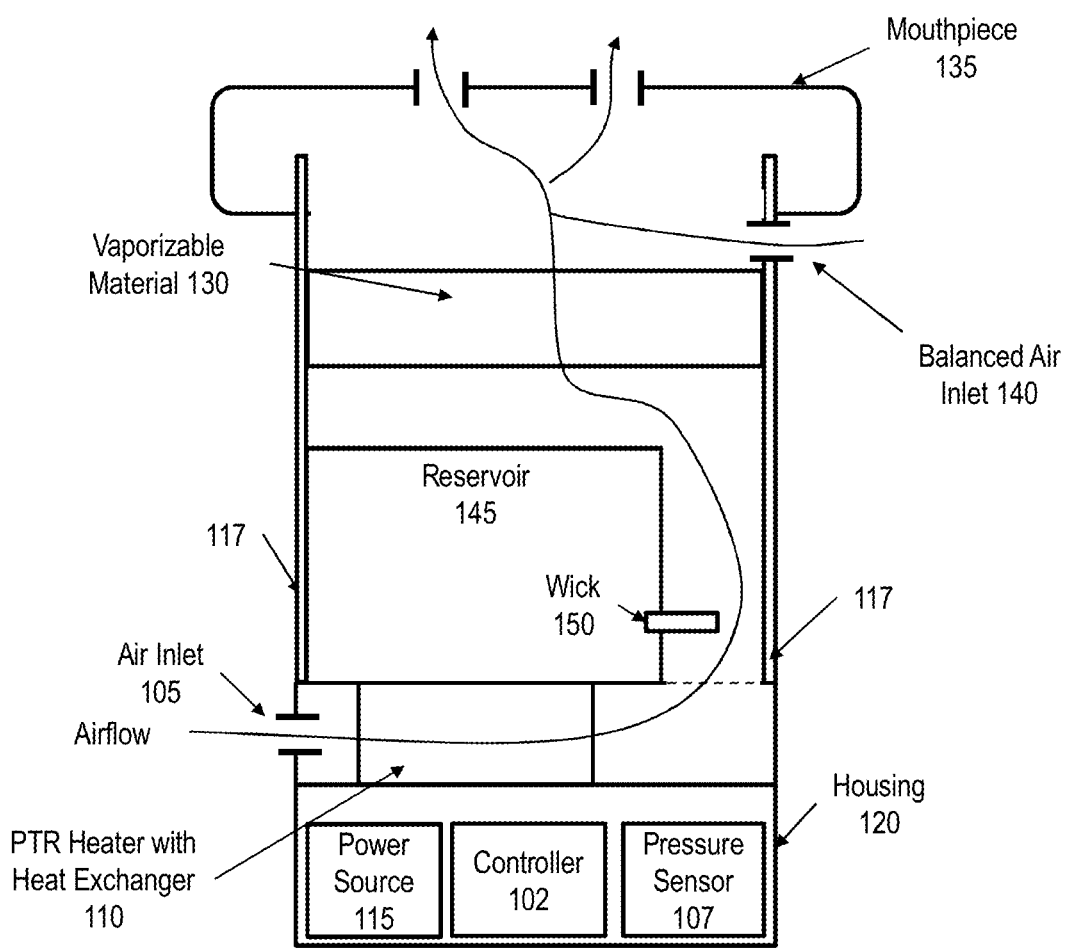
FIG. 8 is a cross section view of an example vaporizer device with both liquid vaporizable material and solid vaporizable material.

In implementations, the liquid vaporizable material and the solid vaporizable material can be included in different cartridges. For example, FIG. 7 is a block diagram of an example vaporizer device 100 with multiple cartridges. A first cartridge 605 includes liquid vaporizable material (including reservoir 145 and porous wick 150) and a second cartridge 610 includes solid vaporizable material 130 that can provide for uniform heating of vaporizable material utilizing convective heating. The first cartridge 605 can removably couple to the vaporizer device 100 and the second cartridge 610 can removably couple to the first cartridge 605. As illustrated, the first cartridge 605 includes the reservoir 145 (e.g., tank), liquid vaporizable material within the reservoir 145, and the wick 150 in fluidic communication with the liquid vaporizable material. When the first cartridge 605 is coupled to the vaporizer device 100, the wick 150 is arranged to receive the heated airflow from the heater with heat exchanger 110 to vaporize the vaporizable material to produce a vapor and/or a first aerosol. The second cartridge 610 includes the solid vaporizable material 130, balanced air inlet 140, and mouthpiece 135. When the second cartridge 610 is coupled to the first cartridge, the solid vaporizable material 130 is arranged to receive the vapor and/or the first aerosol from the wick 150 and to produce a second aerosol. The mouthpiece 135 is configured to receive the second aerosol after the vapor and/or the first aerosol passes through the solid vaporizable material 155. In implementations, the balanced air inlet (i.e. the second air inlet) 140 can provide ambient temperature air for cooling the heated second aerosol having passed through the solid vaporizable material 155. FIG. 8 is a cross section view of an example vaporizer device with both liquid vaporizable material and solid vaporizable material.

This convective heating approach can provide several advantages for vaporizing solid materials (e.g., HNB materials), as compared to conventional conductive heating approaches. For example, instead of poor conduction into insulative material (e.g., solid vaporizable material) in a direction normal to airflow, producing volatiles and differential porosity of the to-be-heated vaporizable material, some implementations of the current subject matter can provide incoming preheated air that enters the vaporizable material uniformly as a wave uniformly covering the cross-section of the vaporizable material. Volatiles are then released, coincident with increase in porosity, in a direction parallel to the flow of heated air. As another example, because of the cross-sectional uniform release of volatiles and coincident increase of porosity, the problem of differential flow path can be eliminated in some implementations. As yet another example, the problem of deteriorating conductive heat transfer through the product can be removed in some implementations of the current subject matter. As yet another example, some implementations of the current subject matter can eliminate a previously required preheating period, such that the current subject matter may provide aerosol on-demand from heated vaporizable material.

Similarly, this convective heating approach can provide several advantages for vaporizing liquid vaporizable materials. For example, instead of applying heat directly to the liquid vaporizable material using a heater element in direct contact with the liquid vaporizable material, some implementations of the current subject matter can provide incoming preheated air as a wave uniformly covering the cross-section of the porous wick saturated with the fluid to be vaporized, thereby avoiding differential temperatures and potential for heating element contamination.

As another example, by placing the wick in close proximity and upstream (with respect to the airflow) to the solid vaporizable material (e.g., loose leaf tobacco), unwanted aerosol condensation within the device can be minimized.

In addition, intrinsic temperature control behavior of the PTCR heater can simplify the electrical power delivery circuitry in that no specific thermal feedback is required. Electrical power delivery circuitry to PTCR heater can be further simplified by eliminating the need, typical of electrical power delivery systems, for the power source to provide relatively constant voltage. In implementations, applied voltage may vary by more than an order of magnitude without significantly affecting resulting heater element temperatures.

An example PTCR heater will now be described in more detail. PTCR includes semiconducting materials that possess an electrical resistivity that changes nonlinearly with increasing temperature. Typical PTCR material resistivity is relatively low while temperature remains below a temperature transition zone. Above the temperature transition zone, the PTCR material resistivity is higher than the resistivity of the same PTCR material at temperatures below the temperature transition zone. The resistivity change can be orders of magnitude increase over a temperature transition zone of 50 degrees Celsius or less.

A heating element can utilize nonlinear PTCR material to enable intrinsic temperature control. For example, a heating element at an ambient temperature can be connected to a power source providing a voltage gradient and resulting current flow. Because the resistivity of the heating element is relatively low at ambient temperature (e.g., ambient temperature is below the transition zone), current will flow through the heating element. As current flows through the nonlinear PTCR material, heat is generated by resistance (e.g., dissipation of electrical power). The generated heat raises the temperature of the heating element, thereby causing the resistivity of the heating element to change. When the temperature of the heating element reaches the transition zone, the resistivity increases significantly over a small temperature range. The change in resistivity can be caused by the physical properties of the material. For example, a phase transition may occur in the material. Such an increase in resistivity (resulting in an overall increase in resistance) reduces current flow such that heat generation is reduced. The transition zone includes a temperature at which there is an inflection point such that heat generation will be insufficient to further raise the temperature of the heating element, thereby limiting the temperature of the heating element. So long as the power source remains connected and supplying current, the heating element will maintain a uniform temperature with minimal temperature variance. In this instance the applied power to the PTCR heating element can be represented by the equation $P_I = \text{Volts}^2/\text{Resistance}$. The heat loss of the PTCR heating element can be represented by $P_L$ and includes any combination of conductive, convective, radiative, and latent heat. During steady-state operation $P_I = P_L$. As $P_L$ increases, the temperature of the PTCR heating element drops thereby reducing the resistance thereby increasing the current flow through the PTCR heating element. As $P_L$ decreases, the temperature of the PTCR heating element increases thereby increasing the resistance thereby decreasing the current flow through the PTCR heating element. As $P_L$ approaches 0, the resistance of the PTCR heating element increase logarithmically. The operating temperature at which a PTCR heating element is limited can be affected by the element materials, element geometry, element resistivity as a function of temperature characteristics, power source, circuit characteristics (e.g., voltage gradient, current, time-variance properties), and the like.

Figure 9:
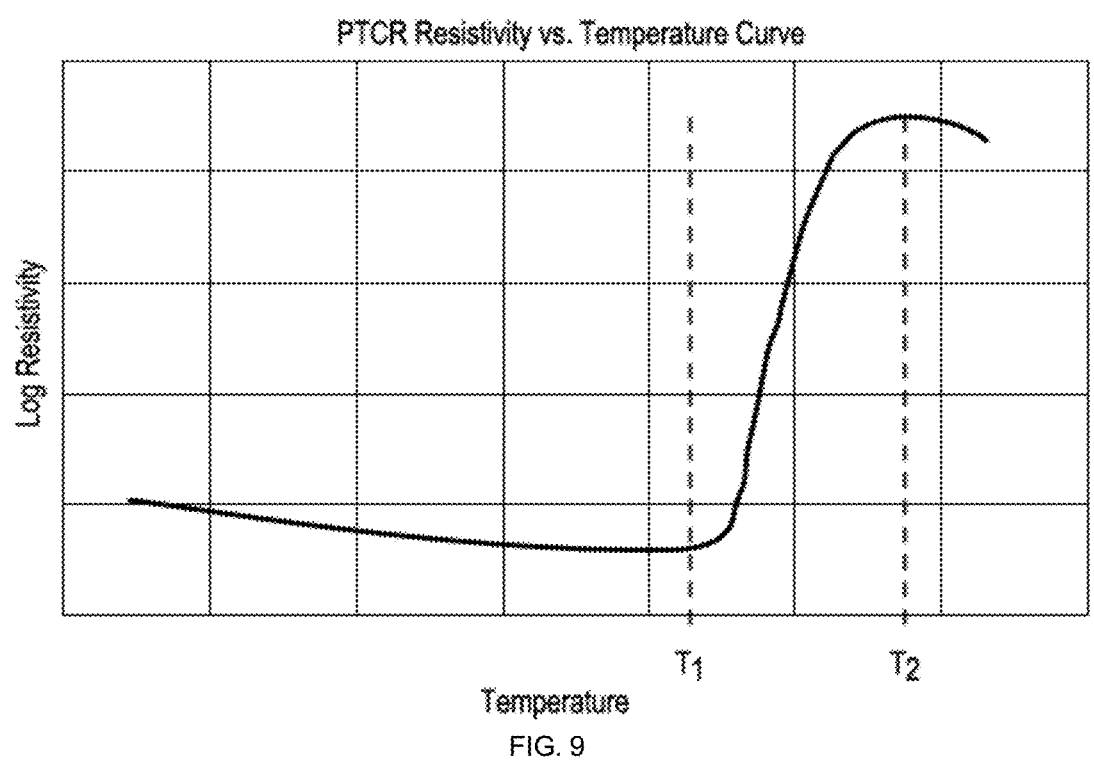
FIG. 9 is a plot illustrating an example resistivity vs. temperature curve for a nonlinear positive temperature coefficient of resistivity (PTCR) material.

FIG. 9 is a plot illustrating an example resistivity vs. temperature curve for a nonlinear PTCR material. The vertical axis is logarithmic. A heating element constructed (e.g., formed) of a nonlinear PTCR material (referred to as a PTCR heater) can include advantageous characteristics. For example, with application of sufficient voltage gradient (e.g., $\nabla V$), a PTCR heater will generate heat and increase in temperature until the transition zone is reached. In the curve illustrated in FIG. 9, the transition zone spans between temperatures $T_1$ and $T_2$. In the curve illustrated in FIG. 9, the resistivity versus temperature curve appears nonlinear between $T_1$ and $T_2$, but in other embodiments, the resistivity versus temperature curve may be near linear or linear or other shapes. At some temperature above $T_1$ the resistivity of the nonlinear PTCR material will have increased to the point where further temperature increase will cease because the overall resistance will increase to a point such that current flow is limited. In other words, implementations of a PTCR heater can be considered to be temperature self-limiting and, given a known range of applied voltages, will not heat beyond a temperature just above the low point $T_1$ of the temperature transition zone.

Performance of a PTCR heater can depend on PTCR behavior as in FIG. 9 and on heater geometry. A PTCR heater having relatively long and narrow geometry and with electrical contacts for applying differential voltage at each end of the longer dimension of the PTCR heater can be ineffective in that resistivity of nonlinear PTCR materials is typically too high at temperatures below $T_1$. Nonlinear PTCR materials having steep transition zones where the temperature difference between $T_1$ and $T_2$ is less than 10° C. may cause all voltage drop to be within a small fraction of the length of said long and narrow geometry and given inevitable spatial nonuniformities within any material. Therefore, some implementations of a PTCR heater include an electrode construct for a PTCR heater such that a nonlinear PTCR material is provided within a parallel circuit. In some implementations that can provide improved uniformity in heating, the PTCR heater geometry can include a thin section of nonlinear PTCR material sandwiched between electrical conductors or electrically conductive coatings to which differential voltages may be applied.

FIG. 10 presents a table of resistivity vs. temperature curve data for the nonlinear PTCR semiconducting material illustrated in FIG. 9. In implementations, the PTCR heating element has a resistivity of between 10 ohm-cm and 100 ohm-cm at 100° C. and a resistivity of between 50000 ohm-cm and 150000 ohm-cm at 260° C. In implementations, the PTCR heating element has a resistivity of between 20 ohm-cm and 200 ohm-cm at 100° C. and a resistivity of between 100000 ohm-cm and 200000 ohm-cm at 265° C. In implementations, the PTCR heating element has a resistivity of less than 100 ohm-cm at 100° C. and a resistivity greater than 100000 ohm-cm at 260° C. In implementations, the PTCR heating element has a resistivity of less than 100 ohm-cm at 100° C. and a resistivity greater than 250000 ohm-cm at 275° C. In implementations, the PTCR heating element has a resistivity of less than 100 ohm-cm at 100° C. and a resistivity greater than 300000 ohm-cm at 295° C. In implementations, the PTCR heating element has a resistivity of between 10 ohm-cm and 110 ohm-cm at 25° C. and a resistivity of between 10 ohm-cm and 110 ohm-cm at 100° C. and a resistivity of between 100000 ohm-cm and 325000 ohm-cm at 280° C. In implementations, the PTCR heating element has a resistivity of between 10 ohm-cm and 150 ohm-cm at 25° C. and a resistivity of between 10 ohm-cm and 150 ohm-cm at 100° C. and a resistivity of between 100000 ohm-cm and 350000 ohm-cm at 280° C. In implementations, the PTCR heating element has a resistivity of between 10 ohm-cm and 200 ohm-cm at 25° C. and a resistivity of between 10 ohm-cm and 200 ohm-cm at 100° C. and a resistivity of between 100000 ohm-cm and 375000 ohm-cm at 280° C. In implementations, the PTCR heating element has a resistivity of between 10 ohm-cm and 300 ohm-cm at 25° C. and a resistivity of between 10 ohm-cm and 300 ohm-cm at 100° C. and a resistivity of between 100000 ohm-cm and 400000 ohm-cm at 280° C. In implementations, the PTCR heating element has a resistivity of between 10 ohm-cm and 400 ohm-cm at 25° C. and a resistivity of between 10 ohm-cm and 400 ohm-cm at 100° C. and a resistivity of between 100000 ohm-cm and 450000 ohm-cm at 280° C. In implementations, the PTCR heating element has a resistivity of between 10 ohm-cm and 500 ohm-cm at 25° C. and a resistivity of between 10 ohm-cm and 500 ohm-cm at 100° C. and a resistivity of between 100000 ohm-cm and 500000 ohm-cm at 280° C. In implementations, the PTCR heating element has a resistivity of between 50 ohm-cm and 110 ohm-cm at 25° C. and a resistivity of between 50 ohm-cm and 110 ohm-cm at 100° C. and a resistivity of between 150000 ohm-cm and 325000 ohm-cm at 280° C. In implementations, the PTCR heating element has a resistivity of between 50 ohm-cm and 150 ohm-cm at 25° C. and a resistivity of between 50 ohm-cm and 150 ohm-cm at 100° C. and a resistivity of between 150000 ohm-cm and 350000 ohm-cm at 280° C. In implementations, the PTCR heating element has a resistivity of between 50 ohm-cm and 200 ohm-cm at 25° C. and a resistivity of between 50 ohm-cm and 200 ohm-cm at 100° C. and a resistivity of between 150000 ohm-cm and 375000 ohm-cm at 280° C. In implementations, the PTCR heating element has a resistivity of between 50 ohm-cm and 300 ohm-cm at 25° C. and a resistivity of between 50 ohm-cm and 300 ohm-cm at 100° C. and a resistivity of between 150000 ohm-cm and 400000 ohm-cm at 280° C. In implementations, the PTCR heating element has a resistivity of between 50 ohm-cm and 400 ohm-cm at 25° C. and a resistivity of between 50 ohm-cm and 400 ohm-cm at 100° C. and a resistivity of between 150000 ohm-cm and 450000 ohm-cm at 280° C. In implementations, the PTCR heating element has a resistivity of between 50 ohm-cm and 500 ohm-cm at 25° C. and a resistivity of between 50 ohm-cm and 500 ohm-cm at 100° C. and a resistivity of between 150000 ohm-cm and 500000 ohm-cm at 280° C. In implementations, the PTCR heating element has a resistivity of between 90 ohm-cm and 110 ohm-cm at 25° C. and a resistivity of between 90 ohm-cm and 110 ohm-cm at 100° C. and a resistivity of between 200000 ohm-cm and 325000 ohm-cm at 280° C. In implementations, the PTCR heating element has a resistivity of between 90 ohm-cm and 150 ohm-cm at 25° C. and a resistivity of between 90 ohm-cm and 150 ohm-cm at 100° C. and a resistivity of between 200000 ohm-cm and 350000 ohm-cm at 280° C. In implementations, the PTCR heating element has a resistivity of between 90 ohm-cm and 200 ohm-cm at 25° C. and a resistivity of between 90 ohm-cm and 200 ohm-cm at 100° C. and a resistivity of between 200000 ohm-cm and 375000 ohm-cm at 280° C. In implementations, the PTCR heating element has a resistivity of between 90 ohm-cm and 300 ohm-cm at 25° C. and a resistivity of between 90 ohm-cm and 300 ohm-cm at 100° C. and a resistivity of between 200000 ohm-cm and 400000 ohm-cm at 280° C. In implementations, the PTCR heating element has a resistivity of between 90 ohm-cm and 400 ohm-cm at 25° C. and a resistivity of between 90 ohm-cm and 400 ohm-cm at 100° C. and a resistivity of between 200000 ohm-cm and 450000 ohm-cm at 280° C. In implementations, the PTCR heating element has a resistivity of between 90 ohm-cm and 500 ohm-cm at 25° C. and a resistivity of between 90 ohm-cm and 500 ohm-cm at 100° C. and a resistivity of between 200000 ohm-cm and 500000 ohm-cm at 280° C. In implementations, the PTCR heating element has a resistivity of between 10 ohm-cm and 110 ohm-cm at 50° C. and a resistivity of between 10 ohm-cm and 50 ohm-cm at 150° C. and a resistivity of between 50000 ohm-cm and 125000 ohm-cm at 260° C. In implementations, the PTCR heating element has a resistivity of between 10 ohm-cm and 150 ohm-cm at 50° C. and a resistivity of between 10 ohm-cm and 100 ohm-cm at 150° C. and a resistivity of between 50000 ohm-cm and 150000 ohm-cm at 260° C. In implementations, the PTCR heating element has a resistivity of between 10 ohm-cm and 200 ohm-cm at 50° C. and a resistivity of between 10 ohm-cm and 150 ohm-cm at 150° C. and a resistivity of between 50000 ohm-cm and 175000 ohm-cm at 260° C. In implementations, the PTCR heating element has a resistivity of between 10 ohm-cm and 300 ohm-cm at 50° C. and a resistivity of between 10 ohm-cm and 200 ohm-cm at 150° C. and a resistivity of between 50000 ohm-cm and 200000 ohm-cm at 260° C. In implementations, the PTCR heating element has a resistivity of between 10 ohm-cm and 400 ohm-cm at 50° C. and a resistivity of between 10 ohm-cm and 250 ohm-cm at 150° C. and a resistivity of between 50000 ohm-cm and 250000 ohm-cm at 260° C. In implementations, the PTCR heating element has a resistivity of between 10 ohm-cm and 500 ohm-cm at 50° C. and a resistivity of between 10 ohm-cm and 300 ohm-cm at 150° C. and a resistivity of between 50000 ohm-cm and 300000 ohm-cm at 260° C. In implementations, the PTCR heating element has a resistivity of between 50 ohm-cm and 110 ohm-cm at 50° C. and a resistivity of between 20 ohm-cm and 50 ohm-cm at 150° C. and a resistivity of between 75000 ohm-cm and 125000 ohm-cm at 260° C. In implementations, the PTCR heating element has a resistivity of between 50 ohm-cm and 150 ohm-cm at 50° C. and a resistivity of between 20 ohm-cm and 100 ohm-cm at 150° C. and a resistivity of between 75000 ohm-cm and 150000 ohm-cm at 260° C. In implementations, the PTCR heating element has a resistivity of between 50 ohm-cm and 200 ohm-cm at 50° C. and a resistivity of between 20 ohm-cm and 150 ohm-cm at 150° C. and a resistivity of between 75000 ohm-cm and 175000 ohm-cm at 260° C. In implementations, the PTCR heating element has a resistivity of between 50 ohm-cm and 300 ohm-cm at 50° C. and a resistivity of between 20 ohm-cm and 200 ohm-cm at 150° C. and a resistivity of between 75000 ohm-cm and 200000 ohm-cm at 260° C. In implementations, the PTCR heating element has a resistivity of between 50 ohm-cm and 400 ohm-cm at 50° C. and a resistivity of between 20 ohm-cm and 250 ohm-cm at 150° C. and a resistivity of between 75000 ohm-cm and 250000 ohm-cm at 260° C. In implementations, the PTCR heating element has a resistivity of between 50 ohm-cm and 500 ohm-cm at 50° C. and a resistivity of between 20 ohm-cm and 300 ohm-cm at 150° C. and a resistivity of between 75000 ohm-cm and 300000 ohm-cm at 260° C. In implementations, the PTCR heating element has a resistivity of between 75 ohm-cm and 110 ohm-cm at 50° C. and a resistivity of between 30 ohm-cm and 50 ohm-cm at 150° C. and a resistivity of between 100000 ohm-cm and 125000 ohm-cm at 260° C. In implementations, the PTCR heating element has a resistivity of between 75 ohm-cm and 150 ohm-cm at 50° C. and a resistivity of between 30 ohm-cm and 100 ohm-cm at 150° C. and a resistivity of between 100000 ohm-cm and 150000 ohm-cm at 260° C. In implementations, the PTCR heating element has a resistivity of between 75 ohm-cm and 200 ohm-cm at 50° C. and a resistivity of between 30 ohm-cm and 150 ohm-cm at 150° C. and a resistivity of between 100000 ohm-cm and 175000 ohm-cm at 260° C. In implementations, the PTCR heating element has a resistivity of between 75 ohm-cm and 300 ohm-cm at 50° C. and a resistivity of between 30 ohm-cm and 200 ohm-cm at 150° C. and a resistivity of between 100000 ohm-cm and 200000 ohm-cm at 260° C. In implementations, the PTCR heating element has a resistivity of between 75 ohm-cm and 400 ohm-cm at 50° C. and a resistivity of between 30 ohm-cm and 250 ohm-cm at 150° C. and a resistivity of between 100000 ohm-cm and 250000 ohm-cm at 260° C. In implementations, the PTCR heating element has a resistivity of between 75 ohm-cm and 500 ohm-cm at 50° C. and a resistivity of between 30 ohm-cm and 300 ohm-cm at 150° C. and a resistivity of between 100000 ohm-cm and 300000 ohm-cm at 260° C. In implementations, the PTCR heating element has a resistivity of between 10 ohm-cm and 110 ohm-cm at 25° C. and a resistivity of between 10 ohm-cm and 50 ohm-cm at 150° C. and a resistivity of between 100000 ohm-cm and 325000 ohm-cm at 280° C. In implementations, the PTCR heating element has a resistivity of between 10 ohm-cm and 150 ohm-cm at 25° C. and a resistivity of between 10 ohm-cm and 100 ohm-cm at 150° C. and a resistivity of between 100000 ohm-cm and 350000 ohm-cm at 280° C. In implementations, the PTCR heating element has a resistivity of between 10 ohm-cm and 200 ohm-cm at 25° C. and a resistivity of between 10 ohm-cm and 150 ohm-cm at 150° C. and a resistivity of between 100000 ohm-cm and 375000 ohm-cm at 280° C. In implementations, the PTCR heating element has a resistivity of between 10 ohm-cm and 300 ohm-cm at 25° C. and a resistivity of between 10 ohm-cm and 200 ohm-cm at 150° C. and a resistivity of between 100000 ohm-cm and 400000 ohm-cm at 280° C. In implementations, the PTCR heating element has a resistivity of between 10 ohm-cm and 400 ohm-cm at 25° C. and a resistivity of between 10 ohm-cm and 250 ohm-cm at 150° C. and a resistivity of between 100000 ohm-cm and 450000 ohm-cm at 280° C. In implementations, the PTCR heating element has a resistivity of between 10 ohm-cm and 500 ohm-cm at 25° C. and a resistivity of between 10 ohm-cm and 300 ohm-cm at 150° C. and a resistivity of between 100000 ohm-cm and 500000 ohm-cm at 280° C. In implementations, the PTCR heating element has a resistivity of between 50 ohm-cm and 110 ohm-cm at 25° C. and a resistivity of between 20 ohm-cm and 50 ohm-cm at 150° C. and a resistivity of between 150000 ohm-cm and 325000 ohm-cm at 280° C. In implementations, the PTCR heating element has a resistivity of between 50 ohm-cm and 150 ohm-cm at 25° C. and a resistivity of between 20 ohm-cm and 100 ohm-cm at 150° C. and a resistivity of between 150000 ohm-cm and 350000 ohm-cm at 280° C. In implementations, the PTCR heating element has a resistivity of between 50 ohm-cm and 200 ohm-cm at 25° C. and a resistivity of between 20 ohm-cm and 150 ohm-cm at 150° C. and a resistivity of between 150000 ohm-cm and 375000 ohm-cm at 280° C. In implementations, the PTCR heating element has a resistivity of between 50 ohm-cm and 300 ohm-cm at 25° C. and a resistivity of between 20 ohm-cm and 200 ohm-cm at 150° C. and a resistivity of between 150000 ohm-cm and 400000 ohm-cm at 280° C. In implementations, the PTCR heating element has a resistivity of between 50 ohm-cm and 400 ohm-cm at 25° C. and a resistivity of between 20 ohm-cm and 250 ohm-cm at 150° C. and a resistivity of between 150000 ohm-cm and 450000 ohm-cm at 280° C. In implementations, the PTCR heating element has a resistivity of between 50 ohm-cm and 500 ohm-cm at 25° C. and a resistivity of between 20 ohm-cm and 300 ohm-cm at 150° C. and a resistivity of between 150000 ohm-cm and 500000 ohm-cm at 280° C. In implementations, the PTCR heating element has a resistivity of between 90 ohm-cm and 110 ohm-cm at 25° C. and a resistivity of between 30 ohm-cm and 50 ohm-cm at 150° C. and a resistivity of between 200000 ohm-cm and 325000 ohm-cm at 280° C. In implementations, the PTCR heating element has a resistivity of between 90 ohm-cm and 150 ohm-cm at 25° C. and a resistivity of between 30 ohm-cm and 100 ohm-cm at 150° C. and a resistivity of between 200000 ohm-cm and 350000 ohm-cm at 280° C. In implementations, the PTCR heating element has a resistivity of between 90 ohm-cm and 200 ohm-cm at 25° C. and a resistivity of between 30 ohm-cm and 150 ohm-cm at 150° C. and a resistivity of between 200000 ohm-cm and 375000 ohm-cm at 280° C. In implementations, the PTCR heating element has a resistivity of between 90 ohm-cm and 300 ohm-cm at 25° C. and a resistivity of between 30 ohm-cm and 200 ohm-cm at 150° C. and a resistivity of between 200000 ohm-cm and 400000 ohm-cm at 280° C. In implementations, the PTCR heating element has a resistivity of between 90 ohm-cm and 400 ohm-cm at 25° C. and a resistivity of between 30 ohm-cm and 250 ohm-cm at 150° C. and a resistivity of between 200000 ohm-cm and 450000 ohm-cm at 280° C. In implementations, the PTCR heating element has a resistivity of between 90 ohm-cm and 500 ohm-cm at 25° C. and a resistivity of between 30 ohm-cm and 300 ohm-cm at 150° C. and a resistivity of between 200000 ohm-cm and 500000 ohm-cm at 280° C. In implementations, the PTCR heating element has a resistivity of between 10 ohm-cm and 110 ohm-cm at 50° C. and a resistivity of between 10 ohm-cm and 110 ohm-cm at 100° C. and a resistivity of between 50000 ohm-cm and 125000 ohm-cm at 260° C. In implementations, the PTCR heating element has a resistivity of between 10 ohm-cm and 150 ohm-cm at 50° C. and a resistivity of between 10 ohm-cm and 150 ohm-cm at 100° C. and a resistivity of between 50000 ohm-cm and 150000 ohm-cm at 260° C. In implementations, the PTCR heating element has a resistivity of between 10 ohm-cm and 200 ohm-cm at 50° C. and a resistivity of between 10 ohm-cm and 200 ohm-cm at 100° C. and a resistivity of between 50000 ohm-cm and 175000 ohm-cm at 260° C. In implementations, the PTCR heating element has a resistivity of between 10 ohm-cm and 300 ohm-cm at 50° C. and a resistivity of between 10 ohm-cm and 300 ohm-cm at 100° C. and a resistivity of between 50000 ohm-cm and 200000 ohm-cm at 260° C. In implementations, the PTCR heating element has a resistivity of between 10 ohm-cm and 400 ohm-cm at 50° C. and a resistivity of between 10 ohm-cm and 400 ohm-cm at 100° C. and a resistivity of between 50000 ohm-cm and 250000 ohm-cm at 260° C. In implementations, the PTCR heating element has a resistivity of between 10 ohm-cm and 500 ohm-cm at 50° C. and a resistivity of between 10 ohm-cm and 500 ohm-cm at 100° C. and a resistivity of between 50000 ohm-cm and 300000 ohm-cm at 260° C. In implementations, the PTCR heating element has a resistivity of between 50 ohm-cm and 110 ohm-cm at 50° C. and a resistivity of between 50 ohm-cm and 110 ohm-cm at 100° C. and a resistivity of between 75000 ohm-cm and 125000 ohm-cm at 260° C. In implementations, the PTCR heating element has a resistivity of between 50 ohm-cm and 150 ohm-cm at 50° C. and a resistivity of between 50 ohm-cm and 150 ohm-cm at 100° C. and a resistivity of between 75000 ohm-cm and 150000 ohm-cm at 260° C. In implementations, the PTCR heating element has a resistivity of between 50 ohm-cm and 200 ohm-cm at 50° C. and a resistivity of between 50 ohm-cm and 200 ohm-cm at 100° C. and a resistivity of between 75000 ohm-cm and 175000 ohm-cm at 260° C. In implementations, the PTCR heating element has a resistivity of between 50 ohm-cm and 300 ohm-cm at 50° C. and a resistivity of between 50 ohm-cm and 300 ohm-cm at 100° C. and a resistivity of between 75000 ohm-cm and 200000 ohm-cm at 260° C. In implementations, the PTCR heating element has a resistivity of between 50 ohm-cm and 400 ohm-cm at 50° C. and a resistivity of between 50 ohm-cm and 400 ohm-cm at 100° C. and a resistivity of between 75000 ohm-cm and 250000 ohm-cm at 260° C. In implementations, the PTCR heating element has a resistivity of between 50 ohm-cm and 500 ohm-cm at 50° C. and a resistivity of between 50 ohm-cm and 500 ohm-cm at 100° C. and a resistivity of between 75000 ohm-cm and 300000 ohm-cm at 260° C. In implementations, the PTCR heating element has a resistivity of between 75 ohm-cm and 110 ohm-cm at 50° C. and a resistivity of between 90 ohm-cm and 110 ohm-cm at 100° C. and a resistivity of between 100000 ohm-cm and 125000 ohm-cm at 260° C. In implementations, the PTCR heating element has a resistivity of between 75 ohm-cm and 150 ohm-cm at 50° C. and a resistivity of between 90 ohm-cm and 150 ohm-cm at 100° C. and a resistivity of between 100000 ohm-cm and 150000 ohm-cm at 260° C. In implementations, the PTCR heating element has a resistivity of between 75 ohm-cm and 200 ohm-cm at 50° C. and a resistivity of between 90 ohm-cm and 200 ohm-cm at 100° C. and a resistivity of between 100000 ohm-cm and 175000 ohm-cm at 260° C. In implementations, the PTCR heating element has a resistivity of between 75 ohm-cm and 300 ohm-cm at 50° C. and a resistivity of between 90 ohm-cm and 300 ohm-cm at 100° C. and a resistivity of between 100000 ohm-cm and 200000 ohm-cm at 260° C. In implementations, the PTCR heating element has a resistivity of between 75 ohm-cm and 400 ohm-cm at 50° C. and a resistivity of between 90 ohm-cm and 400 ohm-cm at 100° C. and a resistivity of between 100000 ohm-cm and 250000 ohm-cm at 260° C. In implementations, the PTCR heating element has a resistivity of between 75 ohm-cm and 500 ohm-cm at 50° C. and a resistivity of between 90 ohm-cm and 500 ohm-cm at 100° C. and a resistivity of between 100000 ohm-cm and 300000 ohm-cm at 260° C.

Figure 11:
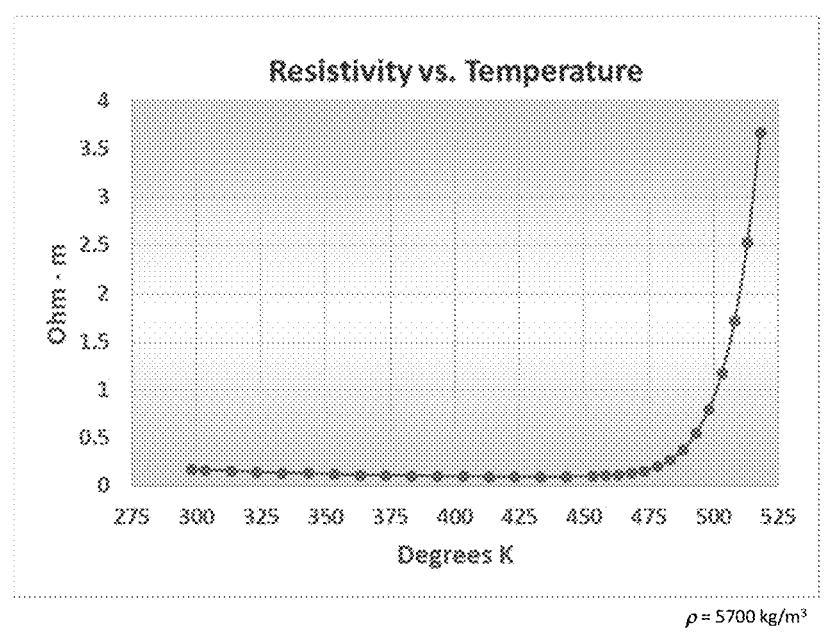
FIG. 11 is a plot illustrating an example resistivity vs. temperature curve for a nonlinear positive temperature coefficient of resistivity (PTCR) material.

FIG. 11 illustrates another example PTCR resistivity versus temperature curve. In this example, the PTCR material has a density of 5700 kg/m3, a heat capacity of 520 J/kg K, and a thermal conductivity of 2.1 W/m K. The coefficient of resistivity begins to initially increase at a temperature after about 440 K and then sharply increases between 503 K and 518 K. At 298 K, the resistivity of the PTCR material forming the PTCR heating element is 0.168 ohm-m, and at 373 K the resistivity of the PTCR material forming the PTCR heating element is 0.105 ohm-m, and at 518 K the resistivity of the PTCR material forming the PTCR heating element is 3.669 ohm-m. In some example implementations, the PTCR material has a density between 5000 kg/m3 and 7000 kg/m3, a heat capacity between 450 J/kg K and 600 J/kg K, and a thermal conductivity between 1.5 W/m K and 3.0 W/m K.

Figure 12A:
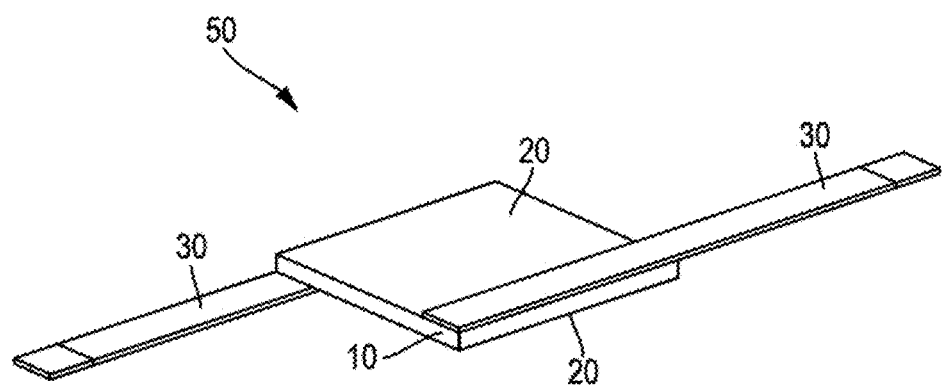
FIG. 12A is a diagram illustrating an example PTCR heating element that can enable improved vaporizer heating.
Figure 12B:
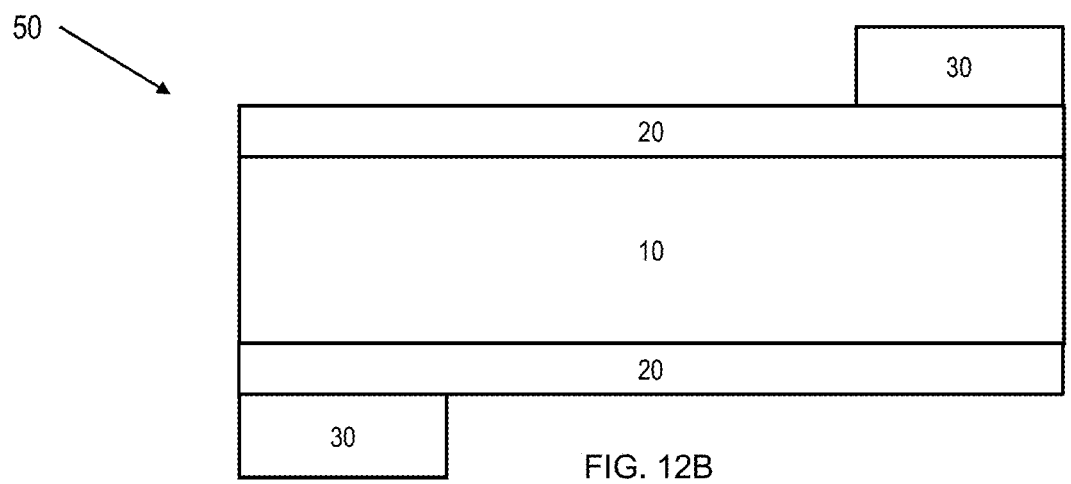
FIG. 12B is a cross section of the example PTCR heating element illustrated in FIG. 12A.
Figure 13A:
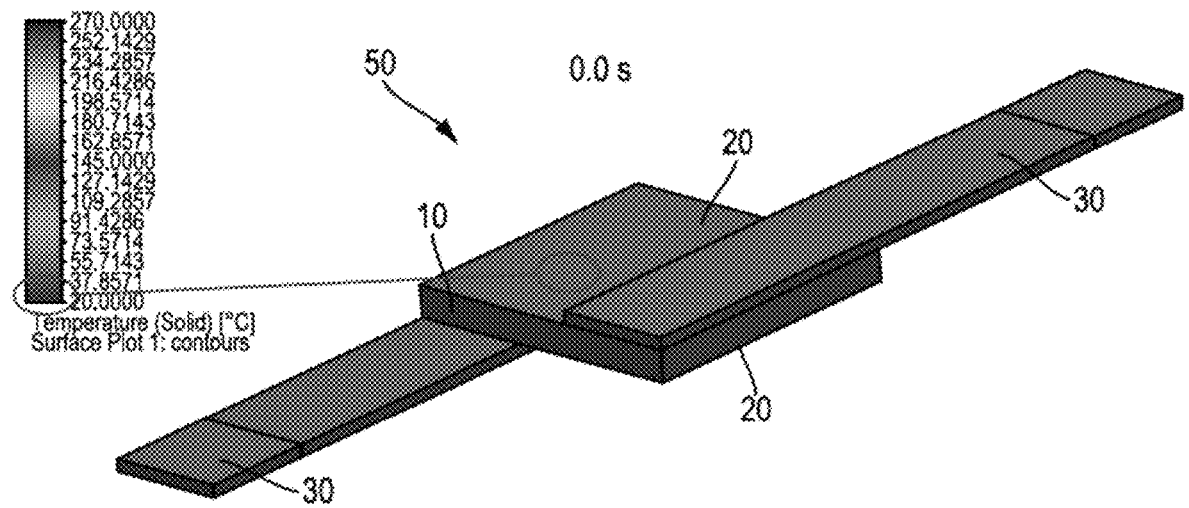
FIG. 13A-FIG. 13E illustrate modeled temperatures of the example PTCR heater.
Figure 13B:
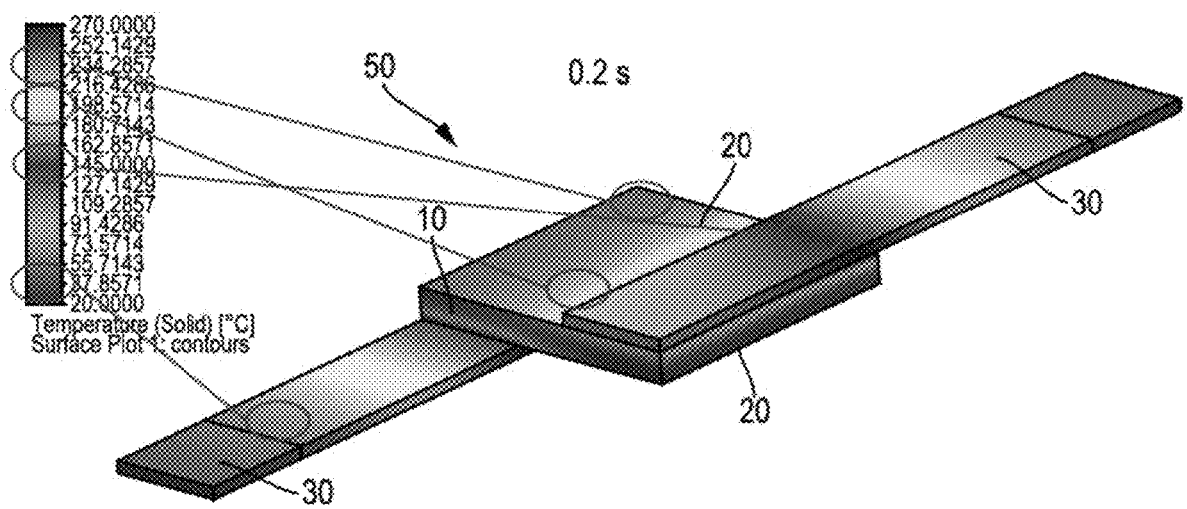
Figure 13C:
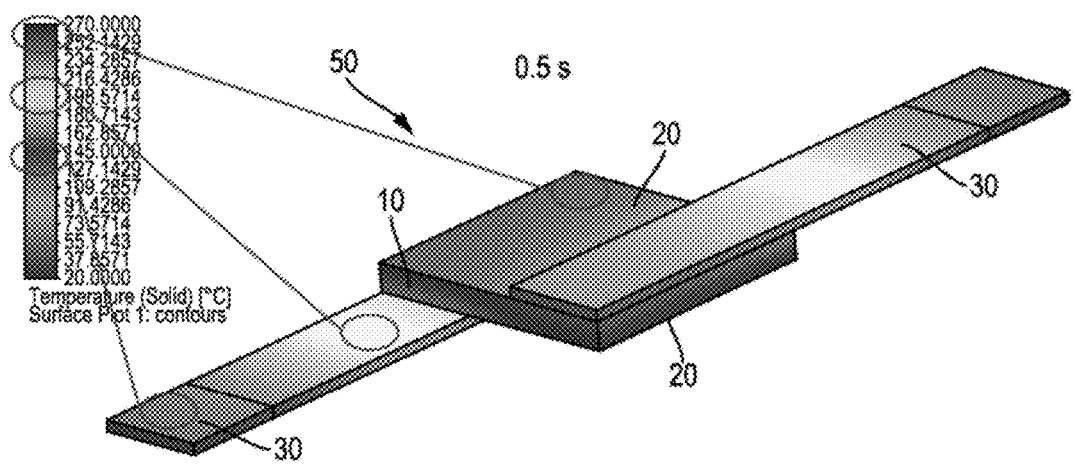
Figure 13D:
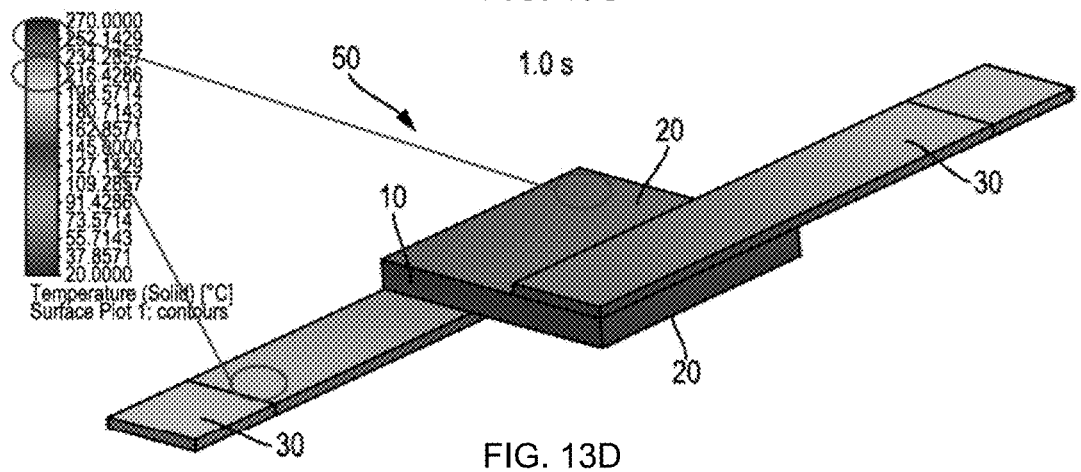
Figure 13E:
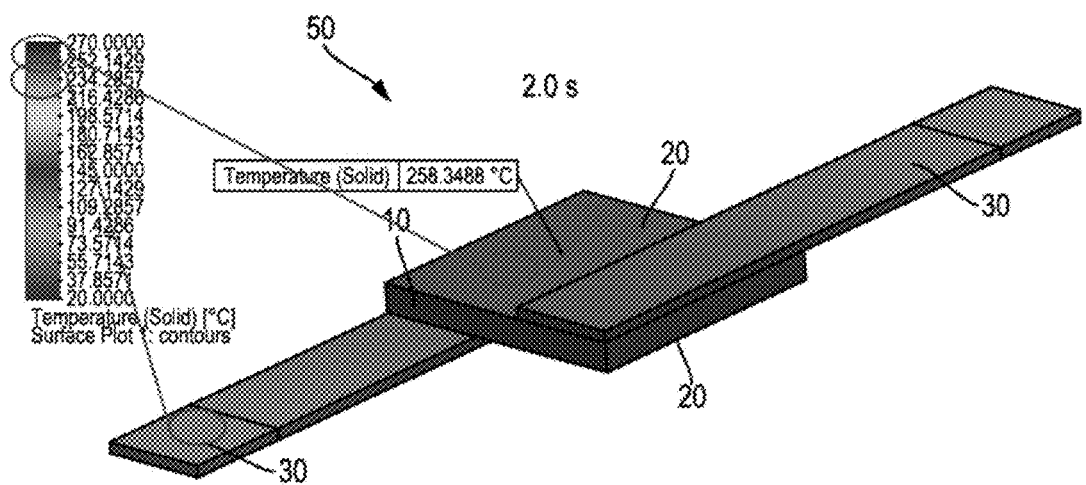

FIG. 12A is a diagram illustrating an example PTCR heating element 50 that can enable improved vaporizer heating. A thin section of nonlinear PTCR material 10 is shown in FIG. 12A, where nonlinear PTCR material 10 is sandwiched between electrically conductive layers 20, which in turn are attached to conductive leads 30 such that conductive leads 30 may have differential voltage applied. FIG. 12B is a cross section of the example PTCR heating element 50 illustrated in FIG. 12A.

In some example implementations, which can be effective in a vaporizer device using, for example, a fluid combination including propylene glycol and glycerol, a PTCR heater 50 includes the geometry illustrated in FIG. 12A with nonlinear PTCR material thickness of 0.5 mm (height) and 5.0 mm (length and width) in the other dimensions. The nonlinear PTCR material electrical characteristics includes these values: $T_1$ value between 150° C. and 300° C., such as between 220° C. and 280° C.; resistivity at temperatures below $T_1$ between 0.01 Ohm-m and 100 Ohm-m, such as between 0.1 Ohm-m and 1 Ohm-m; resistivity change between $T_1$ and $T_2$ having an increase of a factor exceeding 10 such as exceeding 100; and temperature difference between $T_1$ and $T_2$ less than 200° C. such as less than 50° C.

Figure 32:
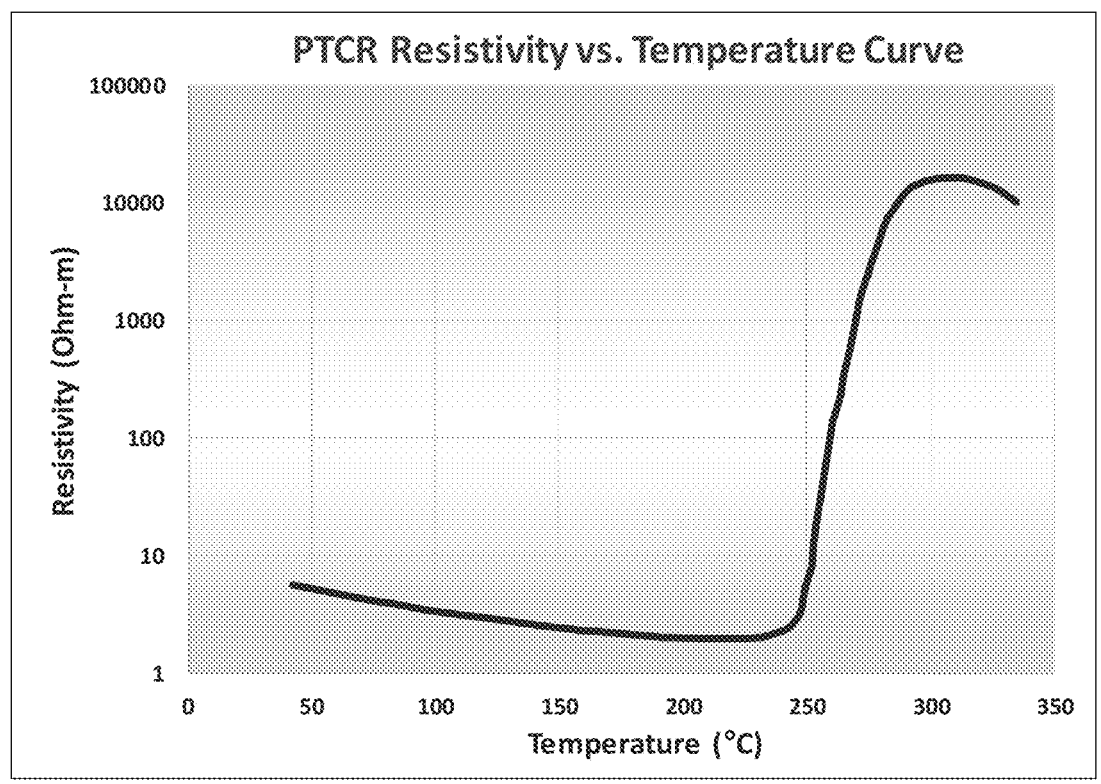
FIG. 32 is a plot of the logarithm of resistivity of a cylindrical example vaporization device with PTCR heater as a function of temperature.

FIG. 13A-FIG. 13E illustrate modeled temperatures of the example PTCR heater 50. In the illustrated example, the nonlinear PTCR material 10 included a plate geometry with dimensions of 5 mm×5 mm×0.5 mm; the conductive layers 20 were formed of silver (Ag) with dimensions of 5 mm×5 mm×0.025 mm; and the conductive leads 30 were formed of copper (CU) with dimensions of 12 mm×2 mm×0.2 mm. The nonlinear PTCR material 10 included a PTCR resistivity versus temperature curve as illustrated in FIG. 32, with a nonlinear transition zone of about 240° C. to about 300° C. A voltage of 3 to 6 volts was applied across the conductive leads 30 of the example PTCR heater 50. Under these circumstances, the example PTCR heater 50 in open air with free convective airflow will increase in temperature as shown in the modeled sequence of FIG. 13A-FIG. 13E, which illustrate respectively 0.0, 0.2, 0.5, 1.0, and 2.0 seconds after application of the voltage differential. As illustrated, the temperature beyond 1.0 second is relatively uniform and the peak temperatures at the surface of conductive layers 20 is less than 270° C.

FIG. 14A-FIG. 14F illustrate modeled temperatures of another example of a PTCR heater 50. A gradient temperature scale is shown on the left side of each figure with red representing the hottest temperature of about 255° C. and continues through the colors of the visible light spectrum in order (i.e. red, orange, yellow, green, blue, and violet) to the coolest temperature of about 23° C. In each of the illustrated examples, the nonlinear PTCR material 10 includes a plate geometry with dimensions of about 5 mm×5 mm×0.5 mm; the conductive layers 20 were formed of silver (Ag) with dimensions of about 5 mm×5 mm×0.025 mm; and the conductive leads 30 were formed of copper (CU) with dimensions of about 12 mm×2 mm×0.2 mm. The plate geometry can include two parallel sides including conductive layers 20 with conductive leads 30 attached thereto. The conductive leads 30 are centrally attached to conductive layers 20 on each side of the PTCR heating element 50 with a connection 40. In implementations, the connection 40 is a clamp, a clip, a conductive paste, a high-temperature, lead-free solder, and/or combinations thereof.

Figure 14A:
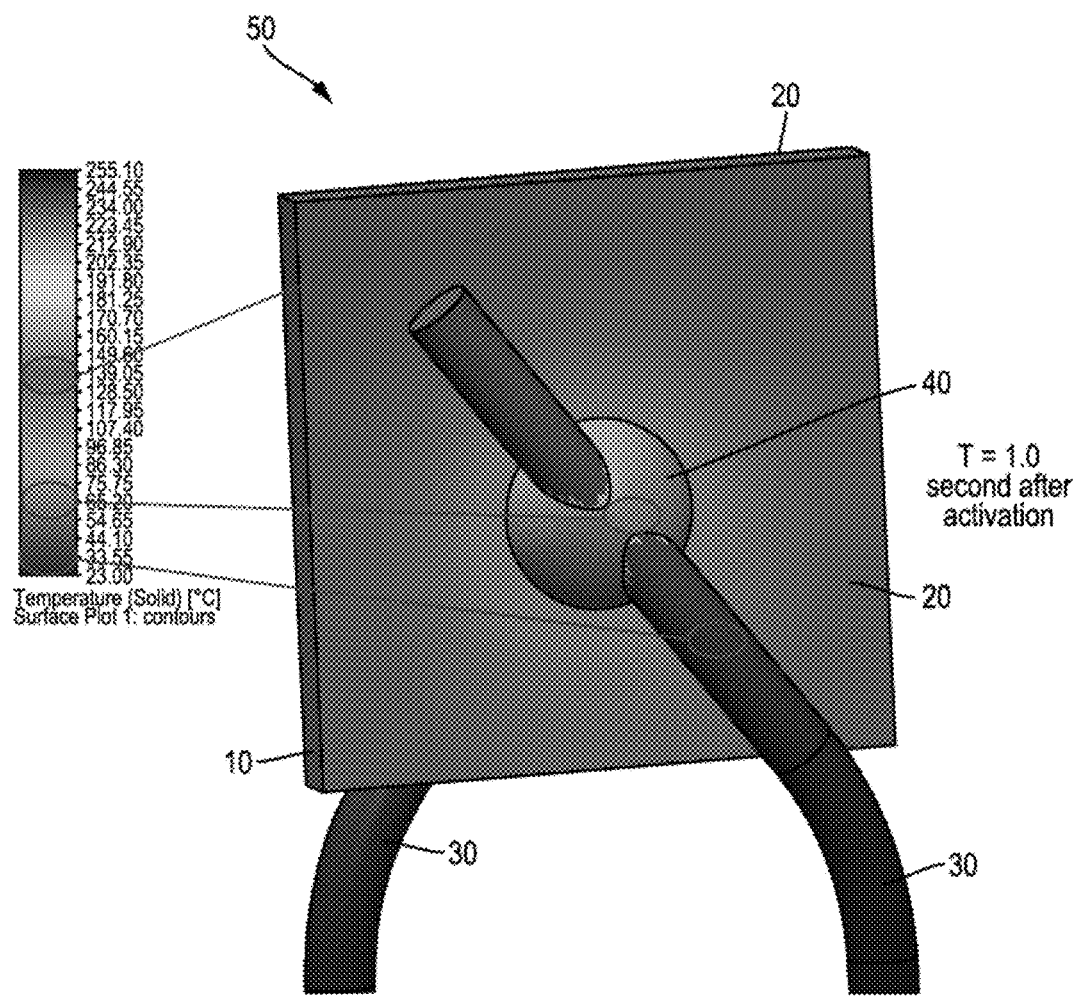
FIG. 14A-FIG. 14F illustrate modeled temperatures of an example PTCR heater.

FIG. 14A illustrates the temperature 1.0 second after activation by applying a current to the PTCR heating element 50. The violet colored conductive leads 30 are still about 25° C. The majority of the PTCR material 10 and conductive layer 20 has increased in temperature to about 120° C., with the area including connection 40 in the center being slightly cooler at a temperature around 80° C.

Figure 14B:
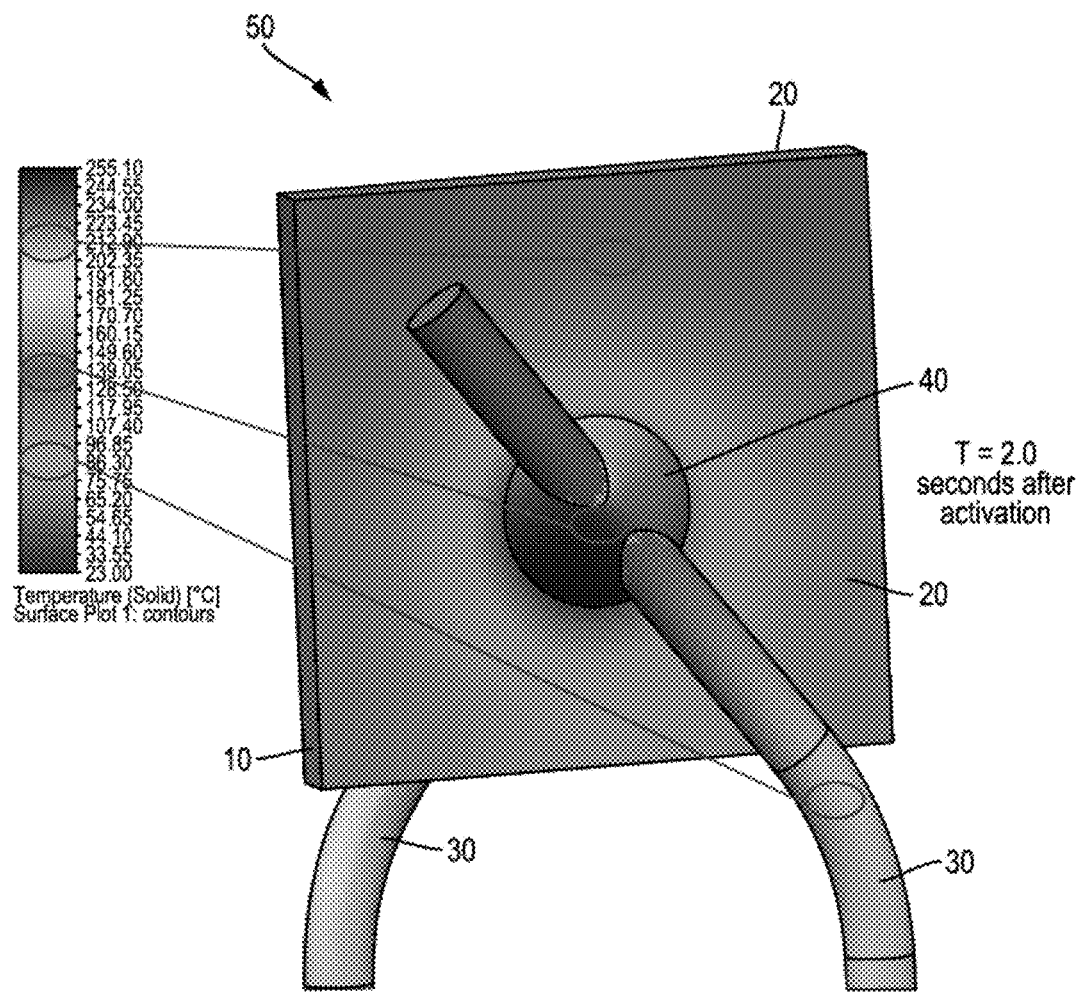

FIG. 14B illustrates the temperature 2.0 seconds after activation by applying a current to the PTCR heating element 50. The blue/green colored conductive leads 30 have increased in temperature to about 90° C. The majority of the PTCR material 10 and conductive layer 20 has increased in temperature to about 210° C., with the area including connection 40 in the center being cooler at a temperature around 160° C.

Figure 14C:
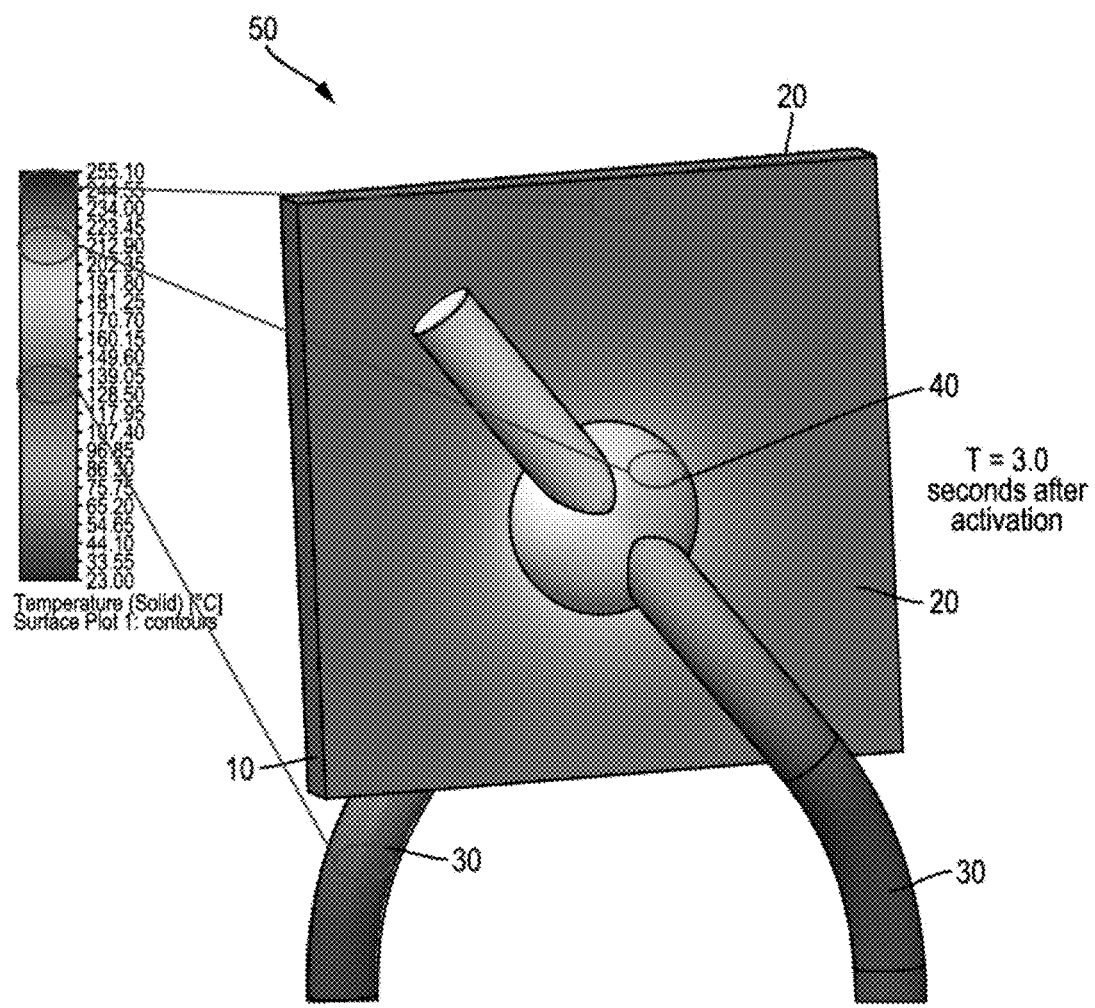

FIG. 14C illustrates the temperature 3.0 seconds after activation by applying a current to the PTCR heating element 50. The green colored conductive leads 30 have increased in temperature to about 140° C. The majority of the PTCR material 10 and conductive layer 20 has increased in temperature to about 250° C., with the area including connection 40 in the center being cooler at a temperature around 200° C.

Figure 14D:
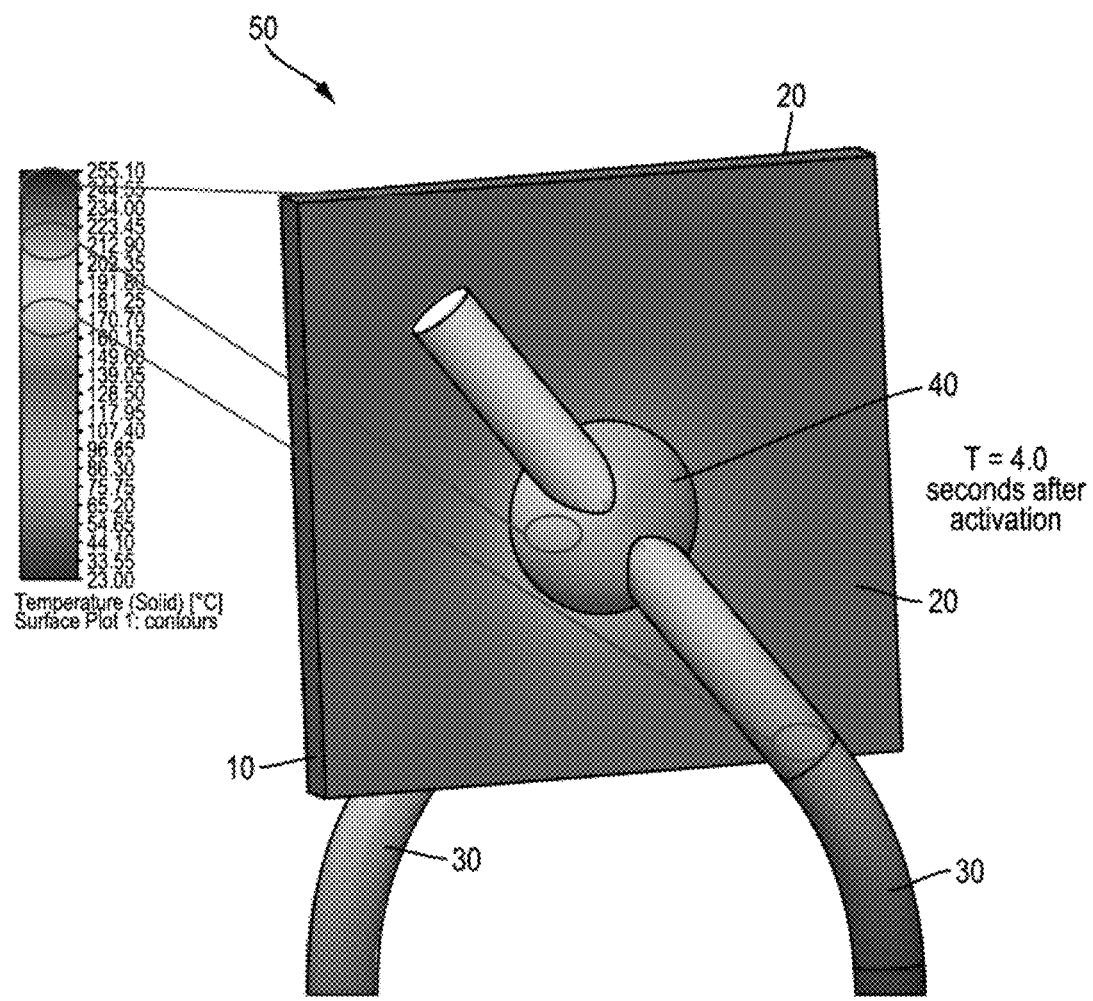

FIG. 14D illustrates the temperature 4.0 seconds after activation by applying a current to the PTCR heating element 50. The green colored conductive leads 30 have increased in temperature to about 160° C. The majority of the PTCR material 10 and conductive layer 20 remains at temperature to about 250° C., with the area including connection 40 in the center being cooler at a temperature around 215° C.

Figure 14E:
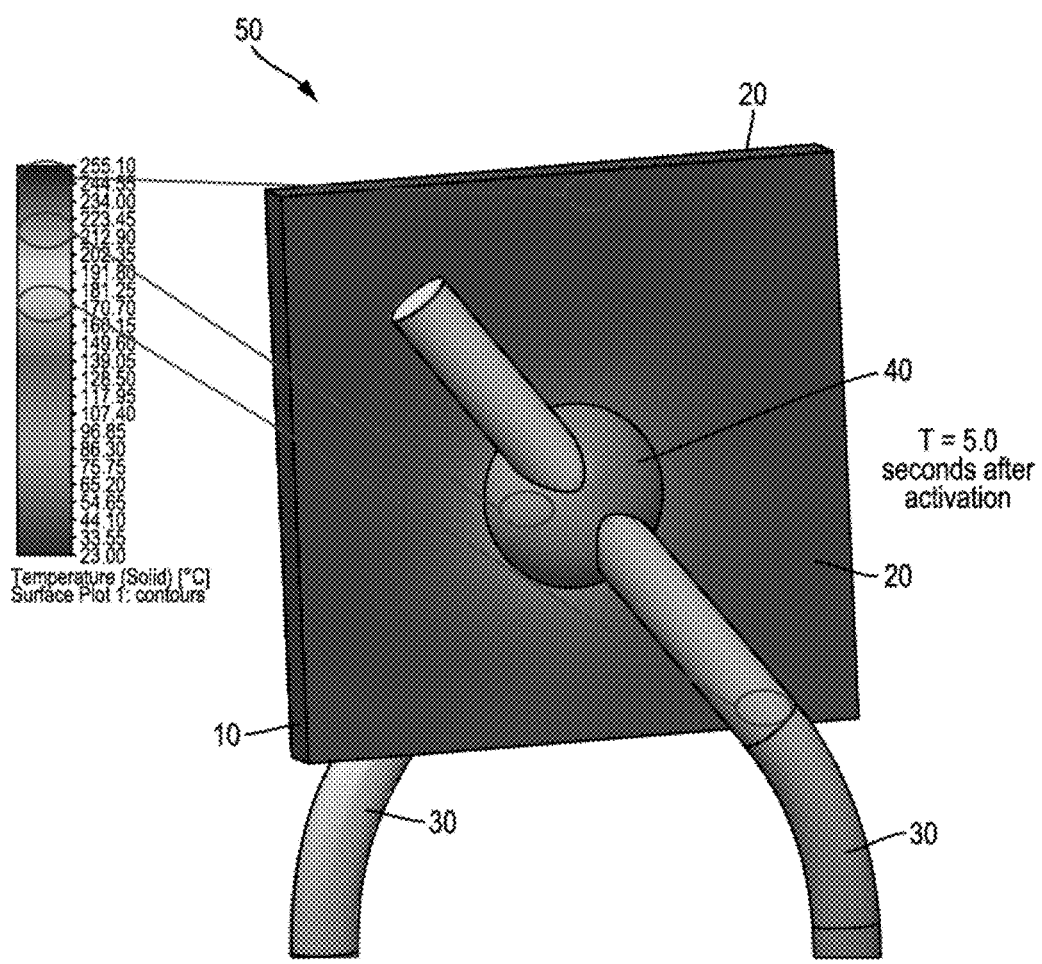

FIG. 14E illustrates the temperature 5.0 seconds after activation by applying a current to the PTCR heater 50. The green/yellow colored conductive leads 30 have increased in temperature to about 180° C. The majority of the PTCR material 10 and conductive layer 20 remains at temperature to about 250° C., with the area including connection 40 in the center being slightly cooler at a temperature around 225° C.

Figure 14F:
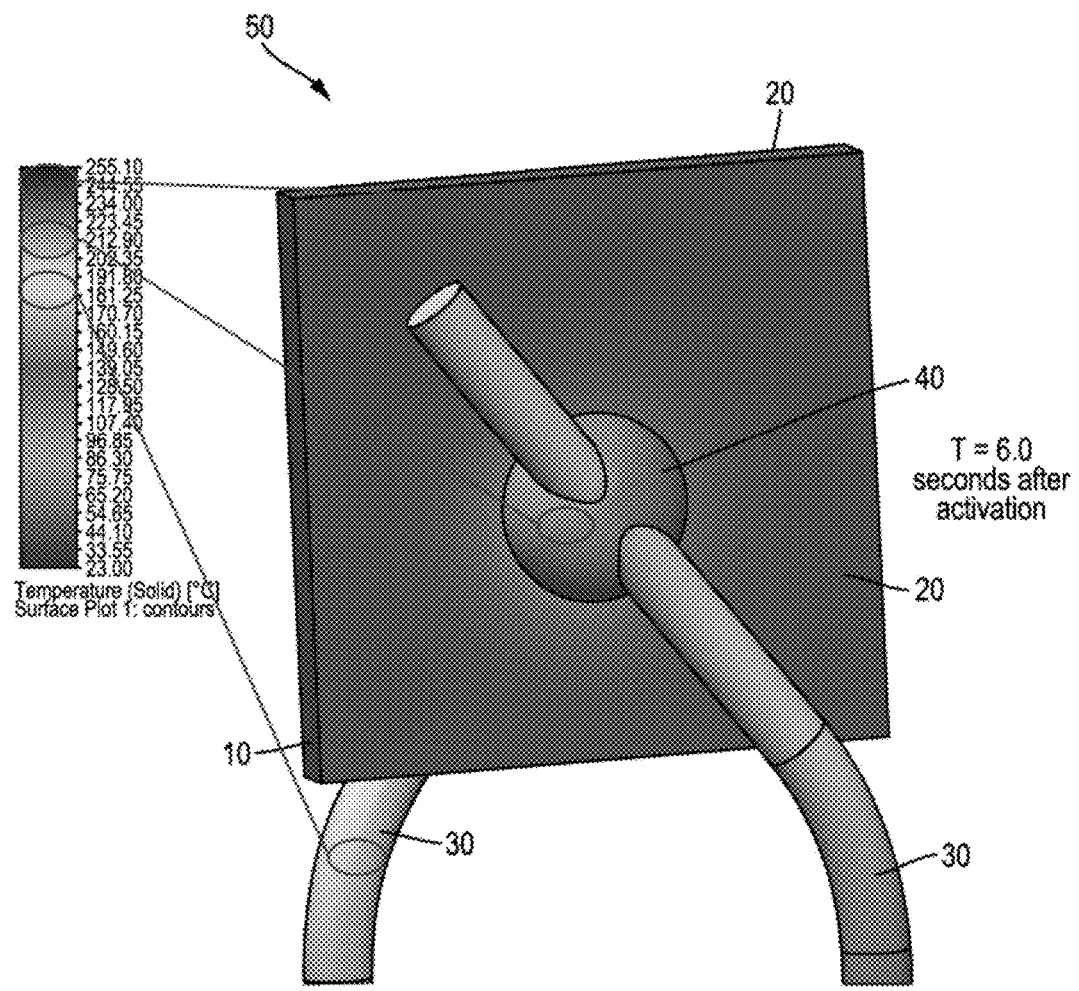
Figure 15:
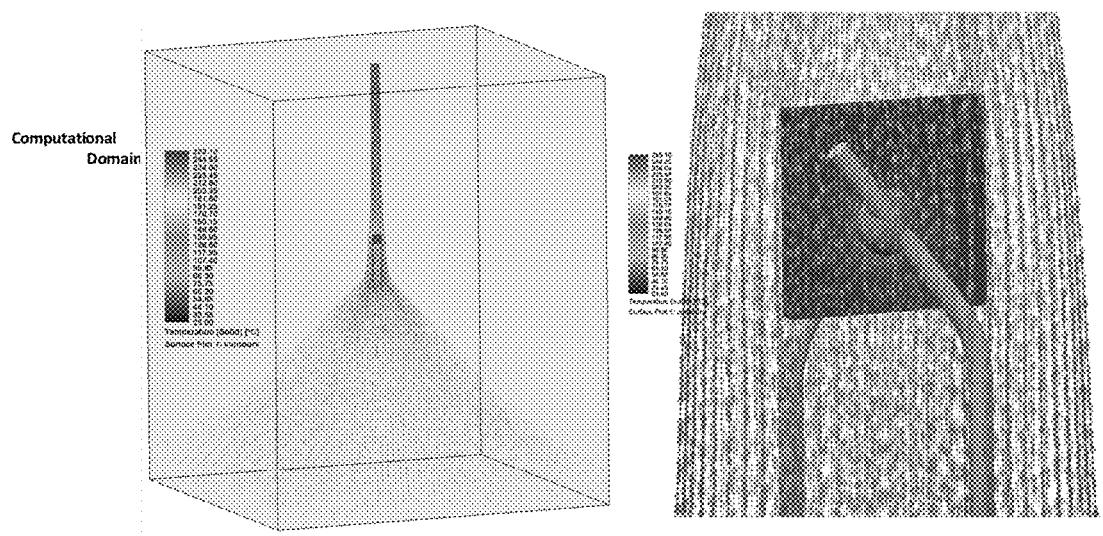
FIG. 15 illustrates modeled temperatures of an example heater 6.0 seconds after application of a voltage in a free convective state.

FIG. 14F illustrates the temperature 6.0 seconds after activation by applying a current to the PTCR heating element 50. The yellow colored conductive leads 30 have increased in temperature to about 200° C. The majority of the PTCR material 10 and conductive layer 20 remains at temperature to about 250° C., with the area including connection 40 in the center being just slightly cooler at a temperature around 235° C. FIG. 15 illustrates modeled temperatures of an example heater 6.0 seconds after application of a voltage in a free convective state.

Figure 16A:
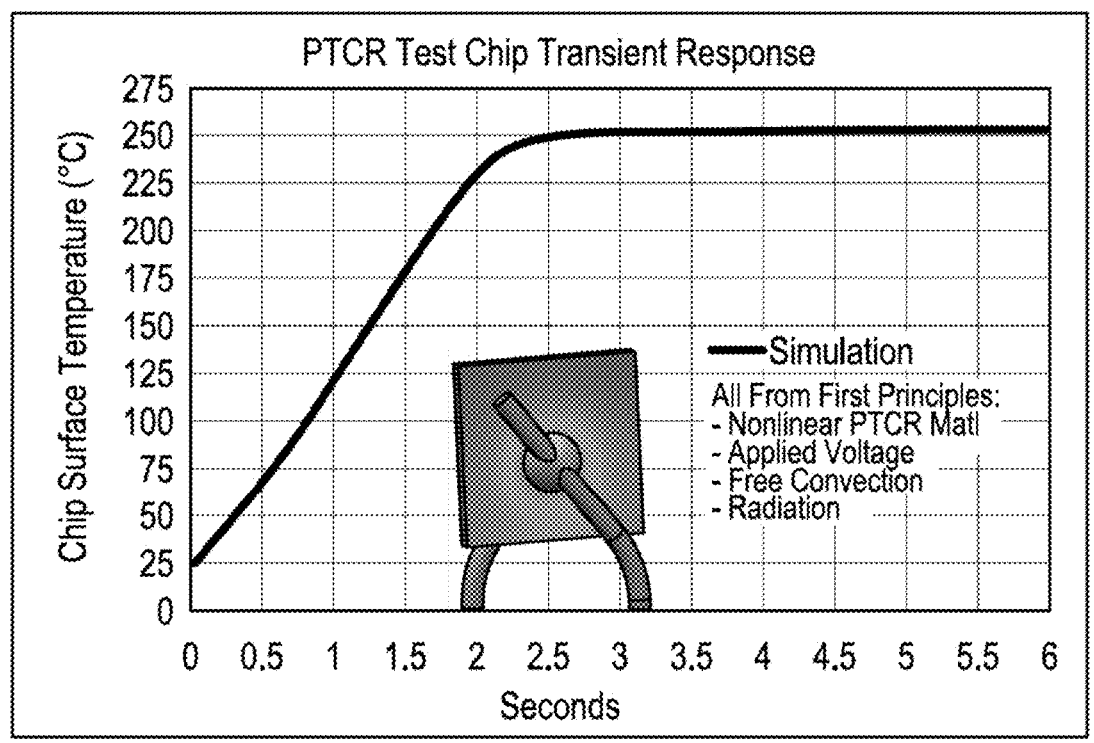
FIG. 16A illustrates a modeled surface temperature as a function of time for an example heater.

FIG. 16A illustrates a modeled surface temperature as a function of time for an example PTCR heating element. In the model, the surface temperature of the PTCR heater starts at 25° C. (i.e. room temperature) at time zero. After an electrical current is applied, the surface temperature increases linearly for about 2 seconds to a temperature of about 225° C. After about 2 seconds, the rate of the temperature increase tapers off to a steady-state operating temperature of about 250° C. that is achieve about 3 seconds after activation. In the model, it was assumed that the nonlinear PTCR material is in a non-contact, free convective state, and the emitted radiation was measured from a distance. In implementations, the PTCR heating element is heated to an operating temperature between 240° C. and 280° C. In implementations, the PTCR heating element is heated to an operating temperature between 245° C. and 255° C. In implementations, the PTCR heating element is heated to an operating temperature about 250° C.

Figure 16B:
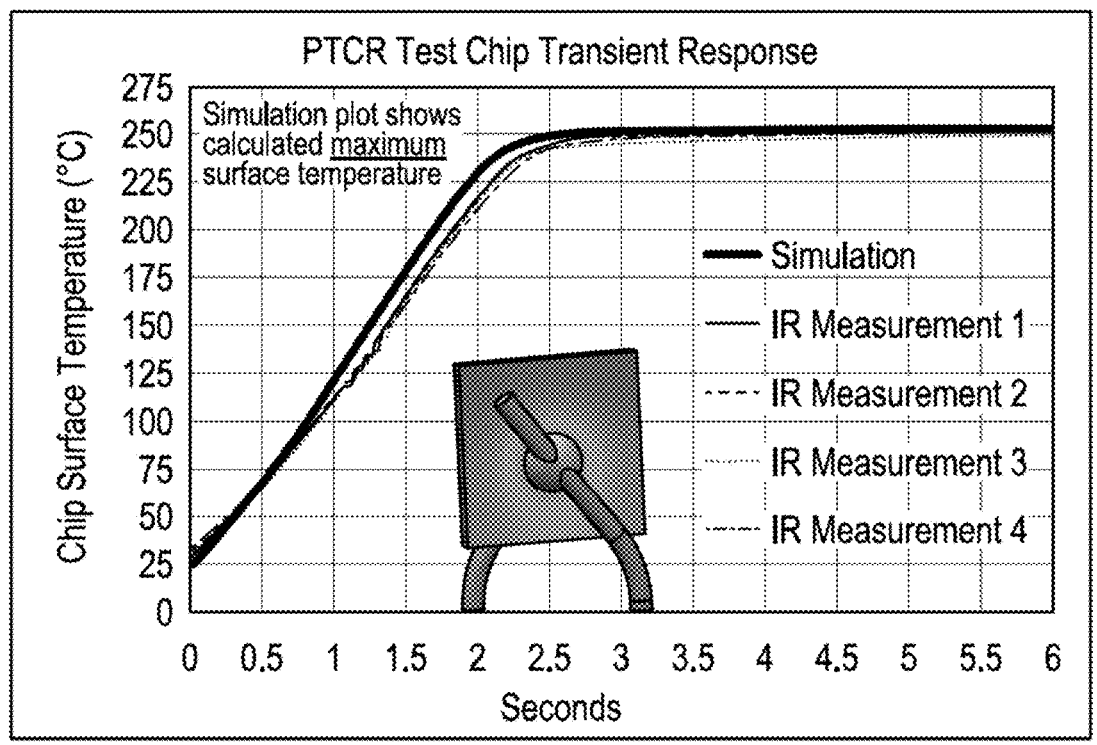
FIG. 16B illustrates a modeled and measured maximum surface temperatures as a function of time of an example heater.

FIG. 16B illustrates a modeled and measured maximum surface temperatures as a function of time for an example PTCR heater. Four measurements were repeated using an infrared camera to measure the maximum surface temperatures of the PTCR heater as a function of time, which were then plotted against the model of the maximum surface temperature. In the model, it was assumed that the nonlinear PTCR material is in a non-contact, free convective state and the emitted radiation was measured from a distance. In each case, the maximum surface temperature of the PTCR heating element starts at about 25° C. (i.e. room temperature) at time zero. After an electrical current is applied, the maximum surface temperature increases linearly for about 2 seconds to a temperature of about 225° C. After about 2 seconds, the rate of the temperature increase tapers off to a steady-state operating temperature of about 250° C. that is achieve about 3 seconds after activation. In implementations, the PTCR heating element is heated to an operating temperature between 240° C. and 280° C. In implementations, the PTCR heating element is heated to an operating temperature between 245° C. and 255° C. In implementations, the PTCR heating element is heated to an operating temperature about 250° C.

Figure 16C:
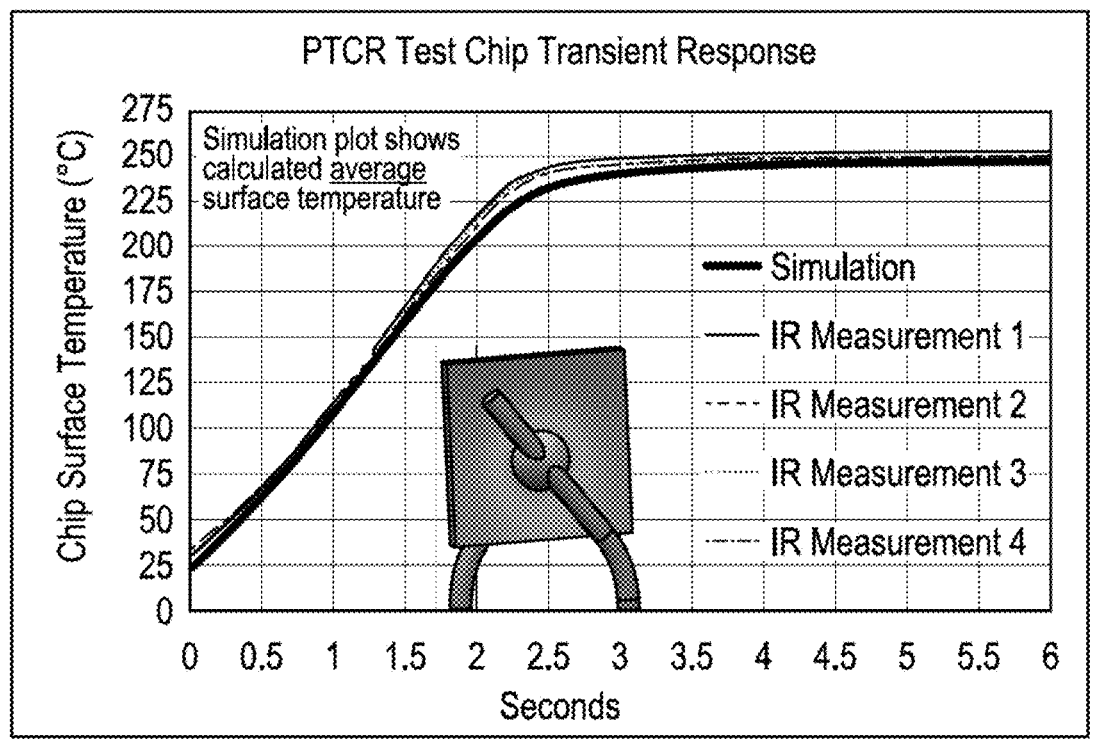
FIG. 16C illustrates a modeled and measured average surface temperatures as a function of time of an example heater.

FIG. 16C illustrates a modeled and measured average surface temperatures as a function of time for an example PTCR heating element. Four measurements were repeated using an infrared camera to measure the average surface temperatures of the PTCR heating element as a function of time, which were then plotted against the model of the average surface temperature. In the model, it was assumed that the nonlinear PTCR material is in a non-contact, free convective state and the emitted radiation was measured from a distance. In each case, the average surface temperature of the PTCR heating element starts at about 25° C. (i.e. room temperature) at time zero. After an electrical current is applied, the maximum surface temperature increases linearly for about 2 seconds to a temperature of about 225° C. After about 2 seconds, the rate of the temperature increase tapers off to a steady-state operating temperature of about 250° C. that is achieve about 3 seconds after activation. In implementations, the PTCR heating element is heated to an operating temperature between 240° C. and 280° C. In implementations, the PTCR heating element is heated to an operating temperature between 245° C. and 255° C. In implementations, the PTCR heating element is heated to an operating temperature about 250° C.

Figure 17:
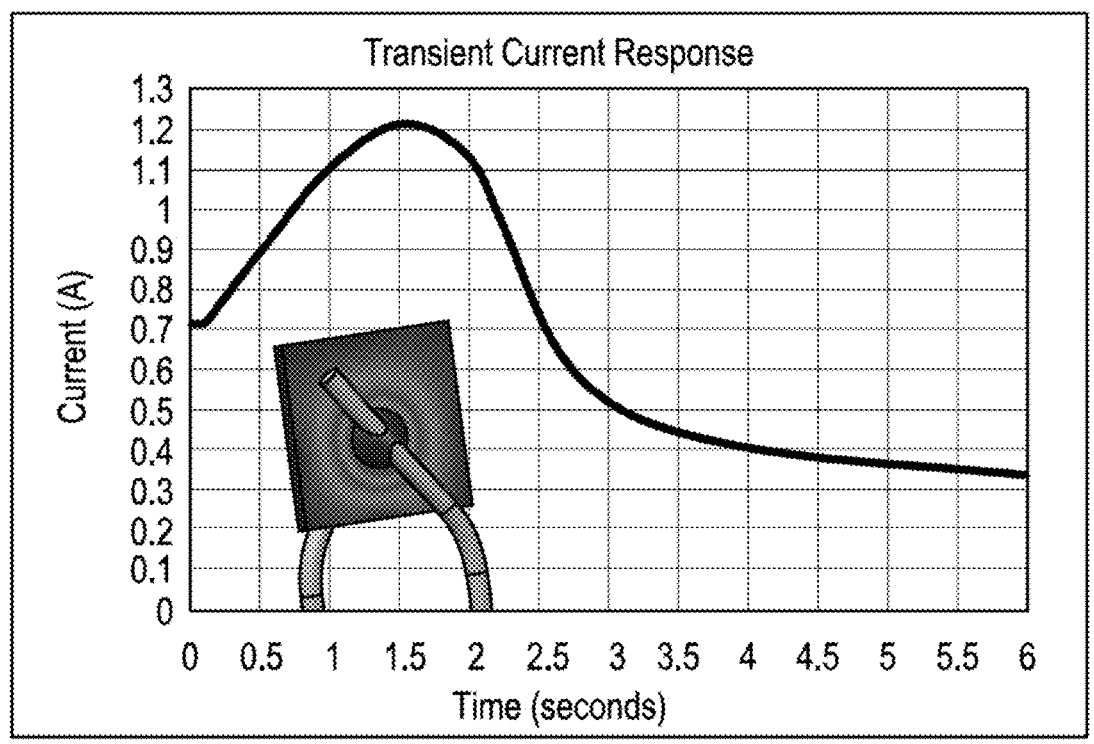
FIG. 17 illustrates a transient current response as a function of time for an example heater.

FIG. 17 illustrates a transient current response as a function of time of an example heater, consistent with implementations of the current subject matter. In the graph, the current is measured in amps, which increases at a near linear rate, and reaches a peak draw after about 1.5 seconds from activation. Thereafter, the resistance quickly increases to reduce the current draw as the PTCR heater achieves a self-regulating operating temperature.

Uniform temperature can be a desirable performance attribute of PTCR heaters, providing a distinct advantage over series coil heaters, including series heaters having power input controlled by temperature sensors, electronic circuits with microprocessors, and sophisticated algorithms dedicated to the purpose of temperature control. These existing series heaters can have overall power modulated in response to temperature measurement at a point or by average temperature estimated by overall electrical resistivity in combination with TCR (temperature coefficient of resistivity) of the typical series heating element. However, in some series heaters, temperatures within the series heater can vary by 40° C. or more because local differences in the thermal mass of the surrounding medium, and local differences in losses to the sounding medium, lead to variations in the local resistivity along the series heater.

In some implantations, a PTCR heater 50 constructed with material having a nonlinear PTCR resistivity vs. temperature curve the same or similar to that shown in FIG. 9, with parallel geometry such as that shown in FIGS. 12A-12B, and with an adequate (e.g., 3V to 6V) differential voltage applied to conductive leads 30, each of a given control volume within such a PTCR heater will have a temperature within a narrow range, typically less than 10° C. This can be achieved even with differential thermal loading. The less than 10° C. range can be tailored for vaporization by controlling the materials and geometric arrangement of the PTCR heating element.

Alternative PTCR heater designs and geometries are possible.

Figure 18:
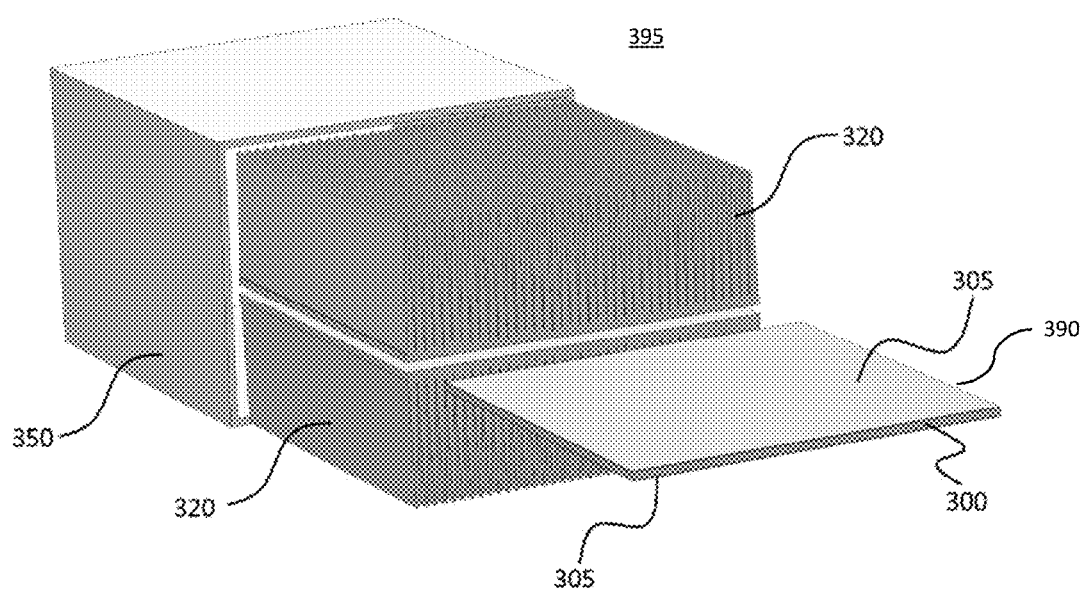
FIG. 18 is a perspective view of an example vaporizer assembly including a PTCR heater and heat exchanger elements that can enable convective heating and improved uniform heating of vaporizable materials.

In implementations, the PTCR heater can include a heat exchanger for the purpose of preheating air entering and passing through vaporizable materials. FIG. 18 is a perspective view of an example PTCR heater assembly 395 including a PTCR heater 390 and heat exchanger elements 320 that can enable convective heating and improved uniform heating of vaporizable materials.

The example PTCR heater assembly 395 (also referred to as a rectangular PTCR air heater assembly) includes PTCR heater 390 including a PTCR material 300 sandwiched between electrically conductive layers 305. In contact with the electrically conductive layers 305 are heat exchanger elements 320, which can be made of, for example, aluminum or other thermally conductive material. Heat exchanger elements 320 can be made from a thermally conductive material extrusion or assembly. In implementations, the heat exchanger elements 320 can be a metal foam, e.g. an aluminum foam. Heat exchanger elements 320 can be made by extruding, machining, milling, casting, foaming, printing, injection molding, forging, stamping, sintering, and other metal shaping methods. Surrounding heat exchanger elements 320 is heater assembly cover 350. In implementations, the heater assembly cover 350 comprises a non-electrically conductive material. In implementations, the heater assembly cover 350 comprises a non-thermally conductive material. In implementations, the heater assembly cover 350 comprises a metal with a non-electrically conductive coating isolating the heater assembly cover 350 from the heat exchanger elements 320. In implementations, the heater assembly cover 350 comprises polytetrafluoroethylene (PTFE).

Figure 19:
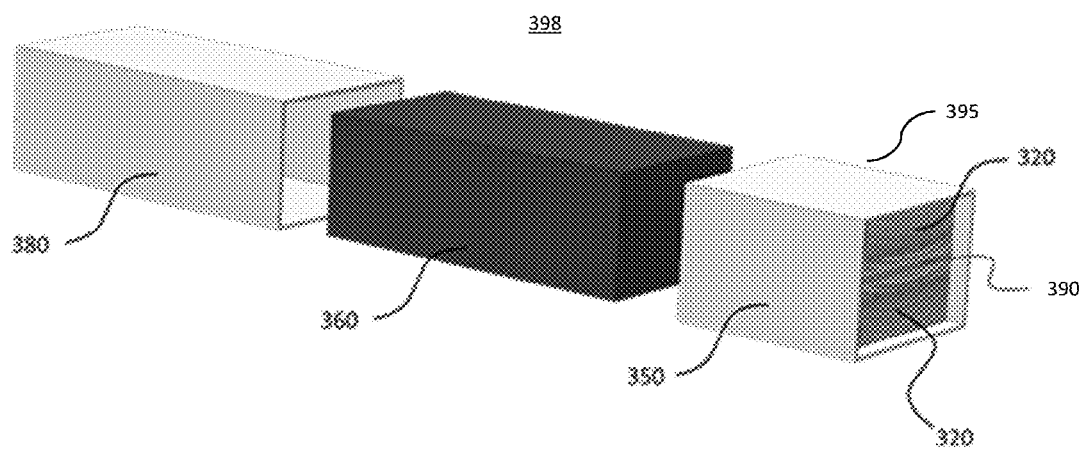
FIG. 19 is an exploded view of a rectangular PTCR vaporization device including an exploded view of the example vaporizer assembly.

FIG. 19 is an exploded view of a PTCR vaporization assembly 398 including an exploded view of the example PTCR heater assembly 395. In some implementations, the PTCR vaporization assembly 398 is rectangular. The PTCR vaporization assembly 398 includes the example PTCR heater assembly 395 and a product cover 380 for containing a disposable product 360. In some implementations, the product cover 380 and disposable product 360 are each rectangular. In implementations, the disposable product 360 within a product cover 380 can include a disposable containing a solid vaporizable material. In implementations, product cover 380 is a disposable liquid cartridge (e.g., pod) configured to contain a liquid vaporizable material. In implementations, product cover 380 is a disposable liquid cartridge (e.g., pod) including a first air inlet and/or wick, and is configured to contain a liquid vaporizable material.

Figure 20:
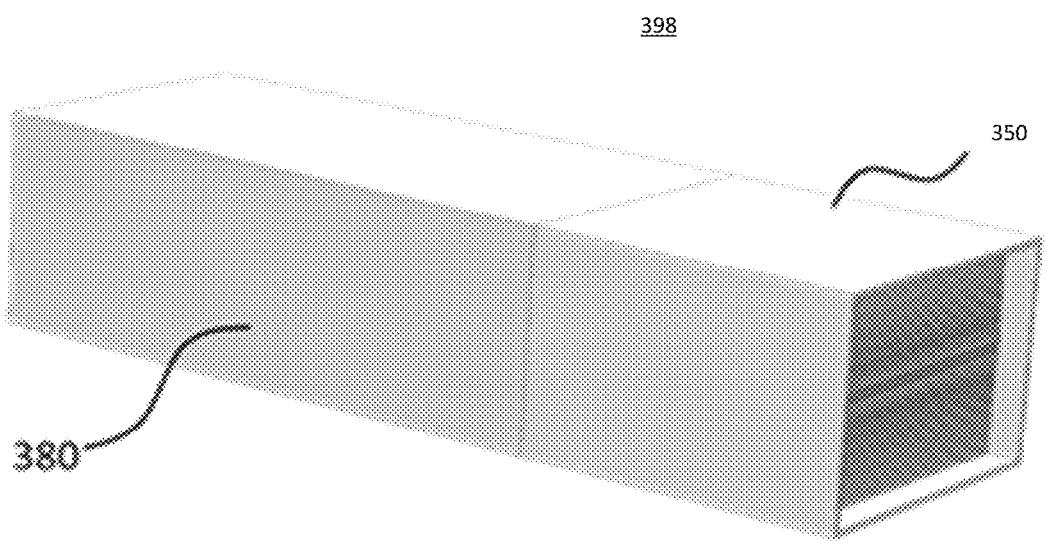
FIG. 20 is a perspective view of an example PTCR vaporization assembly.

FIG. 20 is a perspective view of an assembled example PTCR vaporization assembly 398. The product cover 380 containing the disposable product therein can be attached via an interference fit, press-fit, snap-fit coupling, magnetic coupling, adhesive, and other fastening means to the heater assembly cover 350, the PTCR heater assembly, and/or the adjoining segment on the opposite side of the product cover 380. The product cover 380 can be releasably attached such that it can be separated from the vaporizer device to replace the disposable product and then reassembled.

Figure 21:
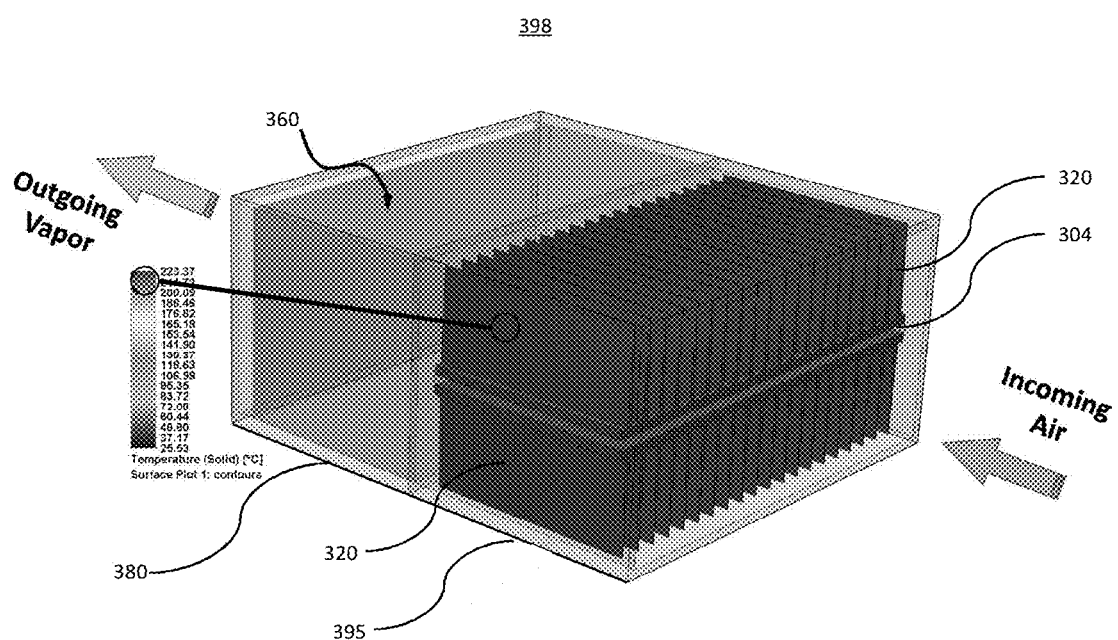
FIG. 21 is a perspective, transparent view of an example PTCR vaporization assembly and disposable rectangular product.

FIG. 21 is a perspective, transparent view of an example PTCR vaporization assembly 398 and disposable product 360. In implementations, the disposable product 360 and product cover 380 can include a disposable containing a solid vaporizable material. In implementations, the disposable product 360 and product cover 380 can include a disposable liquid cartridge (e.g., pod) containing a liquid vaporizable material. In implementations, the disposable product 360 and product cover 380 can include a disposable liquid cartridge (e.g., pod) having a first air inlet and/or wick, and contains a liquid vaporizable material. Though a PTCR heater is not shown in FIG. 21, the PTCR heater is inserted in the volume 304 between heat exchanger elements 320. Heat exchanger elements 320 provides an increased surface area for heating more of the incoming air, as compared to just having a PTCR heater (without heat exchanger) to heat the incoming air. Surrounding heat exchanger elements 320 is heater assembly cover 350. In implementations, the flow rate of the incoming air through the PTCR heater assembly 395 is about 1.4 liters per minute. The heat exchanger elements 320 can reach a steady state temperature of over 200° C. in order to rapidly heat the incoming air. The heat exchanger elements 320 can be designed to maximize the specific surface area ($mm^2/mm^3$), which provides for improved heat transfer from the PTCR heater to the heat exchanger elements 320, and also provides for improved heat transfer from the heat exchanger elements 320 to the incoming air. As shown in FIG. 21, heat exchanger elements 320 can be a finned design made from a thermally conductive material (e.g. metals such as aluminum, copper, steel, stainless steel, titanium).

Figure 22:
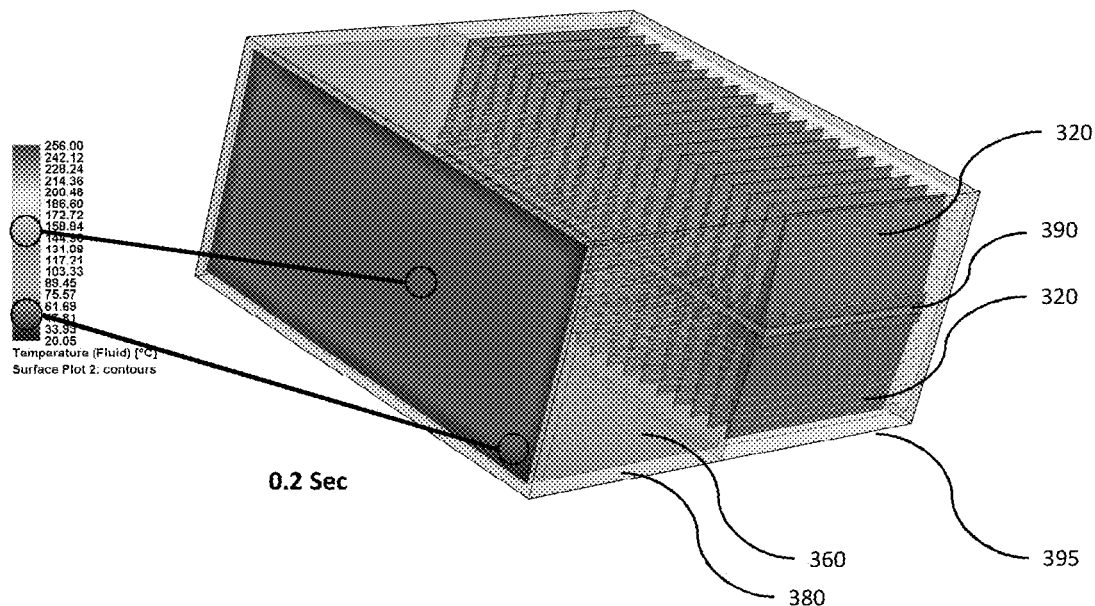
FIG. 22 is a perspective, transparent view of an example PTCR vaporization assembly and disposable rectangular product 0.2 seconds after activation.

FIG. 22 is a perspective, transparent view of an example PTCR vaporization assembly 398 and a disposable product 360 about 0.2 seconds after activation of the PTCR heater 390. PTCR heater 390 heats the heat exchanger elements 320, which transfer the heat to the air entering the PTCR heater assembly 395. The air exiting the PTCR heater assembly 395 has been heated to a temperature of between about 110° C. and about 160° C. The heated airflow flows through disposable product 360 (e.g. a tobacco containing media) at a flow rate of about 1.4 liters per minute. The vapor and/or aerosol exiting the PTCR vaporization assembly 398 contains the vaporized material released from the disposable product 360 at a temperature of between about 50° C. and about 150° C.

Figure 23:
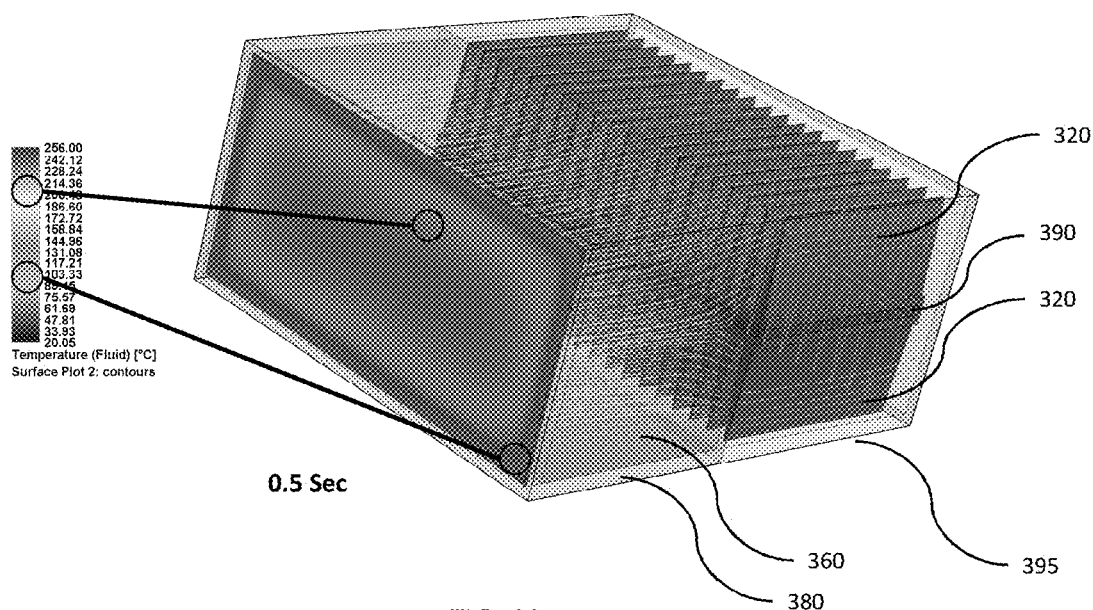
FIG. 23 is a perspective, transparent view of an example PTCR vaporization assembly and disposable rectangular product 0.5 seconds after activation.

FIG. 23 is a perspective, transparent view of an example PTCR vaporization assembly 398 and a disposable product 360 about 0.5 seconds after activation of the PTCR heater 390. PTCR heater 390 heats the heat exchanger elements 320, which transfer the heat to the air entering the PTCR heater assembly 395. The air exiting the PTCR heater assembly 395 has been heated to a temperature of between about 150° C. and about 210° C. The heated airflow flows through disposable product 360 (e.g. a tobacco containing media) at a flow rate of about 1.4 liters per minute. The vapor and/or aerosol exiting the PTCR vaporization assembly 398 contains the vaporized material released from the disposable product 360 at a temperature of between about 100° C. and about 210° C.

Figure 24:
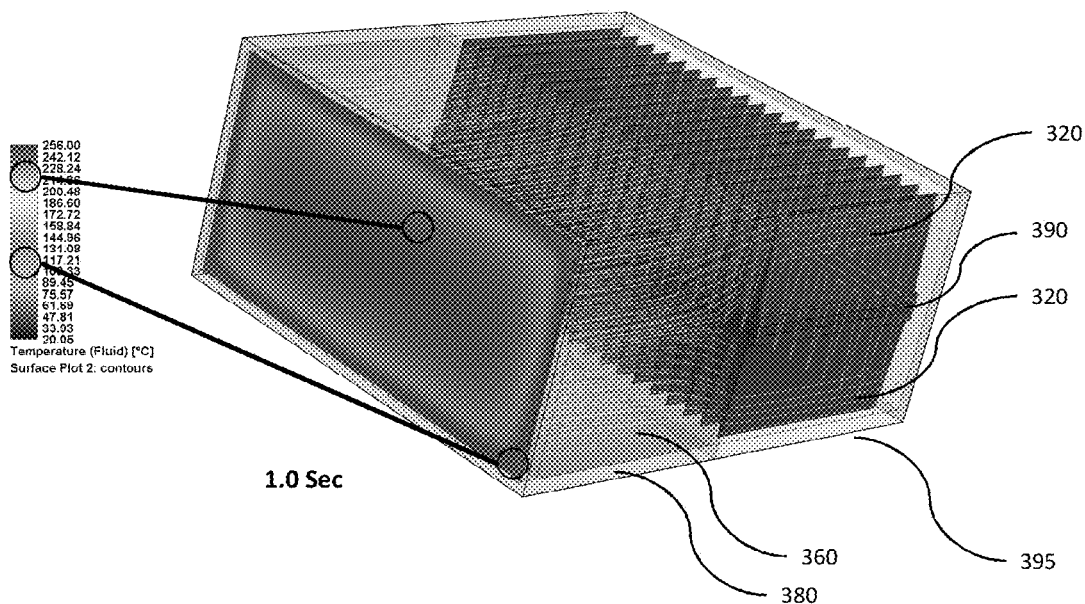
FIG. 24 is a perspective, transparent view of an example PTCR vaporization assembly and disposable rectangular product 1.0 seconds after activation.

FIG. 24 is a perspective, transparent view of an example PTCR vaporization assembly 398 and a disposable product 360 about 1.0 second after activation of the PTCR heater 390. PTCR heater 390 heats the heat exchanger elements 320, which transfer the heat to the air entering the PTCR heater assembly 395. The air exiting the PTCR heater assembly 395 has been heated to a temperature of between about 170° C. and about 230° C. The heated airflow flows through disposable product 360 (e.g. a tobacco containing media) at a flow rate of about 1.4 liters per minute. The vapor and/or aerosol exiting the PTCR vaporization assembly 398 contains the vaporized material released from the disposable product 360 at a temperature of between about 110° C. and about 220° C.

Figure 25:
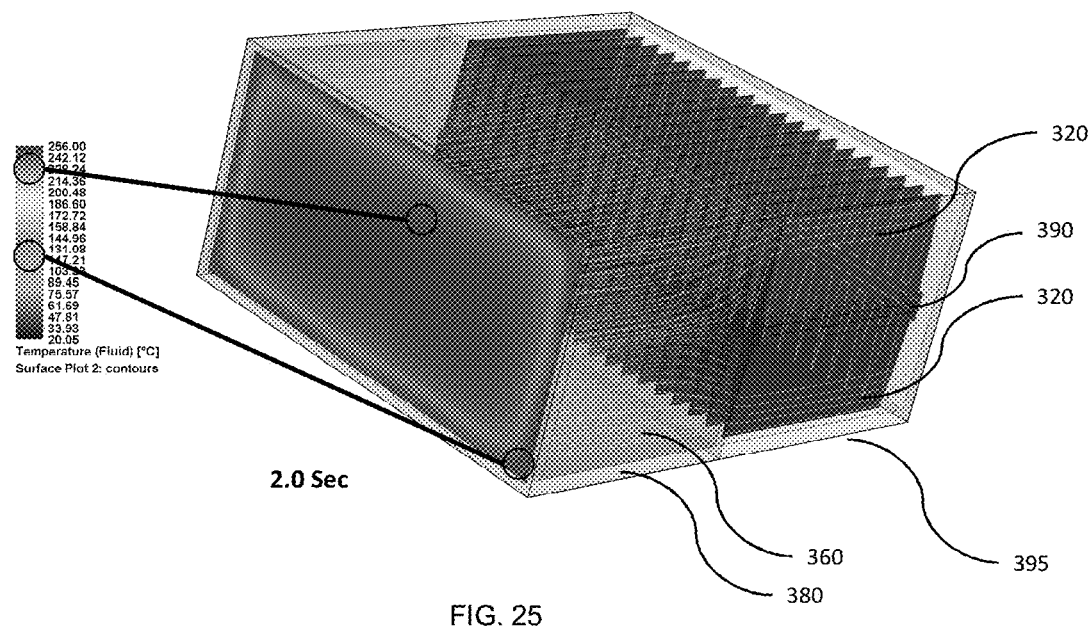
FIG. 25 is a perspective, transparent view of an example PTCR vaporization assembly and disposable rectangular product 2.0 seconds after activation.

FIG. 25 is a perspective, transparent view of an example PTCR vaporization assembly 398 and a disposable product 360 about 2.0 seconds after activation of the PTCR heater 390. PTCR heater 390 heats the heat exchanger elements 320, which transfer the heat to the air entering the PTCR heater assembly 395. The air exiting the PTCR heater assembly 395 has been heated to a temperature of between about 180° C. and about 240° C. The heated airflow flows through disposable product 360 (e.g. a tobacco containing media) at a flow rate of about 1.4 liters per minute. The vapor and/or aerosol exiting the PTCR vaporization assembly 398 contains the vaporized material released from the disposable product 360 at a temperature of between about 120° C. and about 230° C.

Figure 26:
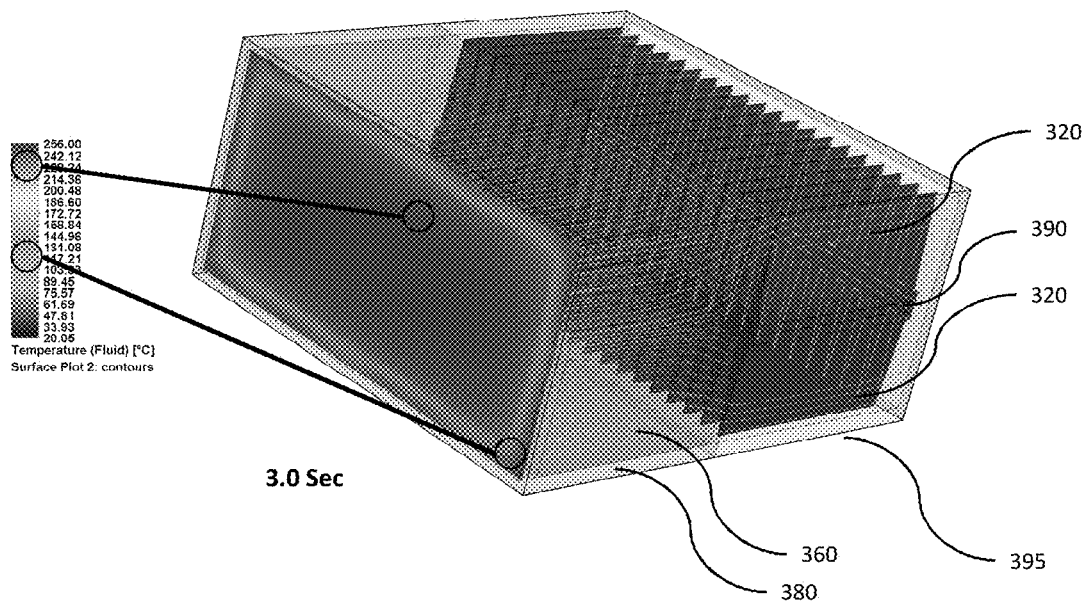
FIG. 26 is a perspective, transparent view of an example PTCR vaporization assembly and disposable rectangular product 3.0 seconds after activation.

FIG. 26 is a perspective, transparent view of an example PTCR vaporization assembly 398 and a disposable product 360 about 3.0 seconds after activation of the PTCR heater 390. PTCR heater 390 heats the heat exchanger elements 320, which transfer the heat to the air entering the PTCR heater assembly 395. The air exiting the PTCR heater assembly 395 has been heated to a temperature of between about 180° C. and about 240° C. The heated airflow flows through disposable product 360 (e.g. a tobacco containing media) at a flow rate of about 1.4 liters per minute. The vapor and/or aerosol exiting the PTCR vaporization assembly 398 contains the vaporized material released from the disposable product 360 at a temperature of between about 120° C. and about 230° C.

Figure 27:
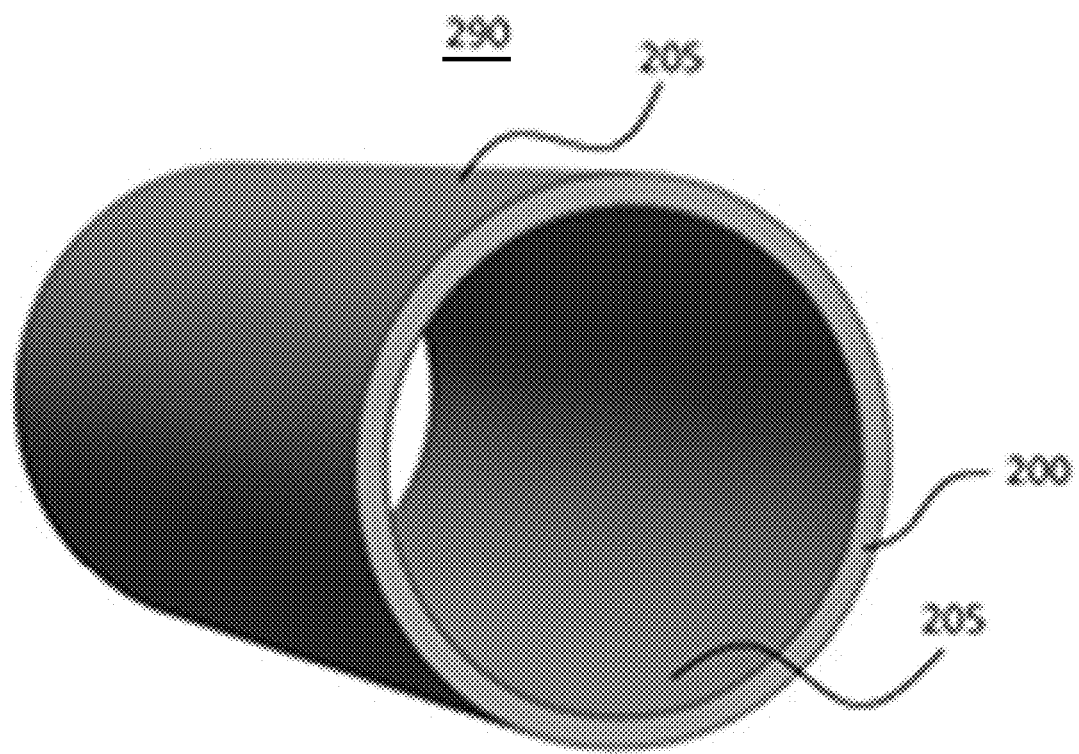
FIG. 27 is a perspective view of an example PTCR heater with cylindrical geometry.

The current subject matter is not limited to rectangular geometries. In implementations, the PTCR heater is a polygon that is not a rectangle. For example, alternative designs of a PTCR heater may depart from planar geometry in many possible configurations produced by extrusion or injection molding. For example, FIG. 27 is a perspective view of an example PTCR heater 290 with cylindrical geometry. In this example, PTCR heater 290 includes PTCR material 200 with surface conductive layers 205, each of which is cylindrical.

Figure 28:
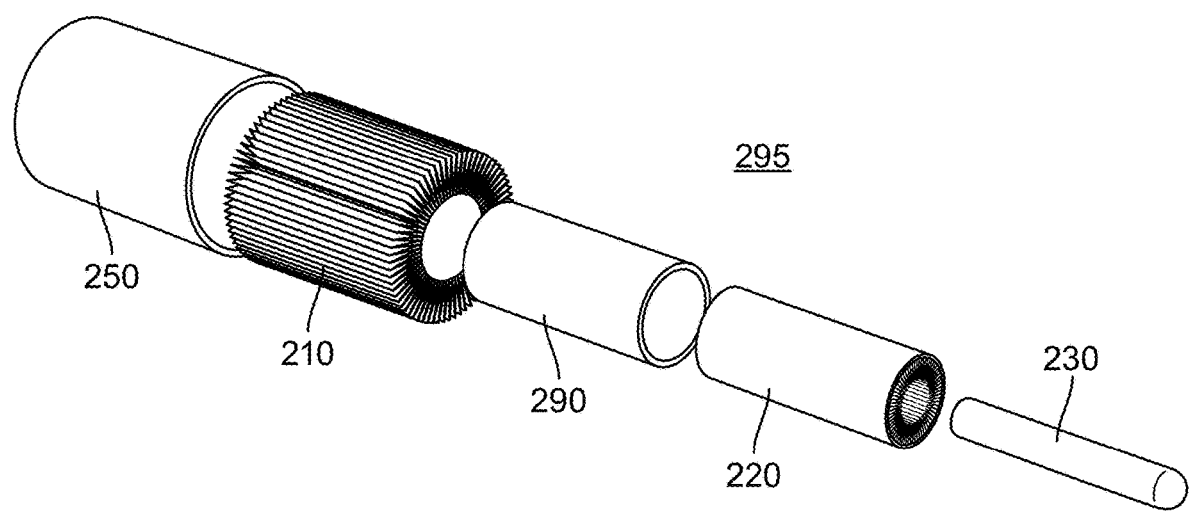
FIG. 28 is an exploded view illustrating a cylindrical example PTCR heater.
Figure 29:
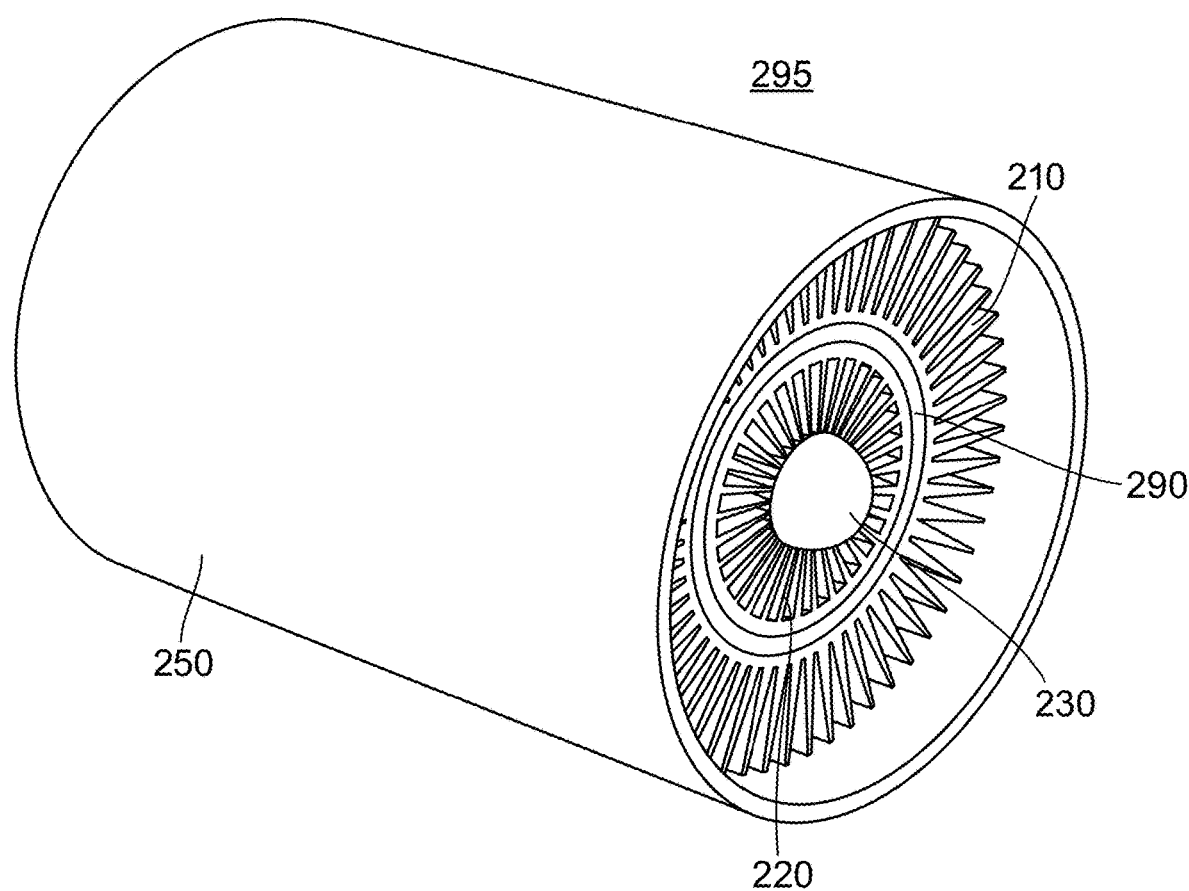
FIG. 29 is a perspective view of the example assembled PTCR heater.
Figure 30:
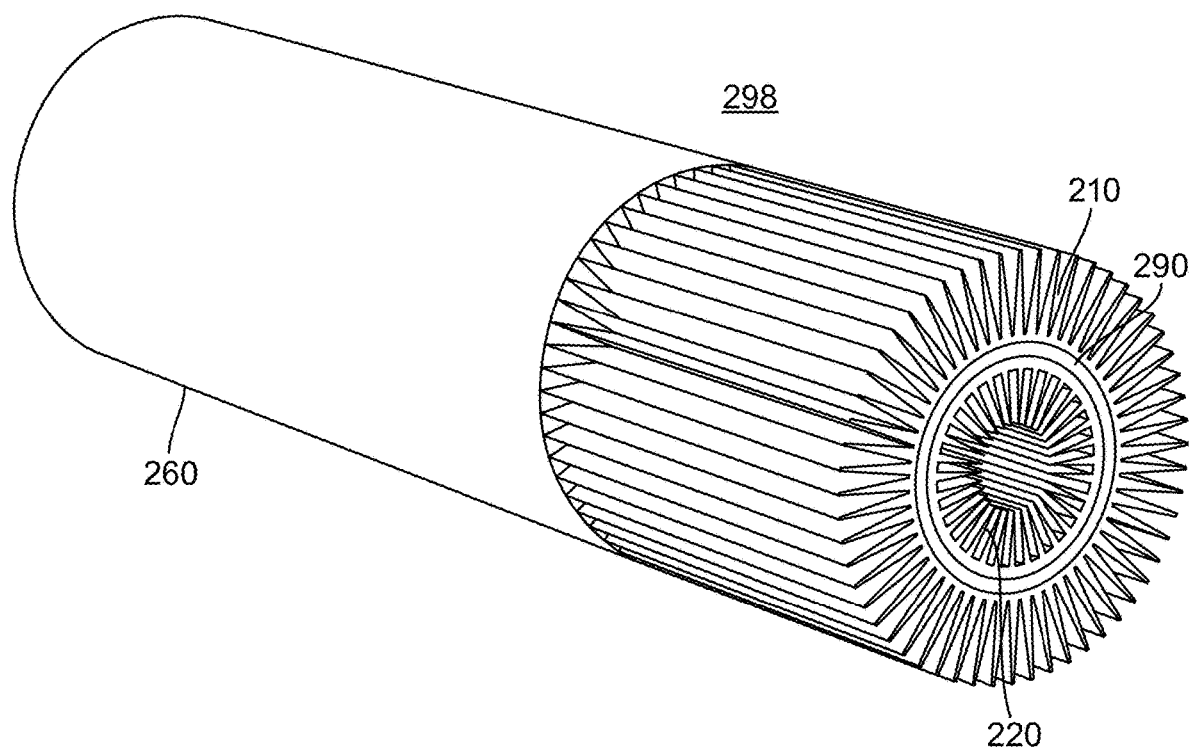
FIG. 30 is a perspective view of the example PTCR vaporization device with external covers and cylindrical flow diverter removed.

FIG. 28 is an exploded view illustrating an example PTCR heater assembly 295, which includes the example PTCR heater 290, external heat exchanger 210, internal heat exchanger 220, flow diverter 230, and Heater assembly cover 250, each of which is cylindrical. FIG. 29 is a perspective view of the example PTCR heater assembly 295. FIG. 30 is a perspective view of the example PTCR vaporization assembly 298 with external covers and flow diverter 230 removed, thereby showing orientation of PTCR heater 290, external heat exchanger 210 and internal heat exchanger 220 aligned with disposable product 260.

Figure 31:
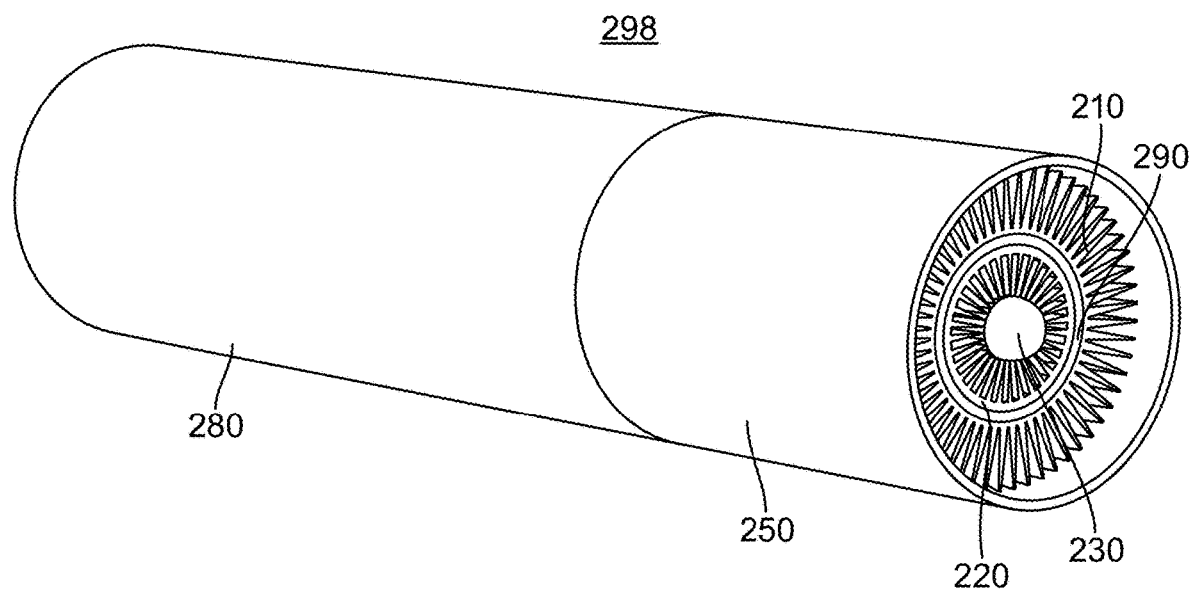
FIG. 31 is a perspective view of the example PTCR vaporization device.

FIG. 31 is a perspective view of the example PTCR vaporization assembly 298 including the PTCR heater 290, external heat exchanger 210, internal heat exchanger 220, flow diverter 230, Heater assembly cover 250, and product cover 280 (which, in FIG. 18, obscures disposable product 260).

FIG. 32 is a plot of the logarithm of resistivity of an example vaporization device with PTCR heater as a function of temperature. The performance illustrated in FIG. 32 is according to example calculations characterizing a performance of an example implementation of a cylindrical PTCR vaporization assembly 298. The example PTCR vaporization assembly 298 is a HNB device, with solid vaporizable material (e.g. HNB product) as the disposal product 260, treated in the calculation as a porous medium, with specific area by mass $S_m \cong 10000$ cm$^2$/g, density $\rho \cong 300$ kg/m$^3$. Convective heat transfer constant $h \cong 2.0$ W/m$^2$K. Surface area by volume can be calculated as $S_{vol} = S_m \times \rho = 10000$ cm$^2$/g$\times 1000$ g/kg$\times$m$^2$/10000 cm$^2$, and $S_{vol} \cong 1000$ m$^2$/kg from which volumetric heat exchange coefficient v=h $\rho$ $(S_{vol}) \cong 6.0$ E5 W/m$^3$K.

For the calculations, ambient conditions were 20.05° C. at standard pressure of 1 atmosphere. Input airflow rate was constant at 1.4 l/m, applied voltage was constant 3.7 volts across opposing electrically conductive layers 205. No electric current restrictions were applied beyond PTCR behavior shown in FIG. 32.

The calculated vaporization device with PTCR heater included electrically conductive layers 205 that were silver, a cylindrical external heat exchanger 210 and a cylindrical internal heat exchanger 220 that were aluminum extrusions, flow diverter 230 and Heater assembly cover 250 were made from PTFE, and product cover 280 was made from paper.

Figure 33:
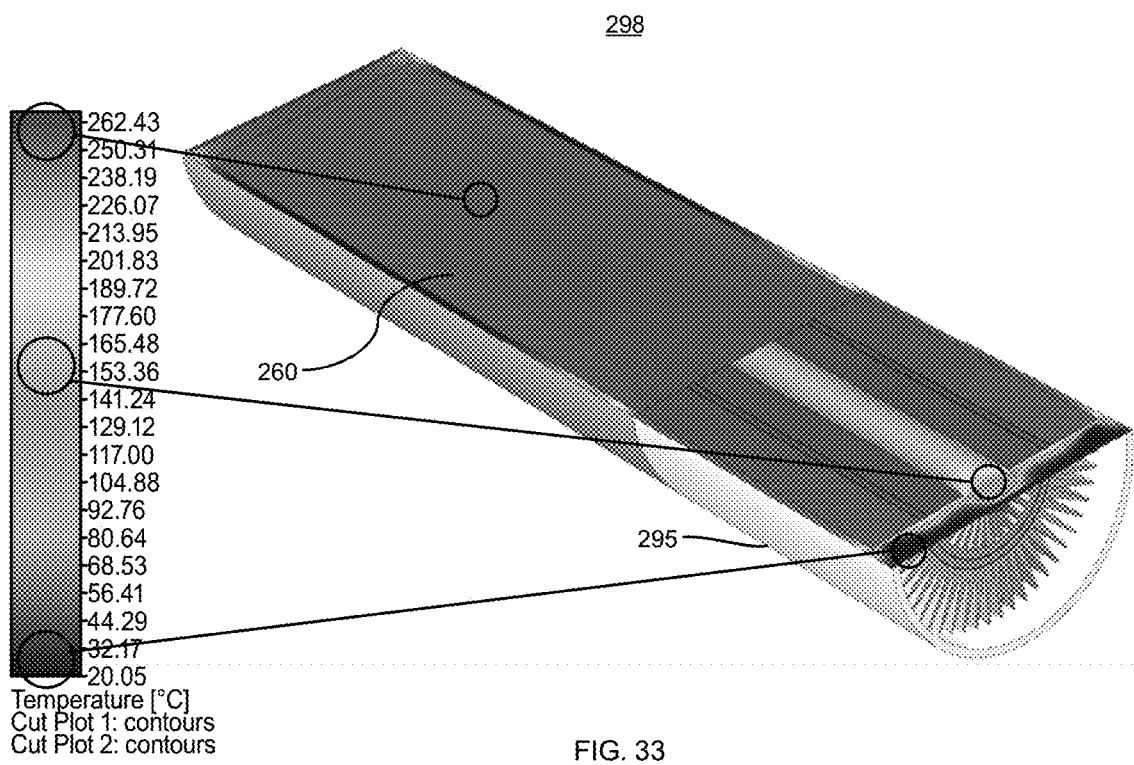
FIG. 33 is a cross sectional plot showing temperature simulations of the example implementation of the cylindrical vaporization device with PTCR heater.
Figure 34A:
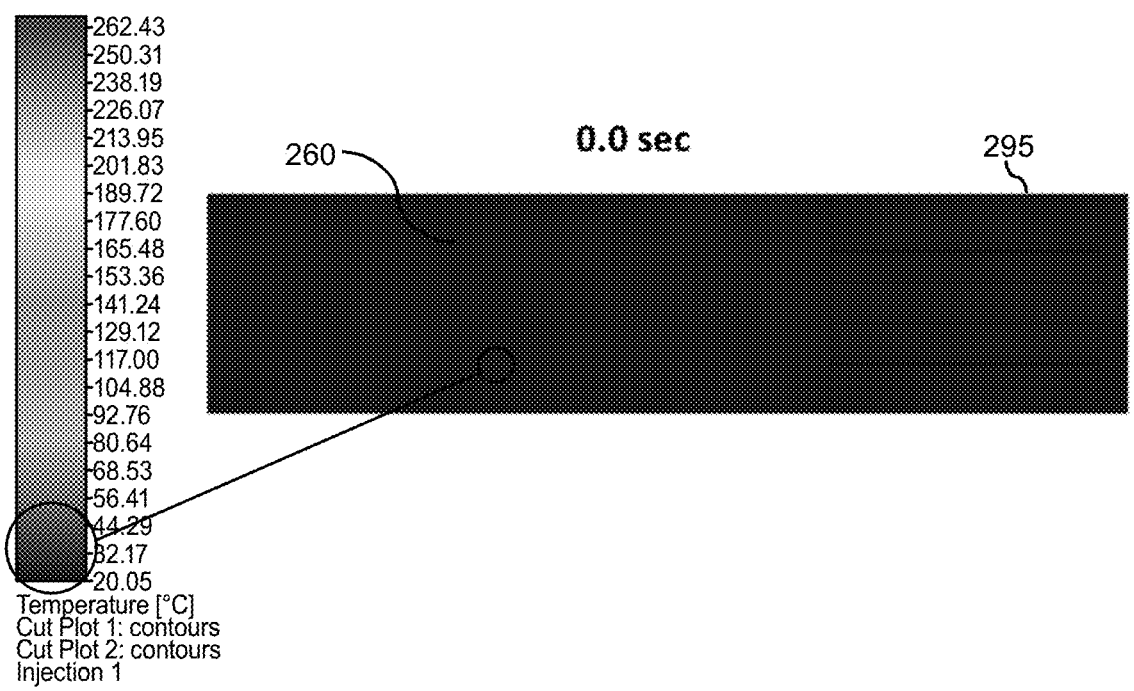
FIGS. 34A-34G are cut plots showing transient response of temperature as color for an example implementation of the cylindrical vaporization device with PTCR heater.
Figure 34B:
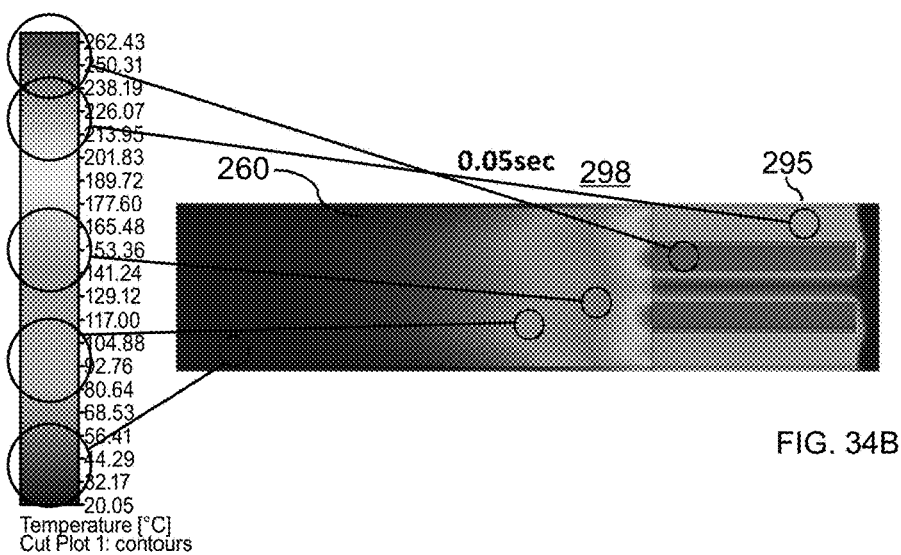
Figure 34C:
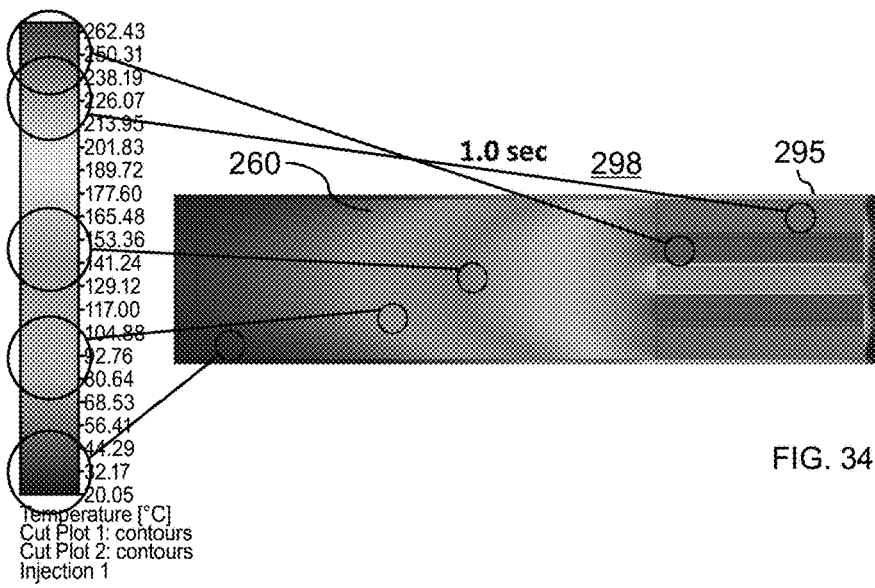
Figure 34D:
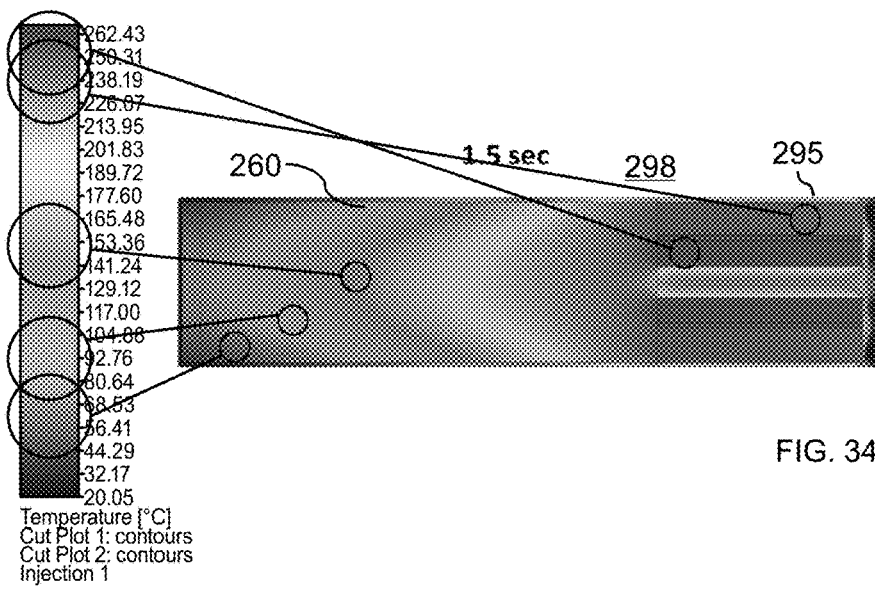
Figure 34E:
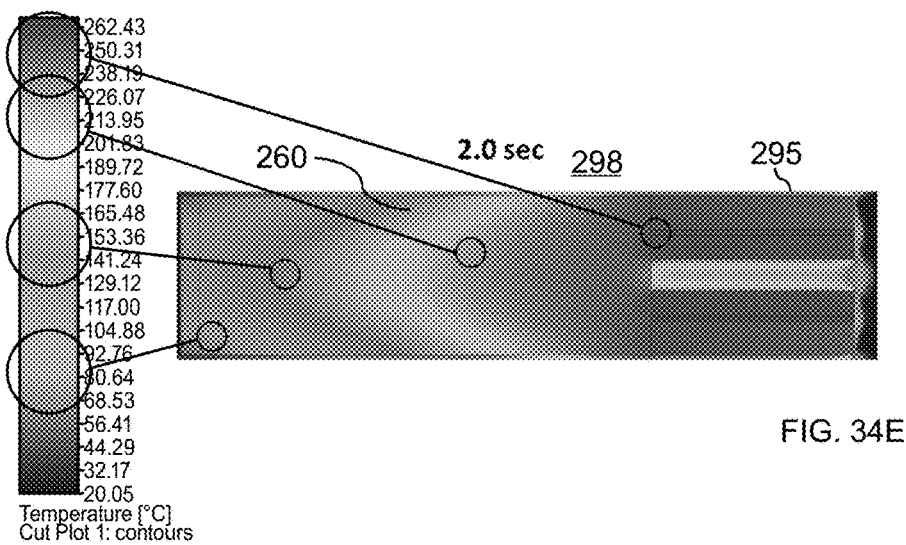
Figure 34F:
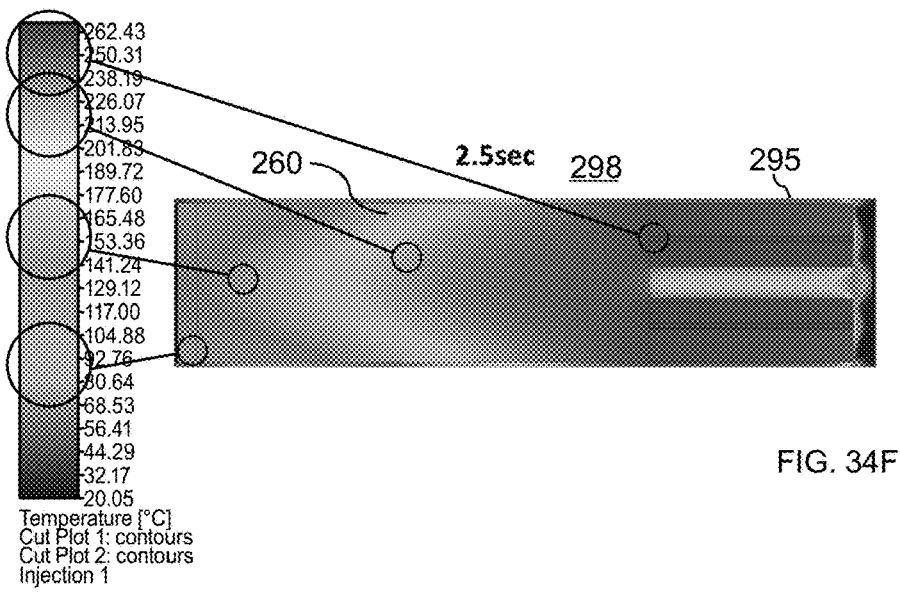
Figure 34G:
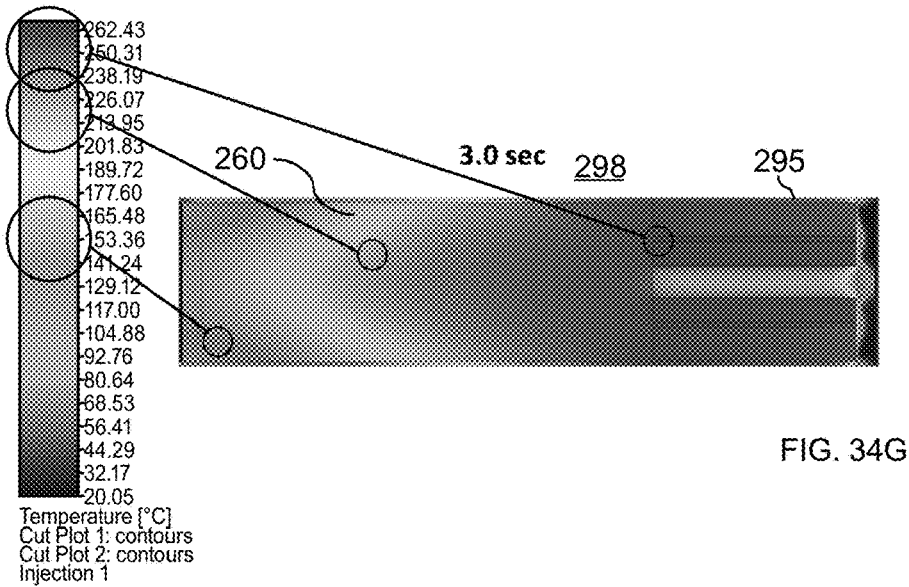

FIG. 33 is a cross sectional plot showing temperature simulations of the example implementation of the PTCR vaporization assembly 298 that is also described above with respect to FIG. 32. The PTCR vaporization assembly 298 includes a PTCR heater assembly 295 for heating of a disposal product (e.g. a solid vaporizable material) 260. FIGS. 34A-34G are cut plots showing transient response of temperature as color for the example implementation of the PTCR vaporization assembly 298 with PTCR heater assembly 295. FIGS. 34A-34G demonstrate that temperatures everywhere never exceed 280° C., well below combustion temperature of disposable product 260. It can also be seen in FIGS. 34A-34G that heating of disposal product (e.g. a solid vaporizable material) 260 proceeds in a wave from upstream to downstream such that cross-sectional hot spots and resulting differential porosity voids are eliminated.

Figure 35:
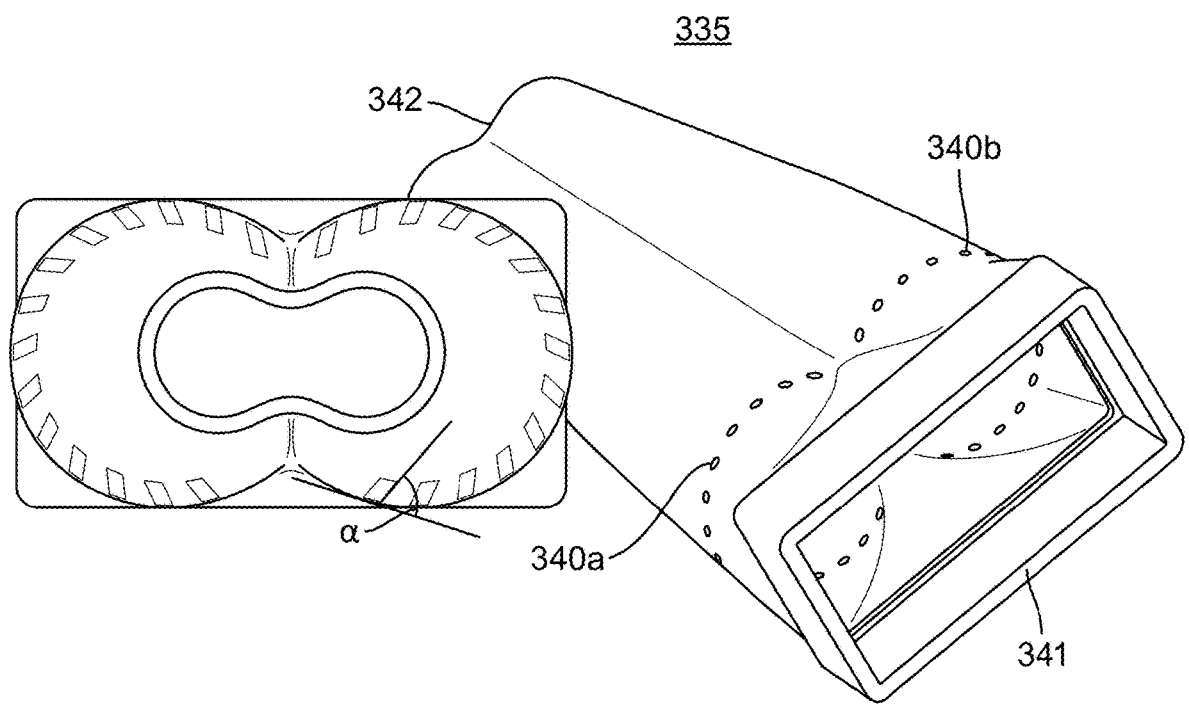
FIG. 35 shows a perspective view and an end view of a mouthpiece including a plurality of air inlets.

FIG. 35 shows a perspective view and an end view of a mouthpiece 335 having a vapor inlet 341, an aerosol outlet 342, and a plurality of air inlets. The plurality of air inlets includes first plurality of air inlets 340a and a second plurality of air inlets 340b. The first plurality of air inlets 340a includes 14 holes (with each hole being an air inlet) and the second plurality of air inlets 340b includes another 14 holes (with each hole being an air inlet). In some implementations, the first plurality of air inlets 340a includes between 4 and 24 holes and the second plurality of air inlets 340b includes between 4 and 24 holes. Each hole of the plurality of air inlets can be circular and have a diameter of about 0.4 mm. In some implementations, each hole of the plurality of air inlets can be circular and have a diameter of between about 0.2 mm and about 0.6 mm. Each hole of the plurality of air inlets can be arranged in a plane. Each hole can be formed through a thickness of the mouthpiece 335 at an angle $\alpha$ of about 30 degrees from an exterior surface of the mouthpiece 335. In some implementations, each hole can be formed through a thickness of the mouthpiece 335 at an angle $\alpha$ of between about 15 degrees and 45 degrees from an exterior surface of the mouthpiece 335. The angle $\alpha$ of each hole of the first plurality of air inlets 340a can each have an interior of the angle $\alpha$ that open towards the same direction relative to the interior of the angle for an adjacent hole. The angle $\alpha$ of each hole of the second plurality of air inlets 340b can each have an interior of the angle $\alpha$ that open towards the same direction relative to the interior of the angle for an adjacent hole. The mouthpiece 335 can be tapered from the vapor inlet 341 to the aerosol outlet 342. A cross-sectional area of the vapor inlet 341 can be at least four times greater than a cross-sectional area of the aerosol outlet 342. In some implementations, a cross-sectional area of the vapor inlet 341 can be from about 1.5 times to 6 times greater than a cross-sectional area of the aerosol outlet 342.

Figure 36:
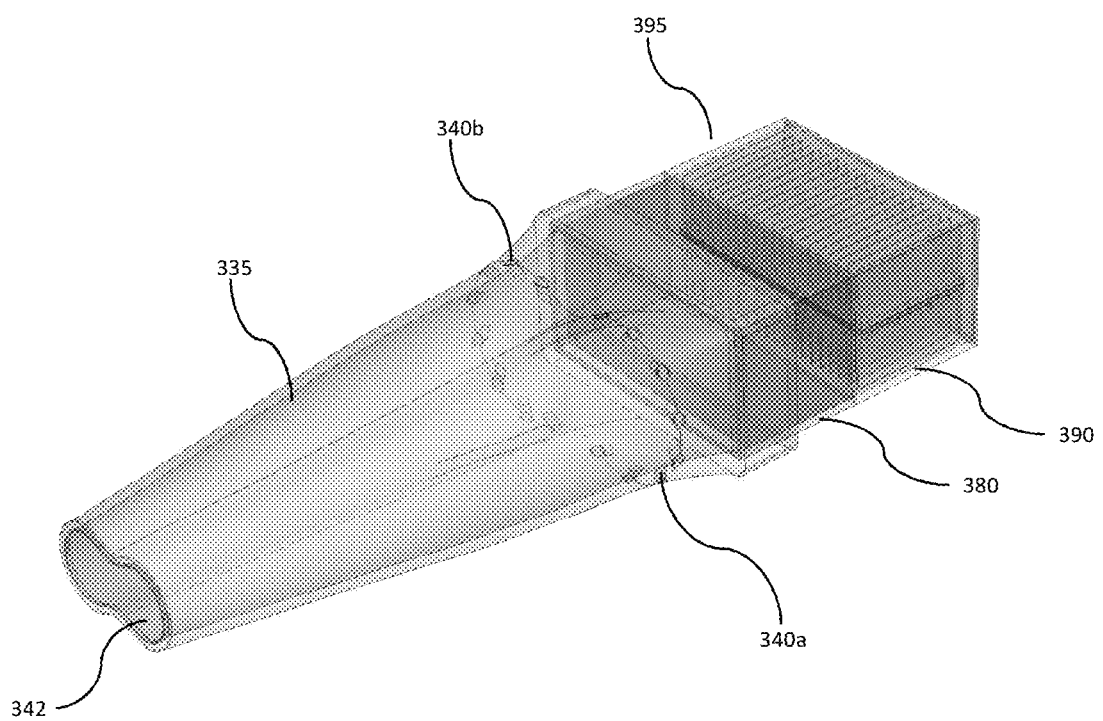
FIG. 36 is a perspective, transparent view of a mouthpiece attached to a PTCR rectangular vaporization assembly.

FIG. 36 is a perspective, transparent view of a mouthpiece 335 attached to a PTCR rectangular vaporization assembly 395. The vapor inlet of the mouthpiece 335 can be attached via an interference fit, press-fit, snap-fit coupling, magnetic coupling, adhesive, and other fastening means to the PTCR rectangular vaporization assembly 395. The mouthpiece 335 can be releasably attached to the product cover 380 such that the two pieces can be separated to replace the vaporizable product and then reconnected together. In other implementations, the product cover 380 can be detached from the vaporizer assembly 390 to replace the vaporizable product contained therein, and then reconnected together. In this embodiment, the first plurality of air inlets 340a may include eight holes and the second plurality of air inlets 340b may include another eight holes. A tapered body of mouthpiece 335 provides a comfortable and adjustable fit for a user who inhales the aerosol leaving though the aerosol outlet 342.

Figure 37:
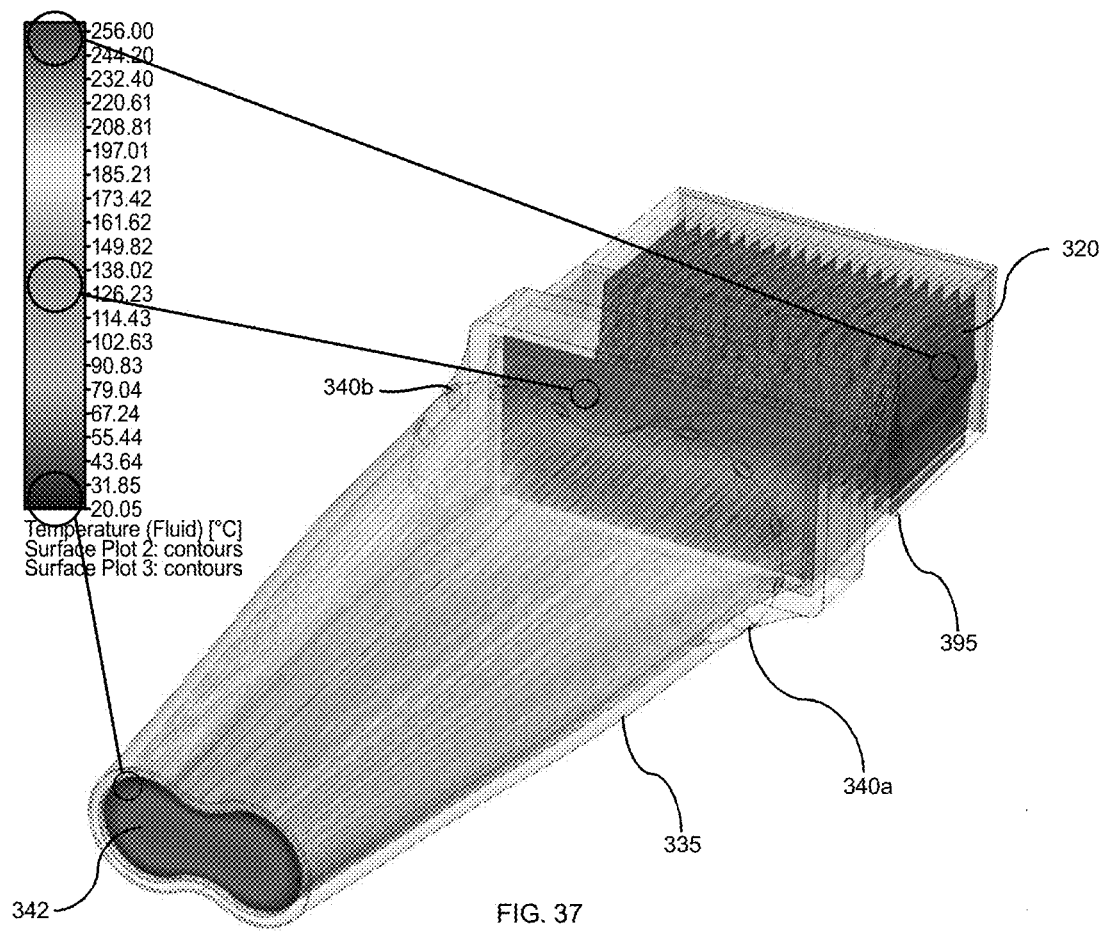
FIG. 37 is a perspective, transparent view of a mouthpiece attached to a PTCR rectangular vaporization assembly showing airflow and temperature patterns without active air inlets.

FIG. 37 is a perspective, transparent view of a mouthpiece 335 attached to a PTCR rectangular vaporization assembly 395 showing airflow and temperature patterns without any benefit from the air entering the first plurality of air inlets 340a and the second plurality of air inlets 340b. The air flow is essentially laminar and not well mixed through the PTCR rectangular vaporization assembly 395 and attached the mouthpiece 335. The incoming air passing over the heat exchanger elements 320 is rapidly heated to over 200° C. before passing through the disposable rectangular product. As shown in FIG. 37, the aerosol exits the aerosol outlet 342 of the mouthpiece 335 and has cooled to an average temperature between 100° C. and 160° C. The difference between a vapor inlet temperature and an aerosol outlet temperature is less than 100° C.

Figure 38:
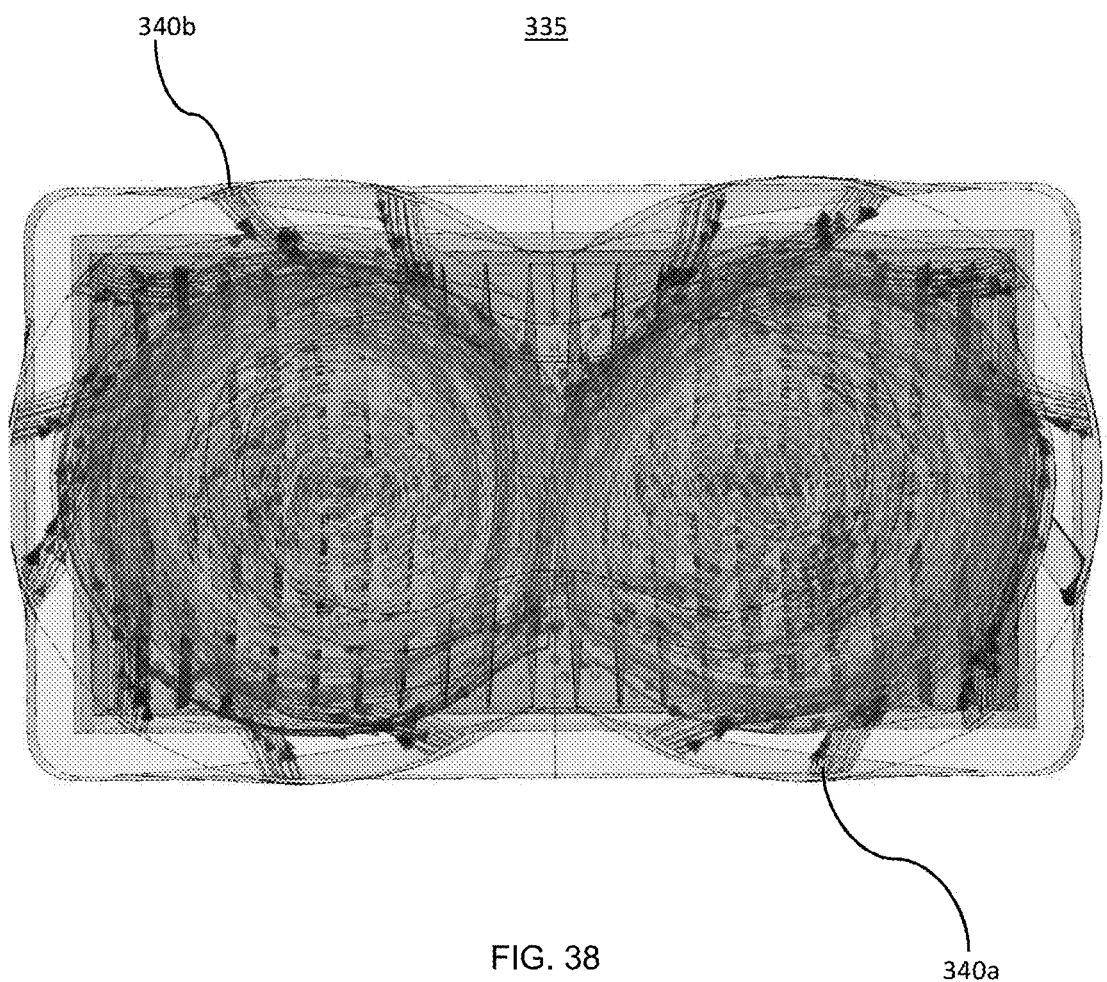
FIG. 38 is a transparent end view looking through an aerosol outlet of a mouthpiece including a plurality of air inlets showing airflow patterns.

FIG. 38 is a transparent end view looking through an aerosol outlet of a mouthpiece 335 including a plurality of air inlets showing airflow patterns. The plurality of air inlets includes the first plurality of air inlets 340a and the second plurality of air inlets 340b. As shown in FIG. 38, the first plurality of air inlets 340a includes eight holes (with each hole being an air inlet) and the second plurality of air inlets 340b includes another eight holes (with each hole being an air inlet). As discussed above with respect to FIG. 35, each hole can be formed through a thickness of the mouthpiece 335 at an angle α of between about 15 degrees and 45 degrees from an exterior surface of the mouthpiece 335. The angle α of each hole of the first plurality of air inlets 340a can each have an interior of the angle that open towards the same direction relative to the interior of the angle for an adjacent hole. The angle α of each hole of the second plurality of air inlets 340b can each have an interior of the angle that open towards the same direction relative to the interior of the angle for an adjacent hole.

Each hole of the plurality of air inlets is arranged in a plane. The plane formed by holes of the first plurality of air inlets 340a and the second plurality of air inlets 340b passes through a cross-section of mouthpiece 335 that is in the shape of two overlapping circles. Due to the circular arrangement of the holes and the interior of the angle α opening towards the same relative direction, the air passing through the holes flows in a circular motion to form a vortex. A first plurality of air streams traveling through the first plurality of air inlets 340a forms a first vortex and a second plurality of air streams traveling through the second plurality of air inlets 340b forms a second vortex. The first vortex has a first axis of rotation and a first direction of rotation about the first axis of rotation. The first direction of rotation is in a direction determined by the interior of angle α for each hole of the first plurality of air inlets 340a. The second vortex has a second axis of rotation and a second direction of rotation about the second axis of rotation. The second direction of rotation is in a direction determined by the interior of angle α for each hole of the second plurality of air inlets 340b. The first direction of rotation and the second direction of rotation can be in opposite directions. For example, the first direction of rotation is counterclockwise and the second direction of rotation is clockwise. In other implementations, the first direction of rotation is clockwise and the second direction of rotation is counterclockwise. In other implementations the first direction of rotation is clockwise and the second direction of rotation is clockwise, or the first direction of rotation is counterclockwise and the second direction of rotation is counterclockwise. Due to the taper of mouthpiece 335, the first axis of rotation and the second axis of rotation are nonparallel. The first axis of rotation and the second axis of rotation intersect at a point outside of vaporizer device past the aerosol outlet.

The vortices generated in the mouthpiece 335 help mix the air entering through the plurality of air inlets to cool the aerosol exiting through the aerosol outlet. By generating counter-rotating vortices (i.e. a first vortex rotating counterclockwise and a second vortex rotating clockwise, or vice versa), the first plurality of air streams collides with the second plurality of air streams generating turbulence to further improve the mixing of the inlet air with the vapor/aerosol inside the mouthpiece. Due to the conservation of angular momentum, the tapering of mouthpiece 335 from the vapor inlet to the aerosol outlet causes the vortices to spin faster, which creates additional turbulence and improved mixing. The turbulent mixing within the mouthpiece 335 creates a more uniform temperature profile of the aerosol exiting through aerosol outlet without creating an excessive pressure drop. This provides the user with an improved experience of being able to inhale an aerosol at a comfortable temperature without undue drawing (puffing) effort. The turbulent mixing within the mouthpiece 335 also creates smaller aerosol droplets suited for delivering the aerosol the user's deep lung tissue, and avoids the aerosol depositing in the user's mouth or throat.

While the present design is described in terms of a mouthpiece with air inlets configured to generate two vortices, it is contemplated that more than two vortices can be generated within the mouthpiece. While a single vortex may provide some mixing of inlet air with an aerosol within a mouthpiece, a portion of the heated aerosol may flow along a single vortex's axis and exit the aerosol outlet without being sufficiently cooled.

Figure 39:
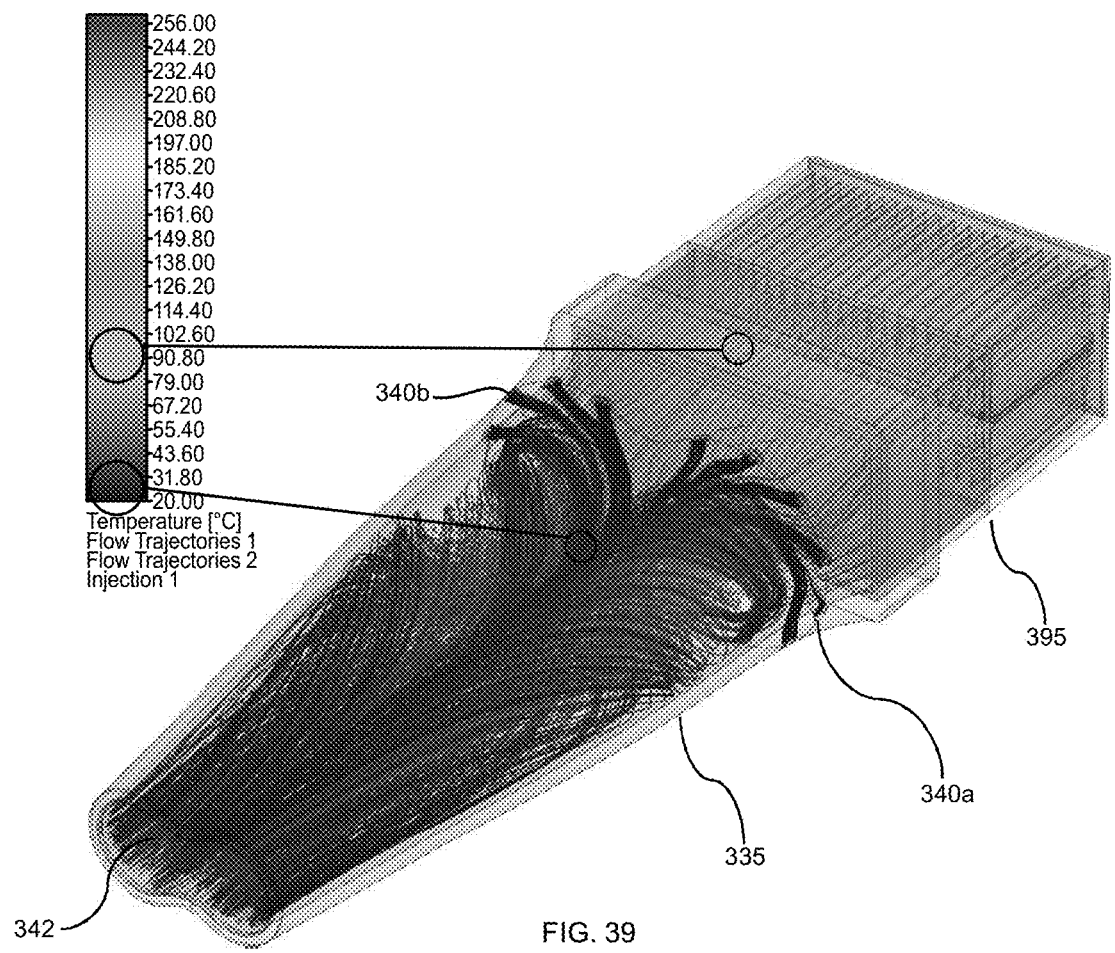
FIG. 39 is a perspective, transparent view of a mouthpiece attached to a PTCR rectangular vaporization assembly showing airflow and temperature patterns 0.1 seconds after activation.

FIG. 39 is a perspective, transparent view of a mouthpiece 335 attached to a PTCR rectangular vaporization assembly 395 showing airflow and temperature patterns 0.1 seconds after activation of the PTCR heater. The air exiting the PTCR rectangular vaporization assembly 395 has been heated to a temperature of between about 70° C. and about 90° C. The air entering the first plurality of air inlets 340a and the second plurality of air inlets 340b is at room temperature (between about 20° C. and about 25° C.) and mixes with the vapor entering the vapor inlet of the mouthpiece 335. The aerosol exiting the aerosol outlet 342 of the mouthpiece 335 has been cooled to a temperature of between about 20° C. and about 50° C.

Figure 40:
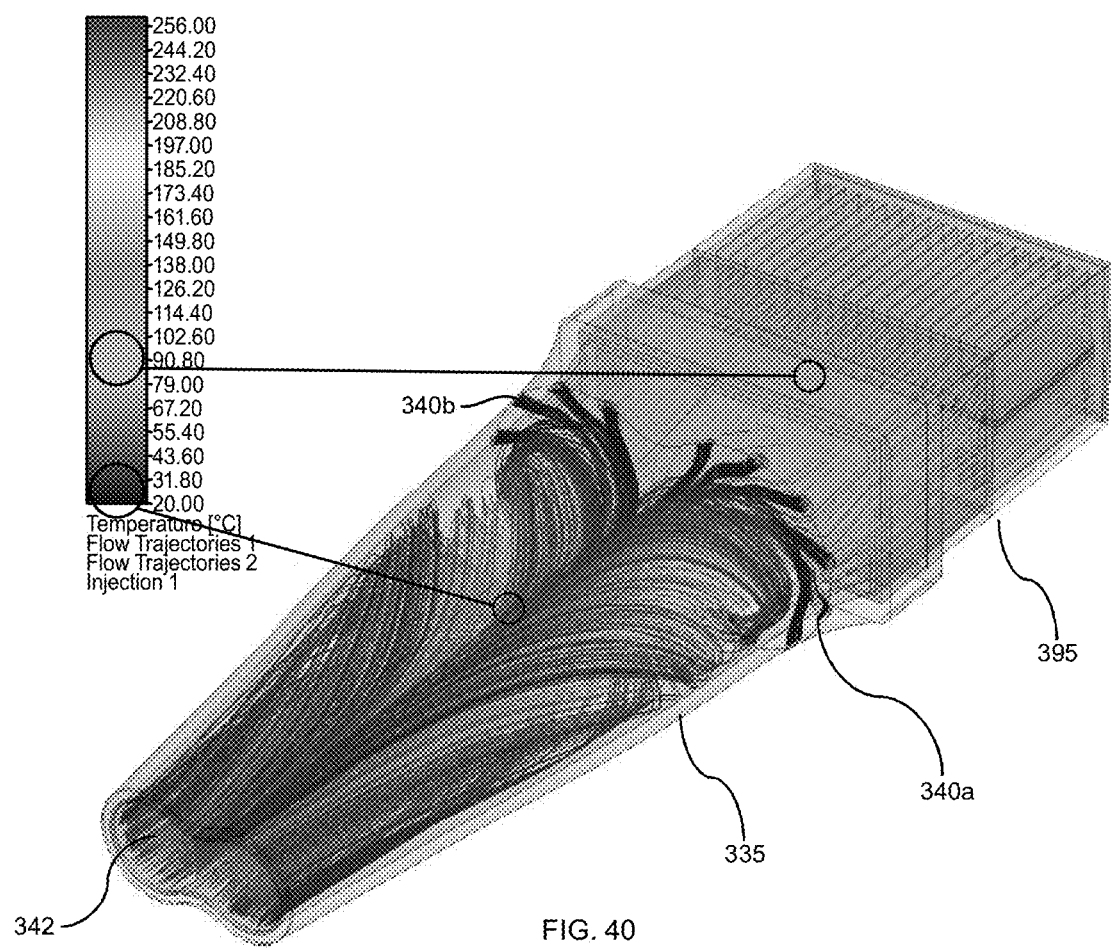
FIG. 40 is a perspective, transparent view of a mouthpiece attached to a PTCR rectangular vaporization assembly showing airflow and temperature patterns 0.2 seconds after activation.

FIG. 40 is a perspective, transparent view of a mouthpiece 335 attached to a PTCR rectangular vaporization assembly 395 showing airflow and temperature patterns 0.2 seconds after activation of the PTCR heater. The air exiting PTCR rectangular vaporization assembly 395 has been heated to a temperature of between about 110° C. and about 160° C. The air entering the first plurality of air inlets 340a and the second plurality of air inlets 340b is at room temperature (between about 20° C. and about 25° C.) and mixes with the vapor entering the vapor inlet of the mouthpiece 335. The aerosol exiting the aerosol outlet 342 of the mouthpiece 335 has been cooled to a temperature of between about 25° C. to about 60° C.

Figure 41:
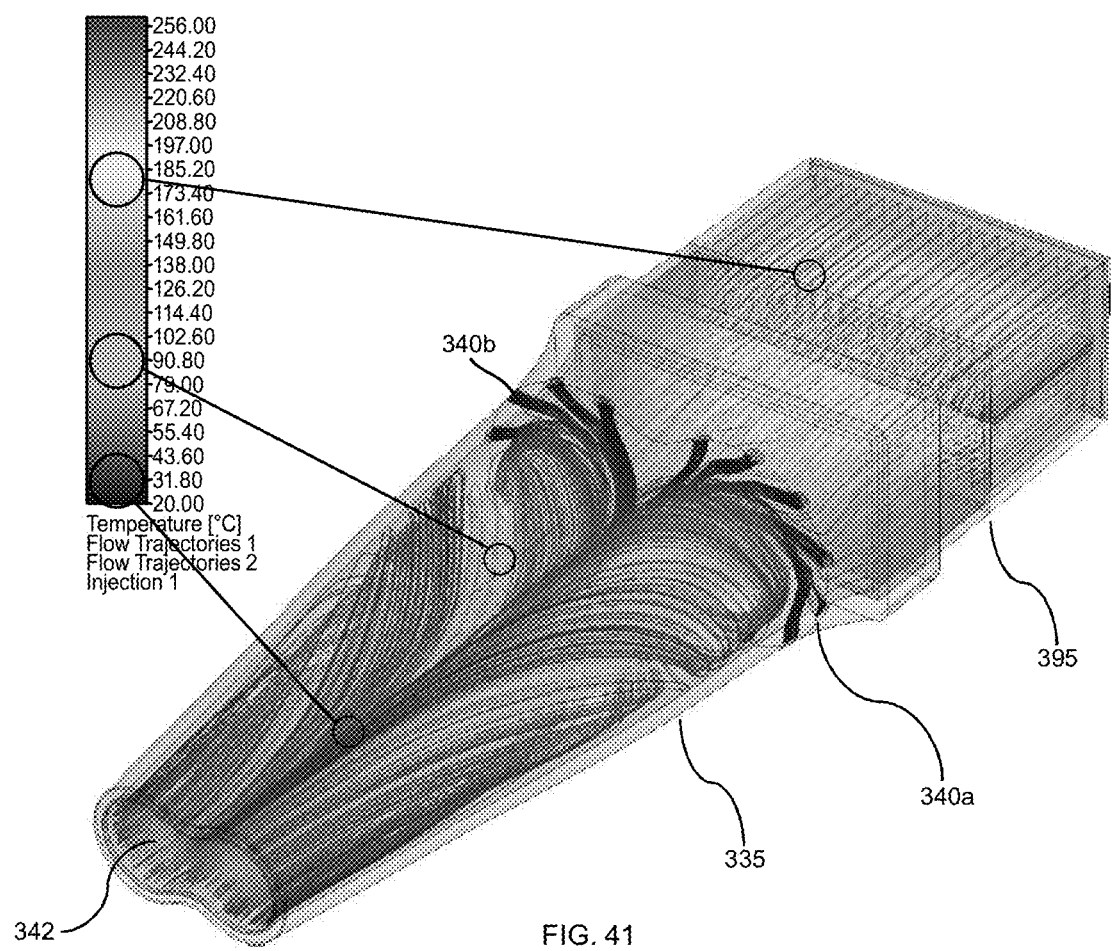
FIG. 41 is a perspective, transparent view of a mouthpiece attached to a PTCR rectangular vaporization assembly showing airflow and temperature patterns 0.3 seconds after activation.

FIG. 41 is a perspective, transparent view of a mouthpiece 335 attached to a PTCR rectangular vaporization assembly 395 showing airflow and temperature patterns 0.3 seconds after activation of the PTCR heater. The air exiting PTCR rectangular vaporization assembly 395 has been heated to a temperature of between about 140° C. and about 180° C. The air entering the first plurality of air inlets 340a and the second plurality of air inlets 340b is at room temperature (between about 20° C. and about 25° C.) and mixes with the vapor entering the vapor inlet of the mouthpiece 335. The aerosol exiting the aerosol outlet 342 of the mouthpiece 335 has been cooled to a temperature of between about 40° C. and about 80° C.

Figure 42:
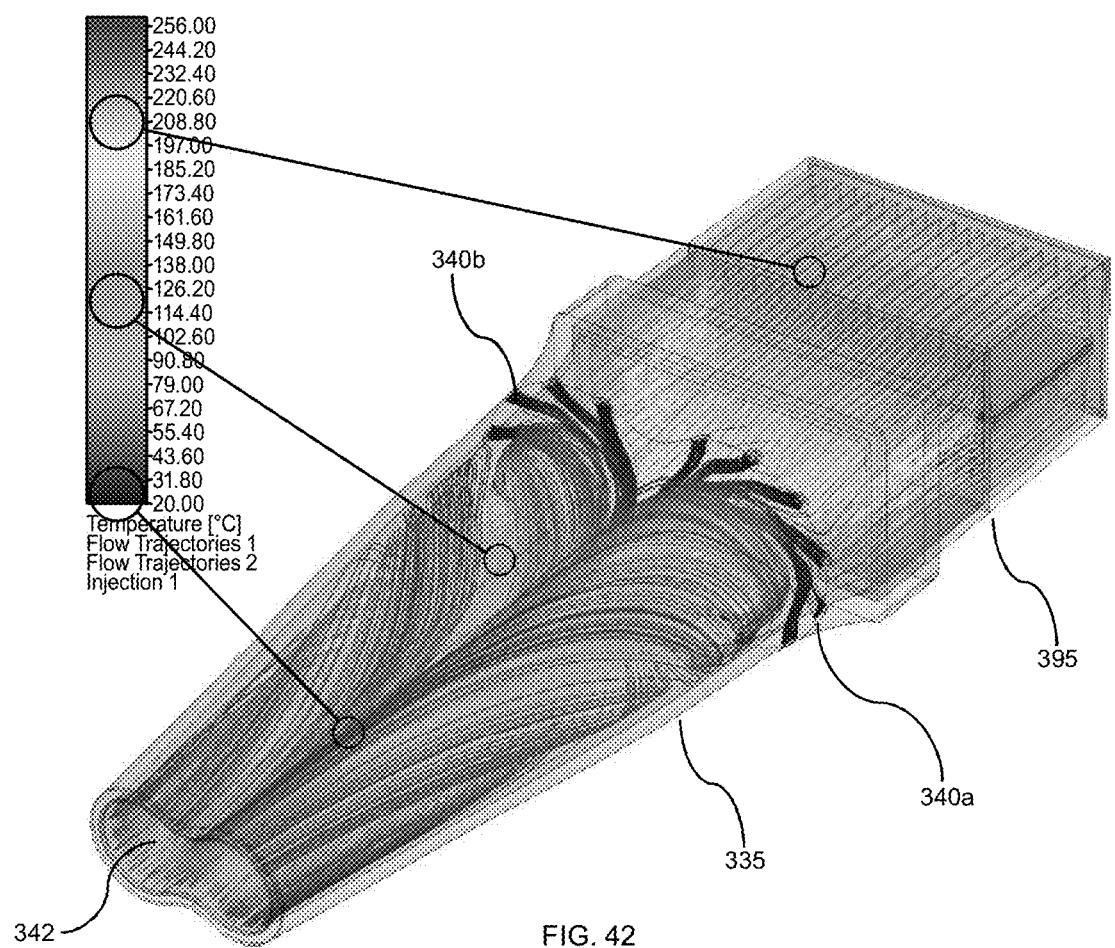
FIG. 42 is a perspective, transparent view of a mouthpiece attached to a PTCR rectangular vaporization assembly showing airflow and temperature patterns 0.4 seconds after activation.

FIG. 42 is a perspective, transparent view of a mouthpiece 335 attached to a PTCR rectangular vaporization assembly 395 showing airflow and temperature patterns 0.4 seconds after activation of the PTCR heater. The air exiting PTCR rectangular vaporization assembly 395 has been heated to a temperature of between about 150° C. and about 200° C. The air entering the first plurality of air inlets 340a and the second plurality of air inlets 340b is at room temperature (between about 20° C. and about 25° C.) and mixes with the vapor entering the vapor inlet of the mouthpiece 335. The aerosol exiting the aerosol outlet 342 of the mouthpiece 335 has been cooled to a temperature of between about 50° C. and about 90° C.

Figure 43:
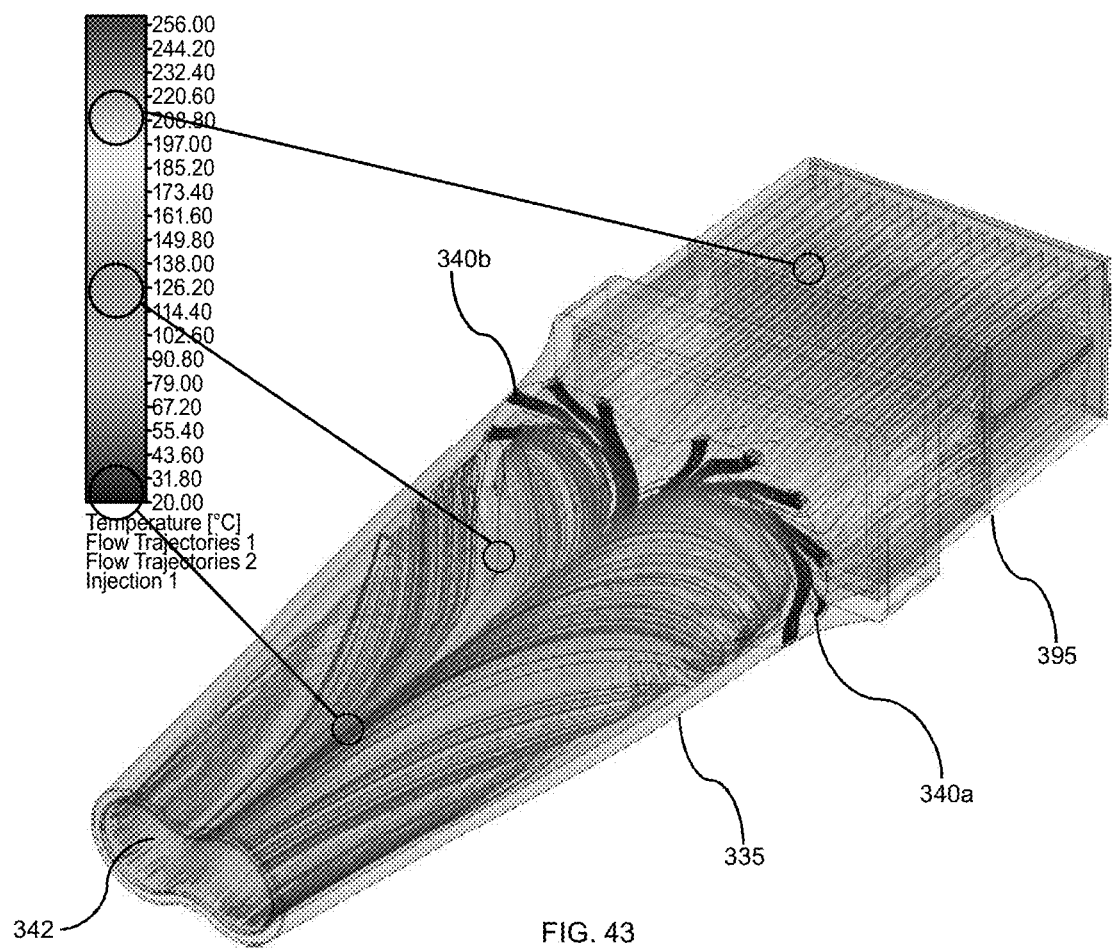
FIG. 43 is a perspective, transparent view of a mouthpiece attached to a PTCR rectangular vaporization assembly showing airflow and temperature patterns 0.5 seconds after activation.

FIG. 43 is a perspective, transparent view of a mouthpiece 335 attached to a PTCR rectangular vaporization assembly 395 showing airflow and temperature patterns 0.5 seconds after activation of the PTCR heater. The air exiting PTCR rectangular vaporization assembly 395 has been heated to a temperature of between about 160° C. and about 210° C. The air entering the first plurality of air inlets 340a and the second plurality of air inlets 340*b* is at room temperature (between about 20° C. and about 25° C.) and mixes with the vapor entering the vapor inlet of the mouthpiece 335. The aerosol exiting the aerosol outlet 342 of the mouthpiece 335 has been cooled to a temperature of between about 50° C. and about 90° C.

Figure 44:
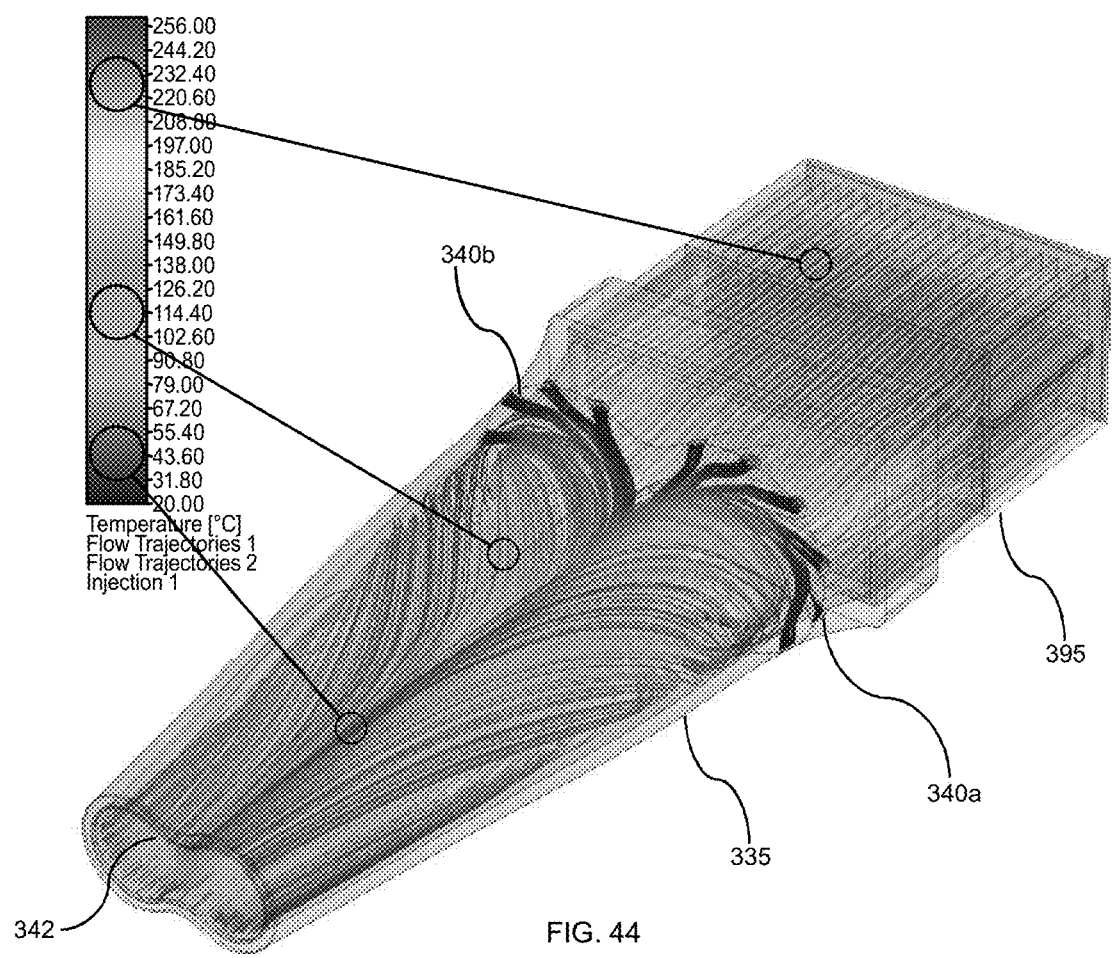
FIG. 44 is a perspective, transparent view of a mouthpiece attached to a PTCR rectangular vaporization assembly showing airflow and temperature patterns 1.0 seconds after activation.

FIG. 44 is a perspective, transparent view of a mouthpiece 335 attached to a PTCR rectangular vaporization assembly 395 showing airflow and temperature patterns 1.0 seconds after activation of the PTCR heater. The air exiting PTCR rectangular vaporization assembly 395 has been heated to a temperature of between about 160° C. and about 210° C. The air entering the first plurality of air inlets 340*a* and the second plurality of air inlets 340*b* is at room temperature (between about 20° C. and about 25° C.) and mixes with the vapor entering the vapor inlet of the mouthpiece 335. The aerosol exiting the aerosol outlet 342 of the mouthpiece 335 has been cooled to a temperature of between about 55° C. and about 100° C. The difference between a vapor inlet temperature and an aerosol outlet temperature is at least 100° C.

Figure 45:
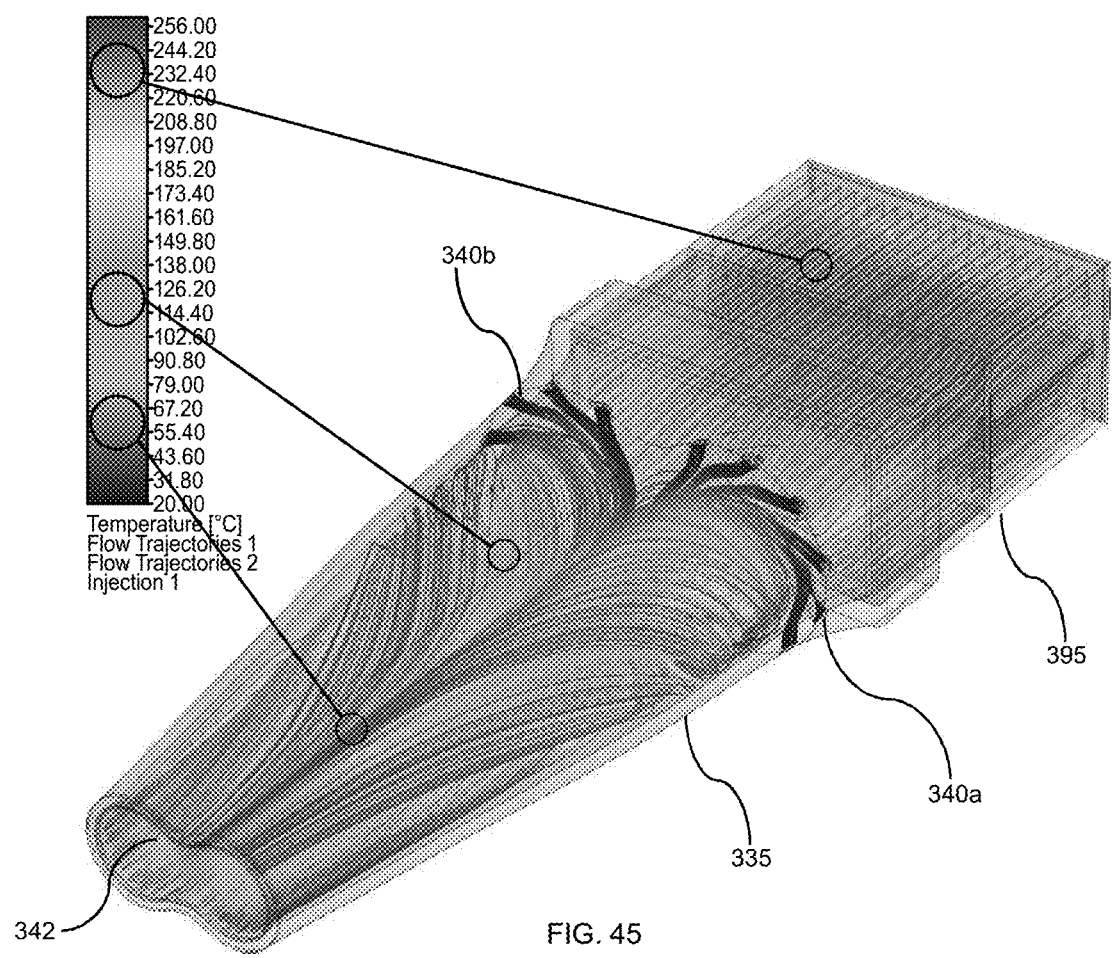
FIG. 45 is a perspective, transparent view of a mouthpiece attached to a PTCR rectangular vaporization assembly showing airflow and temperature patterns 2.0 seconds after activation.

FIG. 45 is a perspective, transparent view of a mouthpiece 335 attached to a PTCR rectangular vaporization assembly 395 showing airflow and temperature patterns 2.0 seconds after activation of the PTCR heater. The air exiting PTCR rectangular vaporization assembly 395 has been heated to a temperature of between about 170° C. and about 220° C. The air entering the first plurality of air inlets 340*a* and the second plurality of air inlets 340*b* is at room temperature (between about 20° C. and about 25° C.) and mixes with the vapor entering the vapor inlet of the mouthpiece 335. The aerosol exiting the aerosol outlet 342 of the mouthpiece 335 has been cooled to a temperature of between about 60° C. and about 100° C. The difference between a vapor inlet temperature and an aerosol outlet temperature is at least 100° C.

Figure 46:
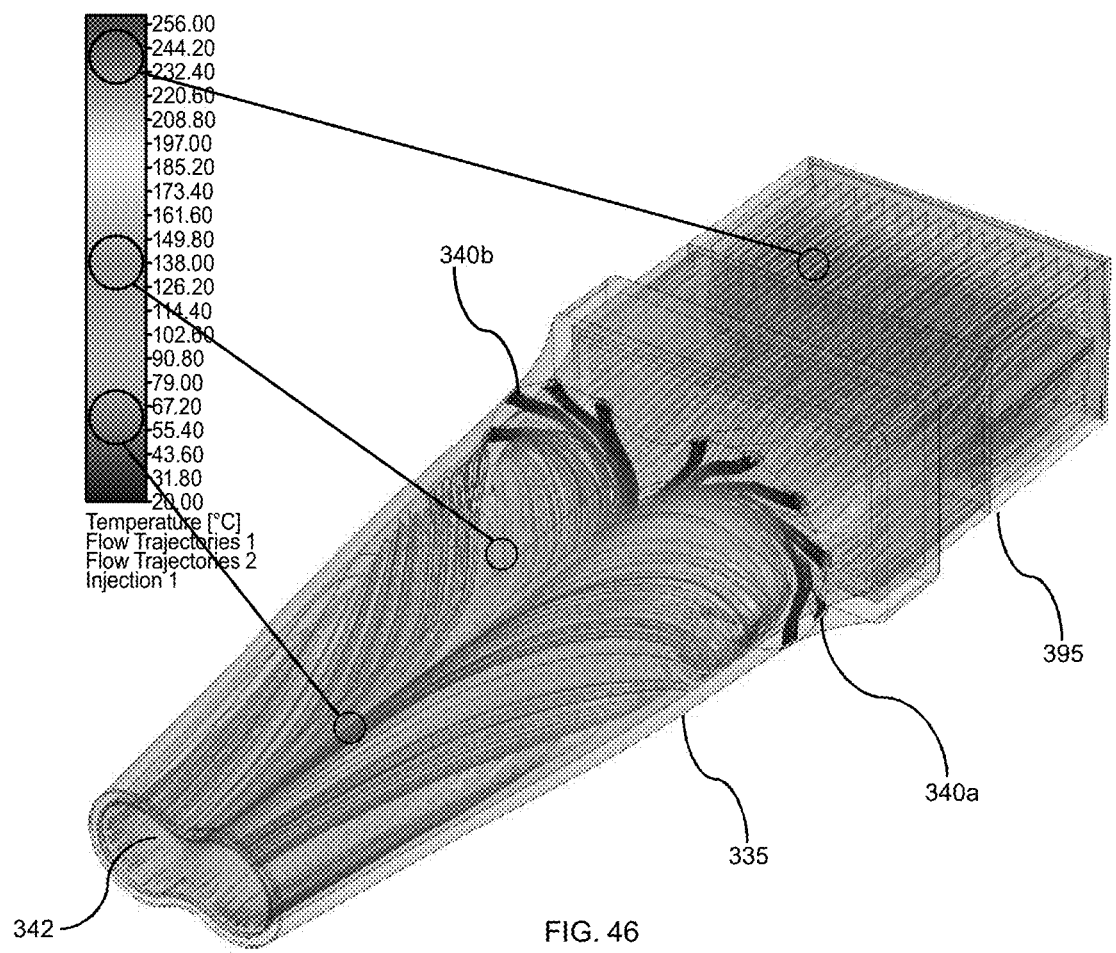
FIG. 46 is a perspective, transparent view of a mouthpiece attached to a PTCR rectangular vaporization assembly showing airflow and temperature patterns 3.0 seconds after activation.

FIG. 46 is a perspective, transparent view of a mouthpiece 335 attached to a PTCR rectangular vaporization assembly 395 showing airflow and temperature patterns 3.0 seconds after activation of the PTCR heater. The air exiting PTCR rectangular vaporization assembly 395 has been heated to a temperature of between about 190° C. and about 240° C. The air entering the first plurality of air inlets 340*a* and the second plurality of air inlets 340*b* is at room temperature (between about 20° C. and about 25° C.) and mixes with the vapor entering the vapor inlet of the mouthpiece 335. The aerosol exiting the aerosol outlet 342 of the mouthpiece 335 has been cooled to a temperature of between about 60° C. and about 100° C. The difference between a vapor inlet temperature and an aerosol outlet temperature is at least 100° C.

Figure 47:
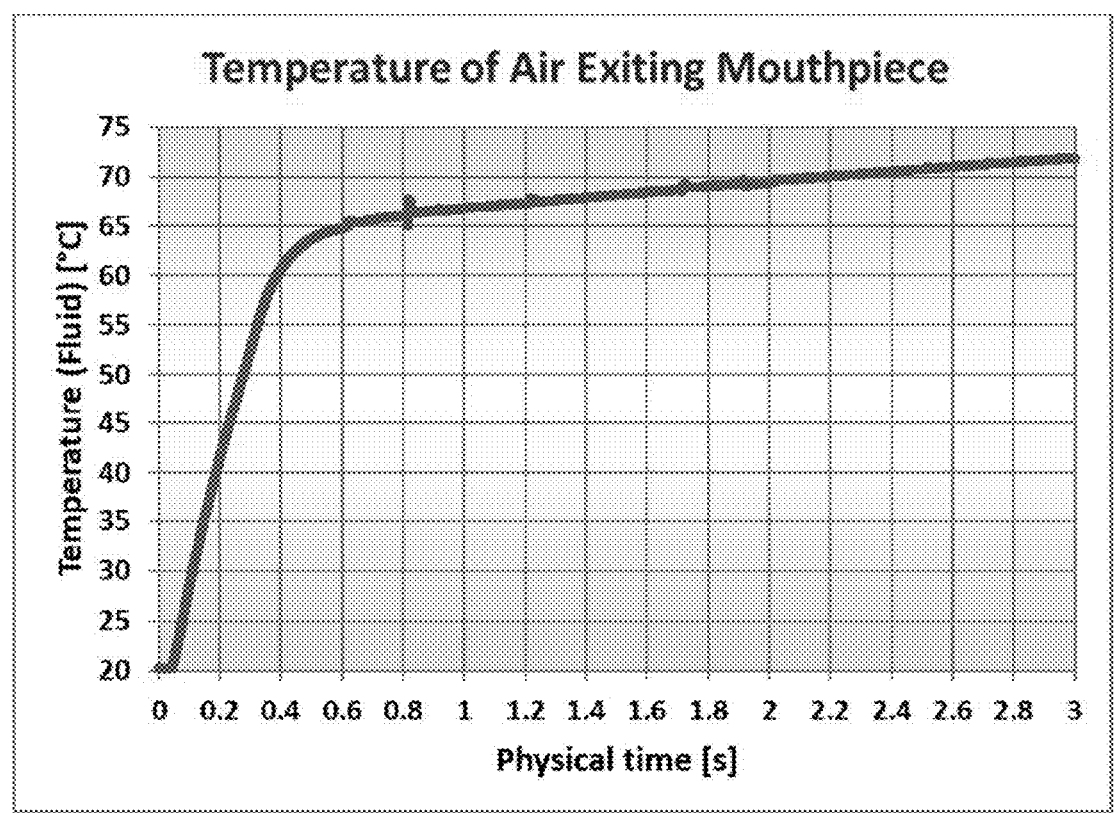
FIG. 47 illustrates temperature of the air exiting a mouthpiece as a function of time for an example vaporizer device including a PTCR heater.

FIG. 47 illustrates temperature of air exiting a mouthpiece as a function of time for an example vaporizer device with a PTCR heater. The air temperature exiting the mouthpiece increases sharply between 0 and 0.4 seconds at rate of about 6,000° C./minute. Between 0.4 seconds and 0.6 seconds the rate of temperature change for the air temperature exiting the mouthpiece drops significantly until reaching a steady-state rate of about 188° C./minute from 0.6 seconds to 3.0 seconds.

Figure 48:
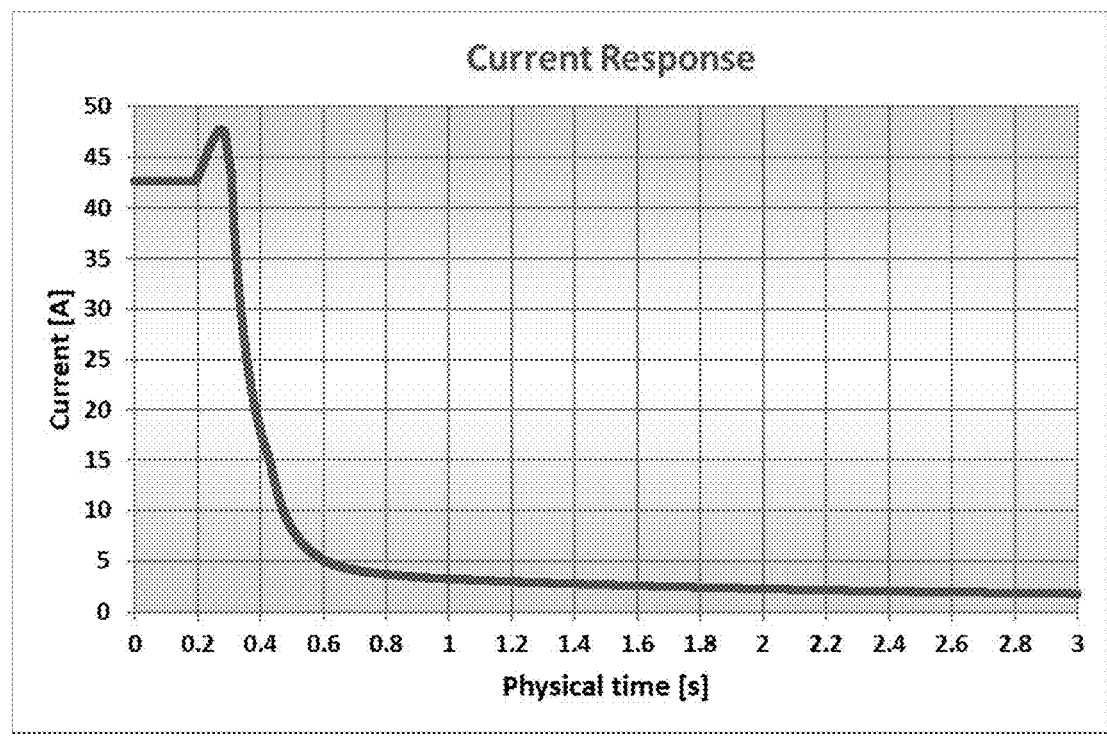
FIG. 48 illustrates a current response as a function of time for an example vaporizer device including a PTCR heater.

FIG. 48 illustrates a current response as a function of time for an example vaporizer device with a PTCR heater. Upon activation, the PTCR heater draws about 43 amps until about 0.2 seconds after activation. Between 0.2 seconds and 0.3 seconds after activation, the current spikes to a peak draw of about 47 amps before dropping to reach a steady-state draw of about 2 amps at about 2 seconds from activation.

Figure 49:
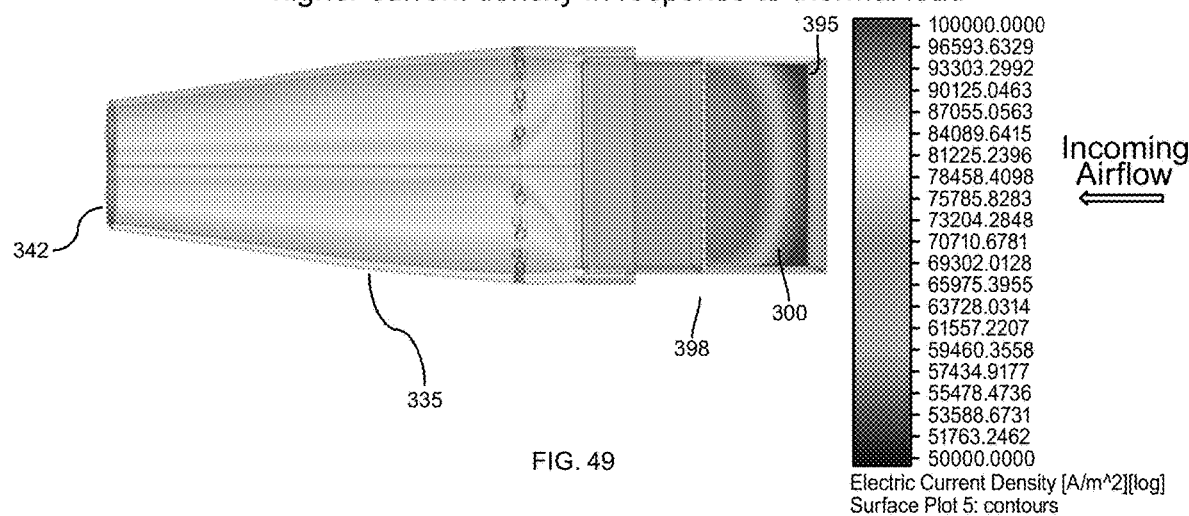
FIG. 49 is a top view of a mouthpiece attached to a PTCR rectangular vaporization assembly showing differential current density within the PTCR heater in response to cool ambient airflow entering PTCR heater assembly.

FIG. 49 shows top view of a mouthpiece 335 attached to a PTCR rectangular vaporization assembly 398 with the product cover and the cover removed. Also removed in FIG. 49 are the heat exchanger elements and the electrically conductive coatings in order to show the expose PTCR material 300. PTCR material 300 is color coded to express current density at two seconds after onset of the transient simulation of air exiting aerosol outlet 342 of mouthpiece 335 at flow rate of 1.4 liters per minute and with differential voltage of 3.7 volts applied to the PTCR material 300 arranged between electrically conductive coatings. Ambient incoming airflow on the side opposite aerosol outlet 342 results in greater thermal load near the ambient air entry side (upstream side) than the side that is opposite (downstream side). The differential thermal load results in differential current density within PTCR material 300 as shown in FIG. 49. A current density legend is also shown and ranges from 50,000 amps/square meter to 100,000 amps/square meter. FIG. 49 is consistent with the PTCR material principles presented in FIG. 1.

Any of the aforementioned mouthpieces can be coupled to any of the aforementioned PTCR vaporization assemblies. For example, any of the aforementioned mouthpieces can be removably coupled via an interference fit, press-fit, snap-fit coupling, magnetic coupling, adhesive, and other fastening means to any of the aforementioned PTCR vaporization assemblies. In implementations, the mouthpiece is separated from the PTCR vaporization assembly to replace a vaporizable material contained therein, and then recoupled together.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A mouthpiece for a vaporizer device, comprising:
   a channel having a vapor inlet and an aerosol outlet;
   a first plurality of air inlets disposed between the vapor inlet and the aerosol outlet and configured to provide a first plurality of air streams, the first plurality of air streams forming a first vortex within the channel, the first vortex having a first axis of rotation and a first direction of rotation about the first axis of rotation; and
   a second plurality of air inlets disposed between the vapor inlet and the aerosol outlet and configured to provide a second plurality of air streams, the second plurality of air streams forming a second vortex within the channel, the second vortex having a second axis of rotation and a second direction of rotation about the second axis of rotation, wherein the first plurality of air streams and the second plurality of air streams are configured to mix with a vapor entering into the channel from the vapor inlet and to form an aerosol exiting through the aerosol outlet.

2. The mouthpiece of claim 1, wherein each inlet of the first plurality of air inlets is a circular hole formed through a thickness of a mouthpiece and at an angle between about 15 degrees and 45 degrees from an exterior surface of the mouthpiece.

3. The mouthpiece of claim 2, wherein an interior of the angle for each circular hole opens towards the first direction of rotation.

4. The mouthpiece of claim 1, wherein each inlet of the second plurality of air inlets is a circular hole formed through a thickness of the mouthpiece at an angle between about 15 degrees and 45 degrees from an exterior surface of the mouthpiece.

5. The mouthpiece of claim 4, wherein an interior of the angle for each circular hole open towards the second direction of rotation.

6. The mouthpiece of claim 1, wherein the first direction of rotation is counterclockwise and the second direction of rotation is clockwise.

7. The mouthpiece of claim 1, wherein the first axis of rotation and the second axis of rotation are nonparallel.

8. The mouthpiece of claim 1, wherein the first plurality of air inlets and the second plurality of air inlets provide turbulent mixing of inlet air with vapor entering the mouthpiece from the vapor inlet.

9. The mouthpiece of claim 1 wherein the first plurality of air inlets and the second plurality of air inlets are arranged in a plane.

10. The mouthpiece of claim 1, wherein the first plurality of air inlets and the second plurality of air inlets are each in a circular arrangement.

11. The mouthpiece of claim 1, wherein a vapor inlet cross-sectional area is at least four times greater than an aerosol outlet cross-sectional area.

12. The mouthpiece of claim 1, wherein the vapor inlet has a vapor inlet temperature and the aerosol outlet has an aerosol outlet temperature, and a difference between the vapor inlet temperature and the aerosol outlet temperature is at least 100° C.

13. A vaporizer device comprising:
   a housing including an air inlet;
   a heating element within the housing, the heating element including a nonlinear positive temperature coefficient of resistance material;
   a heat exchanger thermally coupled to the heating element and arranged to receive an airflow from the air inlet, the heat exchanger configured to transfer heat between the heating element and the airflow to produce a heated airflow, wherein the heated airflow exiting the heat exchanger is configured to vaporize a vaporizable material; and
   a mouthpiece configured to receive the vaporized vaporizable material through a channel having a vapor inlet and an aerosol outlet, the mouthpiece comprising,
   a first plurality of air inlets, and a second plurality of air inlets, wherein the first plurality of air inlets are disposed between the vapor inlet and the aerosol outlet and configured to provide a first plurality of air streams, the first plurality of air streams forming a first vortex within the channel, the first vortex having a first axis of rotation and a first direction of rotation about the first axis of rotation, wherein the second plurality of air inlets are disposed between the vapor inlet and the aerosol outlet and configured to provide a second plurality of air streams, the second plurality of air streams forming a second vortex within the channel, the second vortex having a second axis of rotation, the second vortex having a second axis of rotation and a second direction of rotation about the second axis of rotation, and wherein the first plurality of air streams and the second plurality of air streams are configured to mix with a the vaporized vaporizable material entering from the vapor inlet and to form an aerosol exiting through the aerosol outlet.

14. The vaporizer device of claim 13, wherein the heat exchanger includes a first heat exchanger thermally coupled to a first side of the heating element, the heat exchanger including a second heat exchanger thermally coupled to a second side of the heating element.

15. The vaporizer device of claim 13 wherein the heat exchanger includes a plurality of fin features.

16. The vaporizer device of claim 13, further comprising:
   a flow diverter located in a path of the airflow and configured to divert a portion of the airflow through the heat exchanger.

17. The vaporizer device of claim 13, further comprising a cartridge having a first air inlet, the cartridge configured to contain the vaporizable material.

18. The vaporizer device of claim 17, wherein the housing includes a connector configured to couple the housing to the cartridge.

19. A vaporizer device comprising:
   a housing including an air inlet;
   a heating element within the housing, the heating element including a nonlinear positive temperature coefficient of resistance material;
   a heat exchanger thermally coupled to the heating element and arranged to receive an airflow from the air inlet, the heat exchanger configured to transfer heat between the heating element and the airflow to produce a heated airflow, wherein the heated airflow exiting the heat exchanger is configured to vaporize a vaporizable material; and
   a mouthpiece configured to receive the vaporized vaporizable material through a vapor inlet, the mouthpiece comprising
   a first plurality of air inlets, and a second plurality of air inlets, wherein the first plurality of air inlets are disposed between the vapor inlet and an aerosol outlet and configured to provide a first plurality of air streams, the first plurality of air streams forming a first vortex, the first vortex having a first axis of rotation and a first direction of rotation about the first axis of rotation, wherein the second plurality of air inlets are disposed between the vapor inlet and the aerosol outlet and configured to provide a second plurality of air streams, the second plurality of air streams forming a second vortex, the second vortex having a second axis of rotation, the second vortex having a second axis of rotation and a second direction of rotation about the second axis of rotation, and wherein the first plurality of air streams and the second plurality of air streams are configured to mix with a the vaporized vaporizable material entering from the vapor inlet and to form an aerosol exiting through the aerosol outlet;

a first cartridge including the vaporizable material, a first air inlet, and a wick, wherein the vaporizable material is a liquid vaporizable material and the wick is in fluidic communication with the liquid vaporizable material, the wick arranged to receive the heated airflow through the first air inlet from the heat exchanger to vaporize the vaporizable material to produce at least one of a vapor or a first aerosol; and a second cartridge including a solid vaporizable material and the mouthpiece, the solid vaporizable material arranged to receive at least one of the vapor or the first aerosol to produce a second aerosol, and the mouthpiece configured to receive the second aerosol after the at least one of vapor or the first aerosol passes through the solid vaporizable material, wherein the first cartridge is removably coupled to the housing, and wherein the second cartridge is removably coupled to at least one of the housing or the first cartridge.

20. A vaporizer device for vaporizing a solid vaporizable material with a heated airflow, comprising:

a housing including an air inlet and a power source configured to provide a current flow at a voltage;

a PTCR heater assembly within the housing comprising
a heating element within the housing and configured to electrically couple to the power source to receive the current flow, the PTCR heating element comprising a PTCR material having an electrical resistivity that varies based on temperature, the electrical resistivity including an electrical resistivity transition zone in which the electrical resistivity increases over a temperature range, such that when the PTCR heating element is heated above a first temperature within the transition zone, current flow from the power source is reduced to a level that limits further temperature increases of the PTCR heating element;

a heat exchanger thermally coupled to the heating element and arranged to receive airflow from the air inlet, the heat exchanger configured to transfer heat between the heating element and the airflow to produce the heated airflow, wherein the heated airflow exiting the heat exchanger is configured to vaporize the solid vaporizable material; and a mouthpiece configured to receive the vaporized solid vaporizable material through a channel having a vapor inlet and an aerosol outlet, the mouthpiece comprising a first plurality of air inlets, and a second plurality of air inlets, wherein the first plurality of air inlets are disposed between the vapor inlet and the aerosol outlet and configured to provide a first plurality of air streams, the first plurality of air streams forming a first vortex within the channel, the first vortex having a first axis of rotation and a first direction of rotation about the first axis of rotation, wherein the second plurality of air inlets are disposed between the vapor inlet and the aerosol outlet and configured to provide a second plurality of air streams, the second plurality of air streams forming a second vortex within the channel, the second vortex having a second axis of rotation, the second vortex having a second axis of rotation and a second direction of rotation about the second axis of rotation, and wherein the first plurality of air streams and the second plurality of air streams are configured to mix with the vaporized solid vaporizable material entering from the vapor inlet and to form an aerosol exiting through the aerosol outlet.

* * * * *